US011420296B2

(12) United States Patent
Liu

(10) Patent No.: US 11,420,296 B2
(45) Date of Patent: Aug. 23, 2022

(54) WELDING FILLER WIRE FOR FUSION WELDING PRECIPITATION-HARDENED AUSTENITIC FE—MN—AL—C ALLOYS

(71) Applicants: Te-Fu Fang, Tainan (TW); Chien-Fa Liao, Taipei (TW)

(72) Inventor: Tzeng-Feng Liu, Hsinchu (TW)

(73) Assignees: Te-Fu Fang, Tainan (TW); Chien-Fa Liao, Taipei (TW)

( * ) Notice: Subject to any disclaimer, the term of this patent is extended or adjusted under 35 U.S.C. 154(b) by 0 days.

(21) Appl. No.: 17/024,636

(22) Filed: Sep. 17, 2020

(65) Prior Publication Data

US 2022/0080534 A1     Mar. 17, 2022

(51) Int. Cl.
*B23K 35/02* (2006.01)
*B23K 35/30* (2006.01)
(Continued)

(52) U.S. Cl.
CPC ...... *B23K 35/0261* (2013.01); *B23K 35/3053* (2013.01); *B23K 35/3073* (2013.01);
(Continued)

(58) Field of Classification Search
None
See application file for complete search history.

(56) References Cited

U.S. PATENT DOCUMENTS 4,975,335 A * 12/1990 Wan .................. C21D 1/09
148/318
5,431,753 A * 7/1995 Kim .................. C22C 38/04
148/620

(Continued)

FOREIGN PATENT DOCUMENTS

WO    WO-2007062702 A1 *  6/2007  ............. C22C 38/04

OTHER PUBLICATIONS

Makhamreh et al. (Microstructural studies of iron-manganese-aluminum-silicon weld metal), Paper presented at the 72nd Annual AWS Meeting held Apr. 14-19, 1991, in Detroit, Mich. pp. 104-113. (Year: 1992).*

(Continued)

*Primary Examiner* — Elizabeth Collister
(74) *Attorney, Agent, or Firm* — Muncy, Geissler, Olds & Lowe, P.C.

(57) ABSTRACT

A series of welding filler wires with innovative composition design for fusion welding precipitation-hardened lightweight austenitic Fe—Mn—Al—C alloys. The first class of the welding filler wires is composed of 23-34 wt. % Mn, 7.5-11.5 wt. % Al, 1.35-1.95 wt. % C, with the balance being essentially Fe. After fusion welding, there are high-density of nano-sized (~3-5 nm) $(Fe,Mn)_3AlC$ carbides (κ-carbides) uniformly distributed within the austenite dendrite cells in the fusion zone (FZ). The amount of nano-sized (~6-10 nm) κ-carbides existing within the eutectic regions is significantly increased and the size of the austenite dendrite cells is substantially reduced. The second class of welding filler wires has the composition of 23-34 wt. % Mn, 7.5-11.5 wt. % Al, 1.40-1.95 wt. % C, 0.1-2.5 wt. % Ti, 0.1-3.0 wt. % Nb, 0.1-2.5 wt. % V, with the balance being essentially Fe. The microstructure of the FZ in the as-welded condition results in formation of substantial amount of nano-sized (~6-10 nm) face-centered-cubic structured ductile Ti-rich Ti-carbides, Nb-rich Nb-carbides and V-rich V-carbides within the eutectic regions. These carbides are extremely hard (2000~3500 Hv), enhancing hardness of the obtained FZ.

6 Claims, 34 Drawing Sheets

(51) Int. Cl.
C22C 38/04 (2006.01)
C22C 38/12 (2006.01)
C22C 38/14 (2006.01)
C21D 6/02 (2006.01)
C22C 38/06 (2006.01)
C22C 38/38 (2006.01)

(52) U.S. Cl.
CPC .............. *C21D 6/02* (2013.01); *C22C 38/04* (2013.01); *C22C 38/06* (2013.01); *C22C 38/12* (2013.01); *C22C 38/14* (2013.01); *C22C 38/38* (2013.01); *C21D 2211/001* (2013.01)

(56) References Cited

U.S. PATENT DOCUMENTS

| 8,647,450 | B2* | 2/2014 | Kikuchi | C21D 8/06 |
| | | | | 148/329 |
| 9,528,177 | B2 | 12/2016 | Liu | |
| 10,167,528 | B2 | 1/2019 | Liu | |
| 2016/0153077 | A1* | 6/2016 | Moon | C22C 38/06 |
| | | | | 148/620 |

OTHER PUBLICATIONS

Machine translation of WO 2007062702 A1 from Espacenet (translated Jun. 17, 2021) (Year: 2007).*

Machine translation of WO 2007062702 A1 (translated by Espacenet on Jun. 17, 2021) (Year: 2007).*

A. J. Ardell, "Precipitation Hardening", Metall. Trans., 16A (1985) 2131-2165.

"Precipitation hardening of aluminum alloys", Totalmateria, URL: https://www.totalmateria.com/page.aspx?ID=CheckArticle&site=ktn &NM=235, published Jun. 2010, 4 pages.

I. Gutierrez-Urrutia et al., "Influence of Al content and precipitation state on the mechanical behavior of austenitic high-Mn low-density steels", Scripta Mater., 68 (2013) 343-347.

Z. Q. Wu et al., "Influence of Al content on the strain-hardening behavior of aged low density Fe—Mn—Al—C steels with high Al content", Mater. Sci. Eng. A, 639 (2015) 187-191.

W. Song et al. "κ-phase formation in Fe—Mn—Al—C austenitic steels", Steel Res. Intern., 86 (2015) 1161-1169.

K. Lee et al., "β-Mn formation and aging effect on the fracture behavior of high-Mn low-density steels", Scripta Mater., 124 (2016) 193-197.

E. Welsch et al., "Strain hardening by dynamic slip band refinement in a high-Mn lightweight steel", Acta Mater., 116 (2016) 188-199.

H. Ding et al., "Tensile deformation behavior analysis of low density Fe—18Mn—10Al—xC steels", Mater. Sci. Eng. A, 652 (2016) 69-76.

S. G. Peng et al., "Abrasive wear behaviors of lightweight austenitic Fe—24Mn—7Al—1C steel and Mn13Cr2 steel", J. Iron Steel Res. Int., 23 (2016) 857-866.

J. Moon et al., "Microstructure evolution and age-hardening behavior of microalloyed austenitic Fe—30Mn—9Al—0.9C light-weight steels", Metall. and Mater. Trans. A, 48 (2017) 4500-4510.

Z. Y. Huang et al., "Reitveld refinement, microstructure, mechanical properties and oxidation characteristics of Fe—28Mn—xAl—1C (x=10 and 12 wt.%) low-density steels", J. Iron and Steels Res. Intern., 24 (2017) 1190-1198.

C. Haase et al., "On the deformation behavior of κ-carbide-free and κ-carbide-containing high-Mn light-weight steel", Acta Mater., 122 (2017) 332-343.

J. Xing et al., "An overview of the effects of alloying elements on the properties of lightweight Fe—(15-35)Mn—(5-12)Al—(0.3-1.2)C steel", JOM, 70 (2018) 929.

J. Lee et al., "Simulation of κ-carbide precipitation kinetics in aged low-density Fe—Mn—Al—C steels and its effects on strengthening", Metals and Mater. Int., 24 (2018) 702-710.

S. W. Park et al., "Effect of Mn and C on age hardening of Fe—Mn—Al—C lightweight steels", Metals & Mater. Int., 25 (2019) 683-696.

J. Pang et al., "Tensile behavior and deformation mechanism of Fe—Mn—Al—C low density steel with high strength and high plasticity", Metals, 9 (2019) 897, 8 pages.

L. Bartlett et al., "High manganese and aluminum steels for the military and transportation industry", JOM, 66 (2014) 1770, 15 pages.

W. Evans et al., "Investigation of hot cracking phenomena in lightweight armor steel based on the FeMnAlC alloy system", 2018 NDIA GVSET symposium, Aug. 7-9, 2018, Novi, Michigan, 10 pages.

C. P. Chou et al. "The influence of carbon content on austenitic-ferrite morphology in Fe—Mn—Al weld metals", Metall. Trans. A, 20 (1989) 2559-2561.

C. P. Chou et al., "Effects of carbon on the weldability of Fe—Mn—Al alloys", J. Mater. Sci., 25 (1990) 1491-1496.

R. A. Howell et al., "Fe—Mn—Al—C Alloy Steels—A New Armor Class", SAE International, 2017; doi: 10.4271/2017-01-1703, 8 pages.

J. Moon et al., "Microstructure evolution and age-hardening behavior of microalloyed austenitic Fe—30Mn—9Al—0.9C light-weight steels", Metall. Mater. Trans. A, 48 (2017) 4500, 11 pages.

K. Sebeck et al., "High Mn, High Al steels forthick plate armor applications", 2018 NDIA GVSET symposium, Aug. 7-9, 2018, Novi, Michigan, 11 pages.

G. Ozer et al., "Properties of AA7075 aluminum alloy in aging and retrogression and re-aging process", Trans. Nonferrous Met. Soc., 27 (2017) 2357-2362.

J. Z. Liu et al., "Revisiting the precipitation sequence in Al—Zn—Mg-based alloys by high-resolution transmission electron microscopy", Scripta Mater., 63 (2010) 1061-1064.

B. Çevik, "Gas tungsten arc welding of 7075 aluminum alloy: microstructure properties, impact strength, and weld defects", Mater. Res. Express, 5 (2018) 066540, 10 pages.

B. Hu et al., "Microstructure and mechanical properties of AA7075(T6) hybrid laser/GMA welds", Mater. Sci. Eng. A, 459 (2007) 94-100.

G. Ipekoglu et al., "Formation of weld defects in cold metal transfer arc welded 7075-T6 plates and its effect on joint performance", IOP Conf. Series: Mater. Sci. Eng., 629 (2019) 012007, 9 pages.

M. Sokoluk et al., "Nanoparticle-enabled phase control for arc welding of unweldable aluminum alloy 7075", Nat. Comm., 10 (2019) 98; doi:10.1038/s41467-018-07989-y, 8 pages.

S. Jeong et al., "Precipitation behavior and its effect on mechanical properties in weld heat-affected zone in age hardened FeMnAlC lightweight steels", Mater. Sci. Eng. A, 742 (2019) 61-68.

Chin, Matthew, "Nanotechnology enables engineers to weld previously un-weldable aluminum alloy," Science + Technology, Jan. 24, 2019, 2 pages.

* cited by examiner

WELDING FILLER WIRE FOR FUSION WELDING PRECIPITATION-HARDENED AUSTENITIC FE—MN—AL—C ALLOYS

BACKGROUND OF THE INVENTION

Field of the Invention

The invention relates to disclosure of innovative welding filler wires for joining components made of precipitation-hardened lightweight Fe—Mn—Al—C alloys, in particular, by fusion welding utilizing gas tungsten arc welding (GTAW) and gas metal arc welding (GMAW).

Description of the Prior Art

Precipitation hardening (or age hardening) is the heat treatment technique used to increase the yield strength (YS) and hardness of malleable alloys, such as the strongest 7xxx-series aluminum alloys (e.g. AA7075), the precipitation-hardened stainless steels, and the precipitation-hardened austenitic Fe—Mn—Al—C alloys, etc. The precipitation-hardening process involves three basic steps: solution-heat-treatment (SHT), quenching and aging. The first step (SHT) is to heat the alloy to a temperature above the solvus temperature and soak there until a homogeneous "single-phase" solid solution is produced. The second step (quenching) is to cool the solid solution rapidly from the SHT temperature to room temperature for forming a supersaturated solid solution. In the as-quenched state, the microstructure of the alloy is a "single-phase" supersaturated solid solution without any precipitates. As a result, although in the as-quenched state the alloy may possess good combination of ultimate tensile strength (UTS) and elongation (El), but the yield strength (YS) is always unsatisfactorily low. However, when the supersaturated solid solution is heated to a temperature below the solvus temperature and aged at that temperature for an optimal period of time, high-density of nano-sized precipitates will form coherently (or semicoherently) and distributed uniformly within the matrix. The high-density of nano-sized and uniformly dispersed coherent (or semicoherent) second phase precipitates then act as effective obstacles to dislocation movement, and thereby drastically increase the strength (especially YS) and hardness of the alloys without significant loss in ductility. In other words, in order to obtaining the optimal combination of mechanical strength, especially with much enhanced YS, hardness and El, the high-density of nano-sized precipitates coherently (or semicoherently) precipitated within the matrix is the most essential ingredient.

Recently, owing to their remarkable combination of mechanical strength and ductility, the fully austenitic precipitation-hardened lightweight Fe—Mn—Al—C alloys have been regarded as one of the most promising materials for widespread applications in fields such as automotive, armor, mining industries, etc. In particular, the addition of Al further offers another prominent advantage of significant density reduction (~1.3-1.5% density reduction per 1 wt. % Al addition) over conventional high-strength steels, which is expected to bring in profound impact on energy saving and carbon dioxide reductions.

According to extensive previous studies, it is obvious that for this class of alloys to exhibit optimal combination of strength (especially YS) and ductility, the typical microstructure should be essentially composed of a fully austenitic matrix at room temperature and a substantial amount of nano-sized $(Fe,Mn)_3AlC$ carbides (κ-carbide) precipitated within the austenite matrix. The κ-carbide has an ordered face-centered cubic (FCC) $L'1_2$ crystal structure. It has also been well documented that Mn is a strong austenite-stabilizing element while Al and C are the essential elements for forming the κ-carbide. The former leads the alloys to possess ductile face-centered cubic (FCC) crystalline structure at room temperature required for high ductility and the latter provides the main strengthening precipitates (κ-carbides) in this class of alloys. Thus, in order to have an outstanding combination of strength and ductility for the precipitation-hardened austenitic Fe—Mn—Al—C alloys, the Mn content in the precipitation-hardened austenitic Fe—Mn—Al—C alloys is preferably larger than 18 wt. % such that the alloy can possess a fully FCC austenitic matrix at room temperature, while the contents of Al and C are simultaneously larger than ~7 wt. % and ~0.7 wt. %, respectively. A number of recent investigations have indicated that, when the austenitic Fe—Mn—Al—C alloys with a chemical composition in the range of Fe-(17.45~35.0)Mn-(7.1~12)Al-(0.7~1.2)C (Note: all the chemical compositions of alloys quoted hereafter in the present invention is in wt. %, unless otherwise specified.) were hot-rolled or hot-forged, solution heat-treated (SHT) at 1050~1200° C. for 1~2 hrs, and then rapidly quenched to room temperature water or oil, the resultant microstructure is single austenite (γ-phase) without any precipitates. Depending on the chemical composition, the yield strength (YS), ultimate tensile strength (UTS), elongation (El), and microhadness of the as-quenched alloys were in the range of 350~540 MPa, 700~1000 MPa, 56~72%, and 200~230 Hv, respectively. Although such as-quenched alloys are having exceptional ductility and good tensile strength, unfortunately the YS are still relatively low. In order to improve the mechanical strength, in particular YS, of the alloys, subsequent aging treatments to facilitate the precipitation of nano-sized κ-carbides within the γ-matrix are indispensable. Since the κ-carbide is rich in carbon and aluminum, the precipitation of κ-carbides from the supersaturated austenite matrix inevitably involves diffusion process of large amount of carbon and relevant alloying elements. Consequently, optimized moderate aging time and/or higher aging temperature are usually required. Previous reports indicated that the optimal combination of strength and ductility for the lightweight Fe—Mn—Al—C alloys could be obtained by aging at 550~600° C. for 15~40 hrs. Depending on the alloy compositions, the YS, UTS and hardness of the optimally aged Fe—Mn—Al—C alloys can reach 680~990 MPa, 995~1180 MPa, and 350~400 Hv, respectively, with El still being maintained in the range of 55~26.0%. According to the investigations reported in the prior art, the UTS of the optimally aged Fe—Mn—Al—C (with C≤1.2 wt. %), comparing with that in the SHT and quenched state, exhibited an enhancement of about 180~295 MPa (18~42%), whereas the YS increased about 330~450 MPa (83~94%). This clearly indicates the prominent role played by precipitation hardening in enhancing the YS and microhardness of the alloys. It is worthwhile to note that further prolonged aging treatments frequently resulted in formation of coarse κ-carbide, ferrite (α), $DO_3$, and β-Mn phases on the austenite grain boundaries, which are all detrimental to the ductility of the alloys.

In order to better describe the important essences involved in the development of the class of precipitation-hardened lightweight austenitic Fe—Mn—Al—C alloys, we will elaborate few selective examples published in recent years in more details below, which showed marked improvement in mechanical strength, especially in YS, while maintaining a good ductility (El>25%). Gutierrez-Urrutia and Raabe reported that when the Fe-30.5Mn-8.0Al-1.2C alloy was hot-rolled and SHT at 1100° C. for 2 hrs, followed by water quenching, and then aged at 600° C. for 24 hrs, it could possess YS, UTS, and El of 990 MPa, 1180 MPa, and 37%, respectively. Such remarkable mechanical strength enhancement was attributed to the high volume fraction of uniformly distributed nano-sized κ-carbides precipitated coherently within the austenite matrix during aging. Similarly, Wu et al. reported that the Fe-26Mn-10Al-1.0C alloy after being hot-rolled and SHT at 1100° C. for 1 hr followed by cold-rolling and annealed at 1000° C. for 15 minutes then quenched, the obtained microstructure was single austenite phase (γ-phase) without any precipitates and the YS, UTS, and El were 485 MPa, 820 MPa, and 72%, respectively. After being aged at 550° C. for 40 hrs, the resultant microstructure of the alloy became γ+κ-carbides, wherein the volume fraction of the uniformly distributed κ-carbides within the austenite matrix reached ~43%. Remarkably, the mechanical properties of the alloy were further improved to have YS, UTS, and El of 955 MPa, 1040 MPa, and 38.2%, respectively. Compared to the mechanical property of the alloy in as-quenched condition, it is clear that the high-density of κ-carbides precipitation facilitated by aging treatment at 550° C. for 40 hrs could improve the UTS by 26.8%, while drastically improve the YS by as high as 96.9%. In yet another recent example, Haase et al. reported that the Fe-29.8Mn-7.65Al-1.11C alloy after being hot-rolled, SHT at 1150° C. for 5 hrs and quenched, the as-quenched microstructure was single-phase austenite without any precipitates. The YS, UTS, and El of the as-quenched alloy were 540 MPa, 840 MPa, and 56%, respectively. When the as-quenched alloy was aged at 550° C. for 15 hrs, the microstructure became primarily γ+densely distributed nano-sized κ-carbides within the austenite matrix. The YS, UTS and El were 880 MPa, 995 MPa and 26%, respectively. While retaining a good elongation of 26%, the YS and UTS could improve by about 63% and 18.5%, respectively. It appears that long aging time (up to 15~40 hrs) at 550~600° C. has been the common practice for obtaining sufficient amount of nano-sized κ-carbides precipitated within the γ-matrix while keeping the grain boundaries free of any precipitates and/or second phases, which gives rise to the hotly pursued high-strength (especially YS) and high-ductility combination in these precipitation-hardened lightweight austenitic Fe—Mn—Al—C alloys.

In contrast to the representative references cited above wherein the carbon contents of the Fe—Mn—Al—C alloys were all below 1.2 wt. %, two recent US patents, U.S. Pat. No. 9,528,177 B2/2016 and U.S. Pat. No. 10,167,528 B2/2019 both by the present inventor Tzeng-Feng Liu, disclosed a series of newly designed Fe—Mn—Al—C alloys comprising of (23-34)Mn, (6-12)Al, and (1.4-2.2)C with the balance being Fe. One of the outstanding features exhibited by this alloy series was that, after being hot-rolled and SHT at 980~1200° C. for 1 hr, then followed by rapid quenching to room-temperature water or ice water, the as-quenched microstructure already contains high-density of nano-sized κ-carbides formed within the austenite matrix by spinodal decomposition during quenching. This feature is in sharp contrast to that reported for austenitic Fe—Mn—Al—C alloys containing less than 1.2 wt. % C, in that no κ-carbide was observed in the SHT and quenched condition. The formation of high-density of nano-sized κ-carbides during quenching has brought in at least two significant effects. Firstly, the combination of mechanical strength, especially YS, and ductility of the alloys in the as-quenched condition was significantly improved, with YS, UTS, and El being of 865~925 MPa, 1030~1155 MPa, and 50~65%, respectively. Secondly, the pre-existing high-density of nano-sized κ-carbides within the austenite matrix allow the alloys to attain optimum mechanical property combination with relatively shorter aging time and lower aging temperatures as compared to the abovementioned Fe—Mn—Al—C alloys with the carbon content lower than 1.2 wt. %. Take the Fe-28.6Mn-9.84Al-2.05C alloy as an example in Liu's disclosure. In as-quenched condition, a high-density of nano-sized κ-carbides was readily formed within the austenite matrix by spinodal decomposition during quenching and no precipitate was observed on the grain boundaries. The volume fraction and average size of the κ-carbides were about 45% and 12 nm, respectively. The YS, UTS and El of the as-quenched alloy were 912 MPa, 1123 MPa and 52.5%, respectively. When the as-quenched alloy was aged at 450° C. for 6 hrs, the volume fraction and average size of the κ-carbides were increased to 53% and 25 nm, respectively. Under this circumstance, the YS, UTS and El of the alloy were 1179 MPa, 1306 MPa and 39.8%, respectively.

From the abovementioned representative cutting-edge research examples in this field and the quoted US patents, it is apparent that the high-density of nano-sized κ-carbides formed within the γ-phase matrix is playing essential role in enhancing the mechanical strength, in particular in yield strength, of the alloys while still maintain excellent ductility. In particular, the pre-existing nano-sized κ-carbides formed within the austenite matrix during quenching disclosed in Liu's patents had been demonstrated to grow evenly without provoking long distance diffusion of Al and C, which has improved the effectiveness of aging treatment significantly. Obviously, this class of precipitation-hardened lightweight austenitic Fe—Mn—Al—C alloys will be the highly anticipated future materials viable for widespread applications in automotive industry, high-performance structural materials for military vehicles, as well as for shipbuilding and aviation. However, it is noted that, in order to realize the promised widespread potential applications, joining different components made of these high-strength high-ductility precipitation-hardened austenitic Fe—Mn—Al—C alloys is of paramount importance. Surprisingly, despite of the extremely urgent demands, information concerning the weldability issues of the precipitation-hardened austenitic Fe—Mn—Al—C alloys is extremely scarce. The reason for this, as will be discussed in more detailed later, appears to be very common to all precipitation-hardened alloys, such as the high-strength 7xxx-series aluminum alloys, which can be briefly summarized as following. (1) Since fusion welding involves re-melting, re-solidification and redistribution of the alloying elements, the microstructure of the weld metal (fusion zone, FZ) can be vastly different from that of the original base material. Specifically, in addition to the dendritic microstructure and element segregation, the main strengthening precipitates obtained from SHT and aging treatments will be completely dissolved and the as-welded weldments will lose much of its mechanical strength. Consequently, after fusion welding the hardness of the FZ in the as-welded weldment has been always severely decreased. (2) Similarly, strengthening precipitates dissolution and/or coarsening along with grain growth will occur in the heat-affected-zone (HAZ) of the weldment due to high heat input during welding, resulting in substantial weakening of the weldment. (3) Generally, the precipitation-hardened alloys usually contain large amount of alloying elements. Thus, in addition to significant loss of mechanical strength, these alloys are often very prone to hot crackings during welding processes, such as solidification cracking formed along the welding path and liquation cracking formed in the vicinity of FZ/HAZ interface. As a matter of fact, we are aware of only 3 relevant reports, in which the microstructural evolution during fusion welding and resulting mechanical properties were evaluated on the alloys with the chemical compositions lying within the precipitation-hardened austenitic Fe—Mn—Al—C alloys relevant to the present invention.

The following publications gave more detailed descriptions and discussions of the abovementioned characteristics and features.

[1] A. J. Ardell, "Precipitation Hardening", Metall. Trans., 16A (1985) 2131-2165. [2] "Precipitation hardening of aluminum alloys", Totalmateria, 2010. [3] I. Gutierrez-Urrutia, D. Raabe, "Influence of Al content and precipitation state on the mechanical behavior of austenitic high-Mn low-density steels", Scripta Mater., 68 (2013) 343-347. [4] Z. Q. Wu, H. Ding, X. H. An, D. Han, X. Z. Liao, "Influence of Al content on the strain-hardening behavior of aged low density Fe—Mn—Al—C steels with high Al content", Mater. Sci. Eng. A, 639 (2015) 187-191. [5] W. Song, W. Zhang, J. von Appen, R. Dronskowski, W. Bleck, "κ-phase formation in Fe—Mn—Al—C austenitic steels", Steel Res. Intern., 86 (2015) 1161-1169. [6] K. Lee, S. J. Park, J. Moon, J. Y. Kang, T. H. Lee, H. N. Han, "β-Mn formation and aging effect on the fracture behavior of high-Mn low-density steels", Scripta Mater., 124 (2016) 193-197. [7] E. Welsch, D. Ponge, S. M. Hafez Haghighat, S. Sandlöbes, P. Choi, M. Herbig, S. Zaefferer, D. Raabe, "Strain hardening by dynamic slip band refinement in a high-Mn lightweight steel", Acta Mater., 116 (2016) 188-199. [8] H. Ding, D. Han, J. Zhang, Z. Cai, Z. Wu, M. Cai, "Tensile deformation behavior analysis of low density Fe-18Mn-10Al-xC steels", Mater. Sci. Eng. A, 652 (2016) 69-76. [9] S. G. Peng, R. B. Song, Z. D. Tan, C. H. Cai, K. Guo, Z. H. Wang, "Abrasive wear behaviors of lightweight austenitic Fe-24Mn-7Al-1C steel and Mn13Cr2 steel", J. Iron Steel Res. Int., 23 (2016) 857-866. [10] J. Moon, S. J. Park, C. Lee, H. N. Han, T. H. Lee, C. H. Lee, "Microstructure evolution and age-hardening behavior of microalloyed austenitic Fe-30Mn-9Al-0.9C light-weight steels", Metall. and Mater. Trans. A, 48 (2017) 4500-4510. [11] Z. Y. Huang, A. L. Hou, Y S. Jiang, P. Wang, Q. Shi, Q. Y. Hou, X. H. Liu, "Reitveld refinement, microstructure, mechanical properties and oxidation characteristics of Fe-28Mn-xAl-1C (x=10 and 12 wt. %) low-density steels", J. Iron and Steels Res. Intern., 24 (2017) 1190-1198. [12] C. Haase, C. Zehnder, T. Ingendahl, A. Bikar, F. Tang, B. Hallstedt, W. Hu, W. Bleck, D. A. Molodov, "On the deformation behavior of κ-carbide-free and κ-carbide-containing high-Mn light-weight steel", Acta Mater., 122 (2017) 332-343. [13] J. Xing, Y. Wei, L. Hou, "An overview of the effects of alloying elements on the properties of lightweight Fe-(15-35)Mn-(5-12)Al-(0.3-1.2)C steel", JOM, 70 (2018) 929. [14] J. Lee, S. Park, H. Kim, S. J. Park, K. Lee, M. Y. Kim, P. P. Madakashira, H. N. Han, "Simulation of κ-carbide precipitation kinetics in aged low-density Fe—Mn—Al—C steels and its effects on strengthening", Metals and Mater. Int., 24 (2018) 702-710. [15] S. W. Park, J. Y Park, K. M. Cho, J. H. Jang, S. J. Park, J. Moon, T. H. Lee, J. H. Shin, "Effect of Mn and C on age hardening of Fe—Mn—Al—C lightweight steels", Metals & Mater. Int., 25 (2019) 683-696. [16] J. Pang, Z. Zhou, Z. Zhao, D. Tang, J. Liang, Q. He, "Tensile behavior and deformation mechanism of Fe—Mn—Al—C low density steel with high strength and high plasticity", Metals, 9 (2019) 897. [17] Tzeng-Feng Liu, "Composition design and processing methods of high strength, high ductility and high corrosion resistance FeMnAlC alloys", U.S. Pat. No. 9,528,177 B2/2016. [18] Tzeng-Feng Liu, "Composition design and processing methods of high strength, high ductility and high corrosion resistance FeMnAlC alloys", U.S. Pat. No. 10,167,528 B2/2019. [19] L. Bartlett, D. Van Aken, "High manganese and aluminum steels for the military and transportation industry", JOM, 66 (2014) 1770. [20] W. Evans, A. J. Ramirez, K. Sebeck, "Investigation of hot cracking phenomena in lightweight armor steel based on the FeMnAlC alloy system", 2018 NDIA GVSET symposium, Aug. 7-9, 2018, Novi, Mich.

To the best of our knowledge, C. P. Chou and C. H. Lee were probably the first to study the welding of alloys with chemical compositions lying within the precipitation-hardened austenitic Fe—Mn—Al—C alloys in 1989. In their study, the influence of carbon content on the solidification microstructural evolutions in the FZ of two fully austenitic alloys (Fe-30Mn-8.9Al-1.29C and Fe-29Mn-9.0Al-1.0C) after autogenous gas tungsten arc welding (GTAW) were examined. Autogenous weld is a form of welding, where the filler material is either supplied by melting the base materials, or is of identical composition. Both alloys were produced by air induction melting, casting, hot-forged at 1200° C., homogenized at 1050° C. for 12 hrs, cold-rolled, and then annealed at 950° C. for 1 hr. The thickness of the examined alloys was ⅛ inch. Prior to welding both base alloys had fully austenitic structure. In their study, it was found that the carbon content was having significant effects on the microstructure and morphology in FZ of the weld metal. For the Fe-30Mn-8.9Al-1.29C alloy, the FZ of the weld is fully austenitic (<1 vol. % ferrite) with cellular γ-dendrite and some κ-carbides existing within the eutectic regions. In this case, the microstructure of FZ exhibited typical multi-branch dendritic structure with the primary dendrite extending over few hundred micrometers (>300 μm) in length and the secondary dendrite arms were typically 20~40 μm in length. It is noted that, except for a small amount of eutectic κ-carbides, there was no κ-carbides or other precipitates within the primary and secondary dendrite cells, presumably due to the rapid solidification during the welding process. As the carbon content was decreased to 1.0 wt. %, a substantial amount of ferrite phase (~10.2 vol. %) could be observed in the FZ, locating mainly between the secondary austenitic dendrite arms. Obviously, the weldment resulting from the fusing welding process is no longer a homogeneous structure and cannot be fully characterized by base material properties. Unfortunately, in this study, there was no mentioning on the mechanical properties of the weldment.

In 1990, Chou and Lee subsequently reported the microstructure and mechanical property characteristics of two austenitic alloys (Fe-29.3Mn-8.6Al-0.81C and Fe-29Mn-8Al-1.17C) after being welded by butt-joint autogenous GTAW process. Hereafter, they will be referred as 0.81C and 1.17C, respectively. The base alloys were prepared in a vacuum induction furnace. The as-cast alloys were subsequently hot-forged to 8 mm thick at 1200° C., then homogenized at 1050° C. for 12 hrs. The homogenized billets were cold-rolled to 4 mm-thick plates and annealed at 950° C. for 1 hr in an argon atmosphere, followed by water quenching. The microstructure of the as-quenched base alloys is fully austenitic. The UTS and El of the two as-quenched base alloys were 1040 MPa and 50% as well as 1080 MPa and 54% for 0.81C and 1.17C alloys, respectively. Comparing with the C1.2 wt. % Fe—Mn—Al—C alloys in the SHT and as-quenched state mentioned above, the combinations of UTS and El of these two alloys were right within the range. Unfortunately, the YS of these alloys were not reported. However, by judging from the fact that no κ-carbide was observed in the austenite matrix, it is plausible to expect that the YS of these two alloys should be very similar to those reported for SHT and quenched C1.2 wt. % Fe—Mn—Al—C alloys, namely 350~540 MPa as quoted above. After autogenous GTAW process, the microstructure of the butt-welded FZ was very similar to the general features of multi-branch dendritic structure described above. Namely, the primary dendrite extended over several hundred micrometers (>300 μm), and except for a small amount of eutectic κ-carbides, there was no κ-carbides or other precipitates existing in either the primary or secondary austenite dendrite cells. It was also observed that there were about 5 and 0.5 vol. % of ferrite phase existing in FZ for 0.81C and 1.17C alloys, respectively. After being post-welding heat-treated (PWHT) at 1050° C. for 52~40 min, there was still no precipitates existing in either the primary or secondary austenite dendrite cells. The tensile tests conducted on the PWHT butt-joint specimens showed that the UTS and El of the 0.81C could reach 930 MPa and 25%, while that for the 1.17C alloy were 900 MPa and 19%, respectively. It is evident that while the UTS of the as-welded Fe—Mn—Al—C weldment could retain nearly 90% UTS of the base alloys, the elongation was significantly deteriorated from 54% (base metal) to about 20%. Moreover, it is noted that, in this study, the YS of both the base alloys and butt-joint welded specimens were not investigated. However, as mentioned above, the absence of nano-sized precipitates within the austenite dendrite cells in the FZ would indicate low YS of the obtained weldment. These results are certainly inadequate to meet the requirements of enhancing the YS of weldments in the as-welded state. As a result, until 2017-2019, the development of specific welding fillers to be used for fusion welding the precipitation-hardened austenitic Fe—Mn—Al—C alloys was still considered as the most urgent task in this field.

Based on the two reports by Chou and Lee, there are a couple of points worthwhile to note here. (1) In their studies, the starting base alloys were all fully austenitic in SHT and as-quenched state. Namely, there was no κ-carbide necessary for strengthening the precipitation-hardened Fe—Mn—Al—C alloys existing within the austenite matrix. Specifically, fusion welding apparently has drastically altered the microstructure in FZ by turning homogeneous single-phase austenitic matrix into dendritic structure with accompanying formation of ferrite phase and eutectic phases (e.g. γ+κ-carbide) in the inter-dendrite regions. Moreover, there was no κ-carbide precipitated within the primary and secondary austenite dendrite cells in the FZ of the weldment. This clearly indicates that the microstructure in the FZ can be drastically different from that of the base alloys even both are having the same chemical compositions. Consequently, the mechanical properties of the resultant weldments are somewhat unpredictable by judging merely from the chemical compositions of the base alloys and welding fillers. (2) As mentioned above, the high-density of nano-sized κ-carbide uniformly distributed within the austenite matrix is essential for obtaining excellent combination of strength, especially YS, and ductility for this class of alloys. Thus, how fusion welding affects the evolution and distribution of κ-carbides in both FZ and HAZ during welding will determine the ultimate mechanical properties of the weldments. Intuitively, one may expect the situations could be very similar to that encountered in other classes of precipitation-hardened alloys, such as AA7075 Al alloys, wherein substantial softening occurs ubiquitously in FZ and HAZ. The primary reasons for the occurrence of substantial softening are due to the dissolution, coarsening and/or transformation to other less effective incoherent phase of strengthening nano-sized precipitates. Such issues have been remaining as the major challenges in joining virtually all classes of the precipitation-hardened alloys by fusion welding despite that extensive research and development have been devoted to resolve them for more than 50 years. However, as indicated by Howell and Gerth in 2017 and even to date, there is still no direct welding being formally conducted on the precipitation-hardened austenitic Fe—Mn—Al—C lightweight alloys "in the aged state". The lack of viable solutions for joining the aged precipitation-hardened austenitic Fe—Mn—Al—C alloys by fusion welding appears to become the major obstacle in preventing them from the promised wide spread applications in various industrial sectors.

As a first trial, in 2018, Sebeck et al. reported the welding results of a wrought age-hardened Fe-30Mn-9Al-1Si-0.9C-0.5Mo alloy by gas metal arc welding with double vee groove butt using the commercial 316LSi austenitic stainless steel (compositions: (11~14)Ni, (18~20)Cr, (1.0~2.5)Mn, (2.0~3.0)Mo, (0.65~1)Si, Fe balance) as the welding filler wire. The base material was hot-rolled at 1204° C. to ~12.7 mm (~0.5"), solution heat-treated (SHT) at 1050° C. for 2 hrs, quenched. The YS, UTS and El of the as-quenched base material were not reported, however, the hardness was ~210 Hv. After being aged at 538° C. for 30 hrs, the obtained microstructure of the base material was fully austenitic phase with visible κ-carbides forming both homogeneously within the austenite matrix and at the grain boundaries. The typical YS, UTS, El and hardness of the aged base material were 800 MPa, 827 MPa, 36% and ~360 Hv, respectively. In this study, since the filler metal used was 316LSi, the microstructure of FZ was not explicitly described and the YS and El of the resultant weldment were significantly reduced to 350~400 MPa and 23~5%, respectively, which is apparently still far from satisfactory. As a consequence, it has been emphasized in this study that: "Development of specific filler metals for the precipitation-hardened austenitic Fe—Mn—Al—C alloys is needed."

From the limited available literature and research reports cited above, it is clear that to date the researches conducted in this field are still lack of a comprehensive scheme and suitable welding fillers for resolving the welding issues encountered by the highly anticipated austenitic precipitation-hardened Fe—Mn—Al—C alloys. However, based on the fragmentary information acquired from these previous studies, one essential issue needs to be particularly considered. Due to the nature of rapid heating, re-melting, re-solidification and re-distribution of the alloying elements during fusion welding, the issues of controlling the microstructure evolution to avoid the occurrence of substantial softening in the fusion zone via specific alloying design of the filler wires has to be addressed. Especially, since the primary strengthening ingredient of the austenitic precipitation-hardened Fe—Mn—Al—C alloys is the high-density of nano-sized κ-carbides, which has been found to be drastically suppressed in the FZ austenite dendrite cells due to re-melting and rapid cooling. Thus, a control of this issue by using fillers with proper alloy design is of essential importance and is urgently required. Since the challenges faced in developing the filler metals for fusing welding the austenitic precipitation-hardened Fe—Mn—Al—C alloys are expected to be akin to that encountered by the precipitation-hardened Al-alloys, it will be heuristic to look into some of the major issues already encountered in fusion welding the precipitation-hardened Al-alloys.

Among the Al-alloys, the precipitation-hardened aluminum alloys 7075 (AA7075) have been the preferred material group in aircraft and space industries, as well as in military sector due to their excellent specific strength and fracture properties, and high-formability. The AA7075 typically contains a wide range of alloying elements with chemical compositions lying within Al-(5-6.5)Zn-(1.6-2.9)Mg-(1.2-2.0)Cu-(0-0.3)Mn-(0-0.28)Cr-(0-0.5)Fe-(0-0.15)Ti-(0-0.4)Si. The most widely used heat-treatment schemes to obtain the optimum mechanical properties of AA7075 Al alloys are T6 and/or T651. Here, T6 is the heat-treatment code commonly used for heat-treatable alloys, indicating processes including solution-heat-treatment (SHT) in the face-centered-cubic (FCC) structured α-solid-solution phase field, followed by rapid quenching to room temperature and subsequent artificial aging. For AA7075 Al alloys, the most common T6 practice for artificial aging is aging at 110~120° C. for 16~24 hrs. Alternatively, code T651 indicates that, subsequent to T6 treatment, the product is further subject to stress relief. The precipitation hardening process of the AA7075 Al alloys, as a function of aging temperature and time, can be summarized as follows: supersaturated α-solid-solution 4 GP zones 4 metastable η'-phase→equilibrium η-phase. The GP zones are fully coherent with the FCC-structured α-matrix, while the η' precipitates are semicoherent to the α-matrix and both are formed within aluminum grains. Owing to the coherent (or semicoherent) nature with the matrix, the existence of uniformly dispersed nano-sized GP zones and η' precipitates are mainly responsible for the age hardening and strengthening in this alloy system. Depending on the detailed compositions, typical YS, UTS, El and hardness, for AA7075 Al alloys after being treated with standard optimum T6 and/or T651 treatments are 459~539 MPa, 510~597 MPa, 8.5~14.6%, and 157~180 Hv, respectively.

Prolonged aging time and/or raising the aging temperature (i.e. overaging) will promote the equilibrium η precipitates to form at the dispersoids/matrix interfaces and grain boundaries heterogeneously at the expense of disappearing GP zones and η' precipitates. Since the η precipitates not only are much more coarsened but also are incoherent with the matrix, overaging inevitably results in substantial decrease in hardness, mechanical strength and ductility.

However, despite of extensive research and development on fusion welding for the precipitation-hardened AA7075 alloys over the last several decades, no comprehensive solutions have yet been developed for solving the problems, such as significant strength (hardness) loss in the FZ, solidification and liquation crackings taking places along the direction of welding passes and FZ/HAZ interface, as well as porosity etc., commonly encountered when using conventional fusion welding to weld AA7075 alloys. In the following, we briefly summarize the most updated results addressing on these issues reported in a few recently published representative efforts using either autogenous and/or welding fillers made of dissimilar materials.

As mentioned above, after being treated by standard T6 and/or T651 processes the matrix of the AA7075 base materials contains a high-density of nano-sized GP zones and η'-precipitates within the matrix. However, regardless of autogenous or dissimilar fillers (e.g. ER5356 (Al-(4.5-5.5 wt. %)Mg, ER4043 (Al-(4.5-6.0 wt. %)Si being used, after fusion welding, the microstructure of FZ was generally composed of typical dendritic structure with a small amount of large eutectic precipitates (e.g. lamellar η $Mg(ZnCuAl)_2$ and θ ($Al_2Cu$)) within the eutectic regions and the hardening nano-sized GP zones and the η'-precipitates originally existing in the base material were completely dissolved in the FZ, whereas in the HAZ the hardening GP zones and η'-precipitates were either dissolved or turned into lesser hardening η-precipitates. As a result, the FZ and HAZ of the weldment in the as-welded condition were softened substantially and could reach only about 50-67% and 67-87% of the original hardness of the base material. Evidently, the extent of softening in FZ appears to be more pronounced than that in HAZ. Also, since the redistribution of the alloying elements during the fusion welding process, post welding heat treatment apparently cannot effectively modify the alloy microsegregation behavior, thus the weld fusion zone remains as the weakest region in both as-welded and post-welding aged conditions. Moreover, due to high heat input-induced thermal stress and solidification shrinkage, "solidification cracks" were always detected in the weld zone during autogenous fusion welding. To this respect, in order to mitigate the occurrence of solidification cracking, dissimilar filler materials were commonly used to heavily dilute the crack sensitivity. However, by diluting the crack sensitivity with dissimilar filler materials, the concentration of strengthening alloying components originally existing in AA7075 decreases, which not only significantly decreases the as-welded strength (or hardness) and reduces the responsiveness to the post welding heat treatment, but also often results in defects such as "liquation cracking" and porosity formed in the vicinity of fusion line (i.e. near the boundary between FZ and HAZ). As a result, owing to the abovementioned three major obstacles accompanying with the fusion welding, there has been almost no tensile test conducted in the as-welded AA7075 alloys. In fact, until very recently (2019), precipitation-hardened AA7075 alloys are still considered as "unweldable" by conventional fusion welding.

In order to further address the fusion welding-induced cracking issues in AA7075, very recently (2019) two investigations were reported. Ipekoglu and cam used ER5356 filler and the cold metal transfer GMAW (CMT-GMAW) method to weld the 2 mm-thick AA7075-T6 plates. The main features of CMT process are the controllability of material deposition and low thermal input, thus, can presumably suppress the formation of hot cracks. However, although the cracks were absent, they observed that large pores were generated in FZ. In addition, complete dissolution of nano-sized GP-zones and η' precipitates in FZ, as well as η'→η transformation in HAZ were observed. As a result, the YS, UTS, El, and hardness were drastically deteriorated from 539 MPa, 597 MPa, 14.6%, and 175 Hv for the original AA7075-T6 base material to immeasurable (i.e. no YS), 312 MPa, 0.03%, and 65 Hv (only about 37.1% of the base material), respectively. The significant amount of large pores in the weldment is believed to be responsible for the brittle fracture. It appears that, although the CMT method has the advantage of repairing the cracks induced by fusion welding, the problems of porosities, drastic loss of ductility (elongation) and severe softening remain unresolved.

On the other hand, in 2019 Sokoluk et al. used a newly developed welding filler for welding AA7075 alloys by blending ~1.7 vol. % of TiC nanoparticles (size ~40-60 nm) into an AA7075 alloy (Al-6.4Zn-3.2Mg-1.2Cu-0.15Cr). They reported that the addition of TiC nanoparticles to the welding filler has evidently resulted in the following very important features. (1) During solidification process after arc welding, the presence of TiC nanoparticles significantly decelerates the solidification on front and therefore reduces the speed of dendritic grain growth. This decelerated dendritic grain growth in turn enables the resulting solidification microstructure of the FZ to become fine globular grains instead of directional and long dendritic grains commonly seen in typical fusion welding. (2) During the solidification process, TiC nanoparticles stay within the Mg(Zn, Cu, Al)$_2$ secondary phases (eutectic). As a result, the size, shape and distribution of the secondary phases existing within the eutectic regions are effectively modified. The absence of directional dendritic grain growth and modification of the secondary phase within the eutectic regions thus intrinsically eliminated the hot cracking susceptibility of the AA7075 alloys. The TiC nanoparticle treated welding filler appeared to have resolved the two insurmountable challenges, namely hot cracking and porosity, encountered in fusion welding the AA7075 alloys for more than 70 years. The remarkable results have been claimed as an unprecedented breakthrough in fusion welding AA 7075 and appear to make AA 7075 to be "weldable". However, in this study, tensile tests indicated that the weldment in the as-welded condition the UTS and El are only 392 MPa and 1.5%, respectively. While the PWHT carried out by SHT at 480° C. and artificial aging at 120° C. for 19 hrs has evidently improved the UTS and El to 551 MPa and 5.21%, respectively. The obtained the El of the as-welded and PWHT weldment (i.e. 1.5% and 5.21%, respectively), apparently, are both still far below the typical El (~8.5-14.6%) of T6-AA7075 base material. Moreover, it is noted that, in this study, the YS of the as-welded and PWHT weldment was not reported. From the FZ microstructure reported in this study, it is evident that the FZ of both as-welded and PWHT weldment is composed of vast majority of α-dendrites and some minor amount of eutectics. More importantly, there are no any precipitates existing within the α-dendrite cells in the FZ. Based on the strengthening mechanism of precipitation-hardened alloys described above, the absence of precipitates within the majority portion of the FZ would inevitably lead to severe softening and significantly affect the YS of the weldment. Thus, it is obvious that, due to the commonly encountered issues of FZ softening, solidification cracking, liquation cracking and formation of porosity, fusion welding the precipitation-hardened AA7075 aluminum alloys has remained as the most challenging task in this field.

Nevertheless, the particular example mentioned above strongly suggests that proper alloy design of the welding filler is also essential for welding the precipitation-hardened austenitic Fe—Mn—Al—C alloys. The following embodiments disclosed in the present invention evidently illustrate that, by properly designing the chemical compositions of the welding filler wires, all the outstanding issues encountered in fusion welding the precipitation-hardened austenitic Fe—Mn—Al—C alloys can be simultaneously resolved. Namely, by using the welding fillers disclosed in the present invention, excellent hardness, strength (especially YS) and ductility in the FZ of the as-welded weldment can be obtained without the formation of solidification and liquation cracks, as well as porosity.

The following publications gave more detailed descriptions and discussions of the abovementioned characteristics and features.

REFERENCES

[21] C. P. Chou and C. H. Lee, "The influence of carbon content on austenitic-ferrite morphology in Fe—Mn—Al weld metals", Metall. Trans. A, 20 (1989) 2559-2561. [22] C. P. Chou and C. H. Lee, "Effects of carbon on the weldability of Fe—Mn—Al alloys", J. Mater. Sci., 25 (1990) 1491-1496. [23] R. A. Howell, R. J. Gerth, "Fe—Mn—Al—C Alloy Steels—A New Armor Class", SAE International, 2017; doi: 10.4271/2017-01-1703. [24] J. Moon, S. J. Park, C. Lee, H. N. Han, T. H. Lee, C. H. Lee, "Microstructure evolution and age-hardening behavior of microalloyed austenitic Fe-30Mn-9Al-0.9C light-weight steels", Metall. Mater. Trans. A, 48 (2017) 4500. [25] K. Sebeck, I. Toppler, M. Rogers, R. Howell, K. Limmer, B. Cheeseman, W. Herman, "High Mn, High Al steels for thick plate armor applications", 2018 NDIA GVSET symposium, Aug. 7-9, 2018, Novi, Mich. [26] G. Ozer and A. Karaaslan, "Properties of AA7075 aluminum alloy in aging and retrogression and re-aging process", Trans. Nonferrous Met. Soc., 27 (2017) 2357-2362. [27] J. Z. Liu, J. H. Chen, X. B. Yang, S. Ren, C. L. Wu, H. Y Xu, and J. Zhou, "Revisiting the precipitation sequence in Al—Zn—Mg-based alloys by high-resolution transmission electron microscopy", Scripta Mater., 63 (2010) 1061-1064. [28] B. çevik, "Gas tungsten arc welding of 7075 aluminum alloy: microstructure properties, impact strength, and weld defects", Mater. Res. Express, 5 (2018) 066540. [29] B. Hu and I. M. Richardson, "Microstructure and mechanical properties of AA7075(T6) hybrid laser/GMA welds", Mater. Sci. Eng. A, 459 (2007) 94-100. [30] G. Ipekoglu and G. çam, "Formation of weld defects in cold metal transfer arc welded 7075-T6 plates and its effect on joint performance", IOP Conf. Series: Mater. Sci. Eng., 629 (2019) 012007. [31] M. Sokoluk, C. Cao, S. Pan, X. Li, "Nanoparticle-enabled phase control for arc welding of unweldable aluminum alloy 7075", Nat. Comm., 10 (2019) 98; doi:10.1038/s41467-018-07989-y.

SUMMARY OF THE INVENTION

As mentioned in the Background section, precipitation hardening (or age hardening) is one of the most effective means in enhancing the yield strength (YS) and hardness of malleable alloys. In general, precipitation-hardened (or age-hardened) alloys, such as the strongest AA7xxx-series Al alloys (e.g. AA7075), precipitation-hardened stainless steels and precipitation-hardened austenitic Fe—Mn—Al—C alloys, after SHT, quenching and optimal aging, a high-density of nano-sized precipitates will form coherently (or semi-coherently) within the matrix, hence giving rise to drastic enhancement in YS and hardness of the alloy without significant loss in ductility. However, as indicated in the prior art mentioned in the Background section, all of these strengthening nano-sized precipitates pre-existing (by aging) in the matrix will be completely dissolved during fusion welding. After fusion welding, the typical as-welded FZ microstructure is composed of vast majority of dendrite cells and some minor amount of eutectic regions. More importantly, there is no precipitate within the dendrite cells. As a result, the fusion welding has inevitably resulted in severe softening of the FZ. In addition, the FZ is also the region most susceptible to hot cracking effects (e.g. solidification and liquation cracking) and formation of porosities. As a matter of fact, for those acquainted with this field, these three major issues have been remaining as very challenging, if not insurmountable, obstacles yet to be resolved in fusion welding the precipitation-hardened alloys.

Likewise, a high-density of strengthening nano-sized κ-carbides was formed within the austenitic matrix in the precipitation-hardened austenitic Fe—Mn—Al—C alloys after SHT, quenching and aging. Due to the precipitation of the high-density of nano-sized κ-carbides within the austenitic matrix, the strength (especially YS) and hardness of the alloys were increased remarkably without significant loss in ductility. However, for fusion welding the precipitation-hardened austenitic Fe—Mn—Al—C alloys, similar to other precipitation-hardened alloys, challenges, such as severe softening in FZ, hot cracking (e.g. solidification and liquation cracks) and porosity, have been encountered and remained unresolved for decades. As pointed out by Moon et al. in 2017: ". . . the high carbon content (of precipitation-hardened austenitic Fe—Mn—Al—C alloy) has made it difficult to weld automotive structures and . . . an obstacle to its broader application." In 2017, Howell and Girth also indicated that: "To date, no welding has been formally conducted on (precipitation-hardened austenitic Fe—Mn—Al—C alloy) plate materials." In 2018, Sebeck et al. further pointed out: "The high manganese content of this alloy (precipitation-hardened austenitic Fe—Mn—Al—C alloy) presents challenge for welding . . . such as limited compatibility of weld wires . . . " In 2018 Evans et al. urged that: "Development of specific filler metals for the precipitation-hardened austenitic Fe—Mn—Al—C alloys is needed." It appears that the above statements remained as a general consensus in the field.

In order to overcome all of the unresolved outstanding problems encountered in fusion welding the precipitation-hardened austenitic Fe—Mn—Al—C alloys, the present inventor, based on decades of practical experiences in materials research, including alloy designs and technology developments of Fe—Mn—Al—C alloys, has carried out numerous of experiments on welding filler design and come up with the present innovative invention.

The Novel Features of the Present Invention

Using the welding filler wires disclosed in the present invention for fusion welding the precipitation-hardened austenitic Fe—Mn—Al—C alloys, the inventor clearly demonstrated the following unique features in the as-welded FZ microstructures and welding bead characteristics, which not only are unprecedented in any of the prior arts but also evidently resolved the issues of FZ softening and hot cracking completely.

(1) In the as-welded condition, there is a high-density of nano-sized (~3-5 nm) κ-carbides already existing within the austenite dendrite cells. This unprecedented structure is the most highlighting unique feature disclosed in the present invention. As a result, after fusion welding, the FZ, in the as-welded condition, can possess excellent hardness and strength, especially YS, comparable or even higher than those of the optimally aged Fe—Mn—Al—C alloys with C≤1.2 wt. %, as mentioned in the Background section. This result is completely different from those reported in the prior art concerning the fusion welding of the precipitation-hardened alloys (e.g. the AA7075 precipitation-hardened Al alloy, the precipitation-hardened stainless steels, and the precipitation-hardened Fe—Mn—Al—C alloys, etc.). In the prior art, fusion welding the precipitation-hardened alloys always resulted in the complete dissolution of the high-density of strengthening (or hardening) nano-sized precipitates originally existing within the matrix in the base material. In the as-welded condition, the FZ microstructure is mainly composed of vast majority of dendrite cells and some minor amount of eutectic regions. Even more noticeably, there was no any precipitate could be observed within the dendrite cells in the FZ in the as-welded condition, resulting in severe softening of the FZ.

(2) In the as-welded condition, within the austenite grains of FZ, there are nano-sized κ-carbides existing on the tip of the dendrite cells, which appear to retard the growth of the dendrite cells during solidification. As a result, the length and spacing of the austenite dendrite cells formed within the columnar austenite grains are only in the order of ~20-30 µm and ~5-10 µm, respectively, unlike those observed in fusion welded AA7075 and Fe—Mn—Al—C alloys, wherein, after fusion welding, the FZ microstructure usually contains large portion of long (>200-300 µm) primary dendrites. In addition, the amount of the nanosized (~6-10 nm) κ-carbides existing within the eutectic regions is much larger than that observed in previous reports for fusion welding Fe—Mn—Al—C alloys with C≤1.29 wt. %.

(3) By the addition of appropriate amount of Ti, Nb and V to the welding filler, in the as-welded condition, in addition to the high-density of nano-sized κ-carbides existing within the austenite dendrite cells and eutectic regions, there are a significant amount of nano-sized (~6-10 nm) Ti-rich Ti-carbides, Nb-rich Nb-carbides, V-rich V-carbides formed within the eutectic regions. These carbides are all having the same ductile face-centered-cubic (FCC) structure as the austenite. Moreover, the hardnesses of these carbides are extremely high, reaching ~2000-3500 Hv. As a consequence, the hardness of the FZ in the as-welded condition is substantially increased without significant loss in ductility.

(4) In the as-welded condition, all the phases existing in the FZ, including the matrix (austenite dendrites+eutectic regions) and all kinds of precipitates (including κ-carbides, Ti-rich Ti-carbides, Nb-rich Nb-carbides, V-rich V-carbides) are having the ductile face-centered-cubic (FCC) structure. In addition, the sizes of all kinds of precipitates are only ~3-10 nm. Consequently, tensile tests of the weldment demonstrate that the FZ in the as-welded condition exhibit excellent ductility.

(5) In the welding bead, within the FZ, and/or in the vicinity of FZ/HAZ interface, the problems of hot cracking (e.g. solidification crack and liquation crack) and porosity commonly encountered in fusion welding the precipitation-hardened alloys were completely eliminated by using the welding fillers disclosed in the present invention.

Owing to the abovementioned unique features and characteristics of the FZ microstructure obtained by using the welding filler wires disclosed in the present invention, the FZ of the fusion-welded weldment, in the as-welded condition, simultaneously possesses high-hardness, high-strength (in particular YS) and high-ductility. For instance, the average microhardness values of the ductile FZs obtained in the present invention are in the range of 365~465 Hv, which are either considerably larger or comparable to the values (350~400 Hv) reported for the Fe-(17.45~35)Mn-(7.1~12)Al-(0.7~1.2)C alloys after being hot-rolled, SHT, quenched and then optimally aged at 550° C.~600° C., as mentioned in the Background section.

In order to achieve the goals of having the abovementioned unique features in the as-welded FZ microstructures and welding bead characteristics, the present inventor has conducted comprehensive investigations in adjusting the innovative alloy designs for welding filler wires as well as varying all kinds of fusion welding parameters through numerous of experiments and analyses. According to the present invention, the chemical composition range for each alloying element should be as following: Mn (23-34 wt. %, preferably 24-32 wt. %); Al (7.5-11.5 wt. %, preferably 8.0-11.0 wt. %); C (1.35-1.95 wt. %, preferably 1.40-1.95 wt. %); Ti (0.0-2.5 wt. %, preferably 0.1-2.5 wt. %); Nb (0.0-3.0 wt. %, preferably 0.1-3.0 wt. %); V(0.0-2.5 wt. %, preferably 0.1-2.5 wt. %); the combination of Ti, Nb and V (0-3.0 wt. %, preferably 0.1-3.0 wt. %); with the balance being Fe. The primary reason leading to the abovementioned novel characteristics and unprecedented unique features obtained in the FZ of the as-welded welding bead disclosed in the present invention is relying on the profound in-depth studies on the effects of each alloying element, which are described in more details below.

(1) Mn: Mn is a strong austenite-stabilizing element, which is playing the most important role in maintaining the ductile FCC-structured phase. From the prior art it has been well established that the Fe—Mn—Al—C alloys with Mn>17.5 wt. %, after being hot-rolled, solution heat-treated and quenched, could result in fully austenitic microstructure at room temperature, as has been described in the Background section. However, in the embodiment Example 9 of the present invention, it is found that for welding filler wire with 20.1 wt. % Mn, after fusion welding in the as-welded condition, there are significant amount of ferrite phase, whose structure is body-centered-cubic (BCC), existing in the FZ of the welding bead. In order to obtain a fully austenitic FZ microstructure in the as-welded condition, the content of Mn in the welding filler wire has to be over 22 wt. %. Thus, in the welding filler wires disclosed in the present invention the concentration of Mn is set in the range of ~23-34 wt. %, preferably ~24-32 wt. %.

(2) Al: Al is one of the primary elements for forming (Fe,Mn)$_3$AlC carbides (κ-carbides). The κ-carbide, as described in the Background section, is the most prominent and effective ingredient for strengthening the precipitation-hardened Fe—Mn—Al—C alloys. Thus, the Al content in the welding filler wire is also playing an essential role for giving rise to the most unique feature of the present invention. Namely, after fusion welding, in the as-welded condition, there is a high-density of nano-sized κ-carbides existing within the austenite dendrite cells in the FZ. The present invention has designed a series of welding fillers with various Al concentrations and carried out comprehensive observations and analyses. The results indicated that when the Al concentration is less than 7.0 wt. %, in the as-welded condition, no κ-carbides formed within the austenite dendrite cells in the FZ. As the Al concentration in the welding filler was increased to above 7.5 wt. %, in the as-welded condition, a high-density of nano-sized κ-carbides could be readily observed within the austenite dendrite cells in the FZ. However, when the Al concentration in the welding filler was increased to 12 wt. %, it was found that, in addition to the high-density of nano-sized κ-carbides formed within the austenite dendrite cells and eutectic regions, some Al-rich particles would appear on the austenite grain boundaries in the FZ. It is well known that the existence of the Al-rich secondary phase on the austenite grain boundaries could cause drastic deterioration in ductility of the Fe—Mn—Al—C alloys. In the embodiment Example 8 of the present invention, it is further observed that the formation of Al-rich particles on the austenite grain boundaries in the FZ also led to the formation of solidification crack during the welding process. It is evident that the Al concentration of the present welding filler wires should be limited within the range of 7.5~11.5 wt. %, preferably 8.0~11.0 wt. %.

(3) C: Carbon is obviously one of the primary elements for forming (Fe,Mn)$_3$AlC carbides (κ-carbides). Similar to that described above for Al, the C content in the welding filler wire is also of primary importance in giving rise to the most unique feature of the present invention. Namely, after fusion welding in the as-welded condition, there is a high-density of nano-sized κ-carbides existing within the austenite dendrite cells in the FZ. The present invention has designed a series of welding filler wires with a wide range of C concentrations and carried out careful observations and comprehensive analyses. The results indicated that when the C concentration is less than 1.30 wt. %, in the as-welded condition, no κ-carbide formed within the austenite dendrite cells in the FZ. As the C concentration in the welding filler wire was increased to above 1.35 wt. %, in the as-welded condition, a high-density of nano-sized κ-carbides could be readily observed within the austenite dendrite cells in the FZ. However, when the C concentration in the welding filler wire was increased to exceed 2.1 wt. %, it was found that, in addition to the high-density of nano-sized κ-carbides formed within the austenite dendrite cells and eutectic regions, some coarser κ-carbides were found to appear on the austenite grain boundaries in the FZ. It is well known that the grain boundary coarser κ-carbides and their associated precipitation-free zones could lead to some severe detrimental effects in ductility of the Fe—Mn—Al—C alloys. In the embodiment Example 7 of the present invention, it is further found that, for the welding filler wires with 2.2 wt. % C, severe solidification hot cracking in the welding bead occurred despite of deliberately adjusting the welding process parameters with various combinations. Consequently, the C concentration of the present welding filler should be limited within the range of ~1.35-1.95 wt. %, preferably ~1.40-1.95 wt. %.

(4) Ti, Nb, V: Ti, Nb and V are very strong carbide-forming elements. The present inventor also investigated the effects of the addition of these elements to the welding filler wires disclosed in the present invention on the microstructures and characteristics of FZ in the as-welded weldment. It was found that by adding appropriate amount of Ti, Nb and V to the welding filler wires, the microstructure of the FZ in the as-welded condition exhibited the following distinct features. (i) In addition to the high-density of nano-sized κ-carbides formed within the austenite dendrite cells and eutectic regions, there are a significant amount of nano-sized Ti-rich Ti-carbides, Nb-rich Nb-carbides and V-rich V-carbides formed within the eutectic regions. (ii) The size of these eutectic carbides is only about ~6-10 nm. (iii) These eutectic carbides, same as the nano-sized κ-carbides formed within the austenite dendrite cells and eutectic regions, are all having the ductile face-centered-cubic structure. (iv) The addition of these elements has led to significant reduction in the size of the austenite dendrite cells. (v) Since these Ti-rich Ti-carbides, Nb-rich Nb-carbides and V-rich V-carbides are extremely hard (~2000-3500 Hv), the existence of these carbides would lead to remarkable strengthening (hardening) in the FZ without significant loss in ductility. It is worthwhile to emphasize here that the most important feature of the present invention is to enable the FZ with high YS and hardness, which requires the existence of the high-density of nano-sized κ-carbides within the austenite dendrite cells in the as-welded condition. As described above, in order to obtain a high-density of nano-sized κ-carbides formed within the austenite dendrite cells in the as-welded condition, the carbon content in the welding filler wire must be more than 1.35 wt. %. However, comprehensive experiments revealed that when adding about 1.0 wt. % of Ti into the welding filler wire containing 1.35 wt. % of carbon, after fusion welding there was no κ-carbides formed within the austenite dendrite cells in the as-welded condition. In this case, to obtain a high-density of nano-sized κ-carbides formed within the austenite dendrite cells in the as-welded condition, the carbon content in the welding filler wire must be more than 1.50 wt. %. More experiments also revealed that when the total amount of Ti+Nb+V exceeded 3.5 wt. %, the carbon content in the welding filler must be more than 2.2 wt. % in order to obtain a high-density of nano-sized κ-carbides formed within the austenite dendrite cells in the as-welded condition. But in that situation, the solidification hot cracking was often observed in the welding bead. Nevertheless, through the innovative alloy design obtained by the present inventor as disclosed above, the resultant FZ can have the desired unique microstructure and exceptional combination of microhardness, YS, UTS and ductility. Namely, it is evidently demonstrated to have the unprecedented advantages in enhancing the mechanical strength, especially the yield strength, and microhardness of the FZ in the as-welded alloy, while still maintaining excellent ductility.

(5) Cr and Mo: Cr and Mo are very strong carbide-forming elements. The present inventor also investigated the effects of the addition of Cr and Mo to the welding filler wires on the FZ microstructure in the as-welded condition. Our examinations revealed that the addition of Mo and Cr to the welding filler wire had caused the formation of μm-sized coarse Mo-rich Mo-carbides and Cr-rich Cr-carbides on the austenite grain boundaries in the as-welded FZ. There are also apparent precipitation-free zones surrounding the coarse carbides in the FZ, which are detrimental to the ductility of the as-welded alloys. Therefore, in the present invention the addition of Cr and Mo to the welding filler wire is not recommended.

Finally, it is particularly noted that the base materials used in the embodiment Examples of the present invention were the as-hot-rolled high carbon content (C>1.5 wt. %) Fe—Mn—Al—C alloys. Prior to fusion welding, the microstructure of the base materials were composed of full austenite matrix and a high-density of nano-sized κ-carbides having an $L'1_2$ structure uniformly distributed within the austenite matrix. Interestingly, after fusion welding, in the HAZ and BM of the weldment, these high-density of nano-sized κ-carbides did not exhibit any apparent changes. In other words, no apparent dissolution or coarsening on these high-density of nano-sized κ-carbides, as commonly observed in other precipitation-hardened alloys (e.g. AA 7075), after fusion welding. As a result, the HAZ did not exhibit any noticeable softening effect, as will be described below in the embodiment Examples disclosed in the present invention.

DETAILED DESCRIPTION OF THE PREFERRED EMBODIMENTS

Figure 1A:
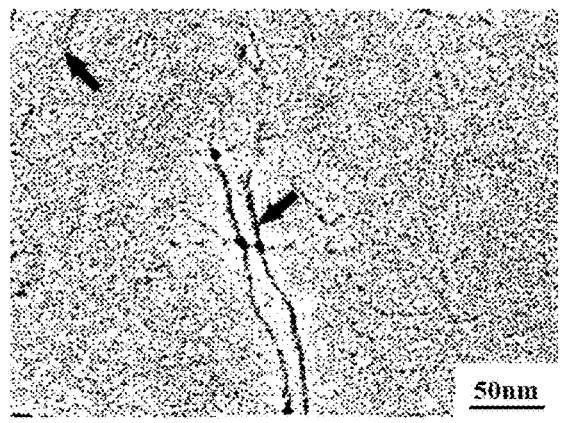
FIG. 1(a)-(c) TEM micrographs of the as-hot-rolled Fe-28.5Mn-9.0Al-1.55C base material. (a) Bright field image; (b) A SADP, the zone axis is [001] (hkl: austenite; hkl: κ-carbide); (c) $(100)_K$ dark field image taken from the same area in (a).

In the following, we give detailed description of the selected preferred embodiments to illustrate the innovative features of the present invention. In the following, unless otherwise specified, the Fe—Mn—Al—C base materials investigated in the present invention were prepared in an atmospheric induction furnace with various compositions. After being homogenized at 1150° C. for 2 hrs under protective argon atmosphere, the ingots were hot-rolled from 80 mm to 8-12 mm-thick plates and then water quenched to room temperature. The as-hot-rolled plates were then machined to form a single V butt for subsequent welding joints with a groove angle of 60°. The welding filler wires were prepared in an atmospheric induction furnace according to the designed compositions. The melt was cast into an 80 mm×80 mm×1500 mm steel mold. The ingots were then heated at 1150° C. for 2 hrs and hot-rolled into coils with diameter φ~5 mm, followed by pickling and cold drawing into welding filler wires with diameter φ≈1.2, 2.4 and 3.2 mm, respectively. Fusion welding has been carried out by either GMAW or GTAW process using pure argon or the mixture of Ar+He gases as the shielding gas. The typical flow rates of the shielding gas were about ~10 and ~18 liters/min for GTAW and GMAW, respectively. The welding filler wire was fed at speed of ~200 mm/min for GMAW process. The voltage and current used for the GMAW were 22~26 V and 140~170 A, respectively. For GTAW, depending on the diameter of the welding filler wire used, the voltage and current used were 15~20 V and 125~200 A, respectively. In all fusion welding conducted in the embodiment Examples, the root opening was kept at ~1 mm. The microstructures of the weldment were analyzed by using optical microscope (OM), scanning electron microscope (SEM) and transmission electron microscope (TEM), respectively. The SEM specimens were prepared through mechanical polishing prior to etching with 5% nitric acid. For the TEM examinations, thin foil specimens were prepared using a twin jet electro-polisher with an electrolyte of 60% acetic acid, 30% ethanol and 10% perchloric acid. Energy dispersive spectrosmeter (EDS) attached to SEM or TEM was used for compositional analyses when needed. It is noted that quantitative EDS analyses are not reliable for elements with atomic number less than 10 (such as carbon) and thus are often ignored. The tensile test specimens were prepared according to ASTM E8 standard having a gauge length of 25 mm, a gauge width of 6.25 mm and a thickness of 4 mm. Tensile tests were carried out at room-temperature with an Instron 8501 tensile testing machine at a strain rate of $6.7 \times 10^{-4}$ s$^{-1}$. The YS was measured at 0.2% offset strain. Vickers microhardness measurements were performed to characterize the hardness in different regions, namely the fusion zone (FZ), heat-affected zone (HAZ) and base material (BM), of the weldment. The applied load of the Vickers tests was 100 gf with a loading duration equal to 15 s.

EXAMPLE 1

Figure 1D:
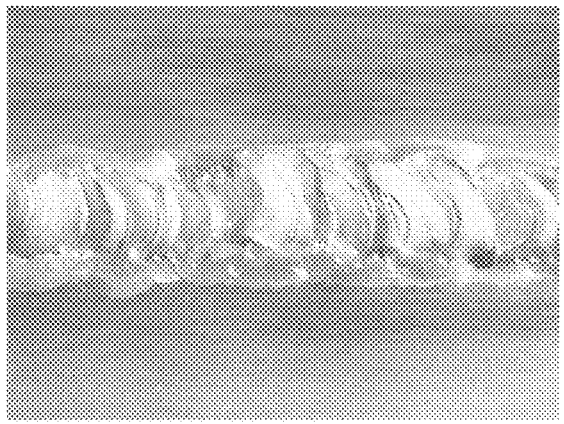
FIG. 1(d) The macroscale image of the welding bead obtained by GTAW with a Fe-27.8Mn-9.1Al-1.86C welding filler wire.
Figure 1B:
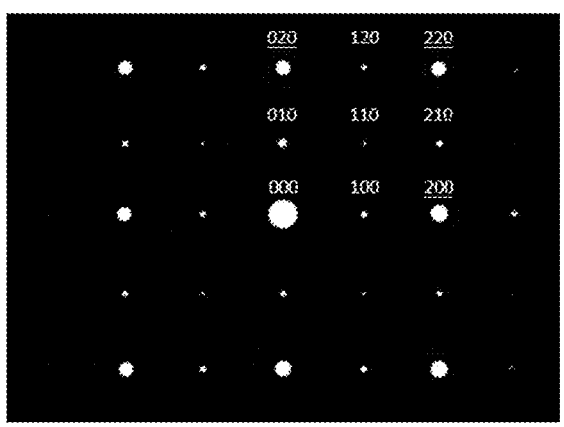
Figure 1C:
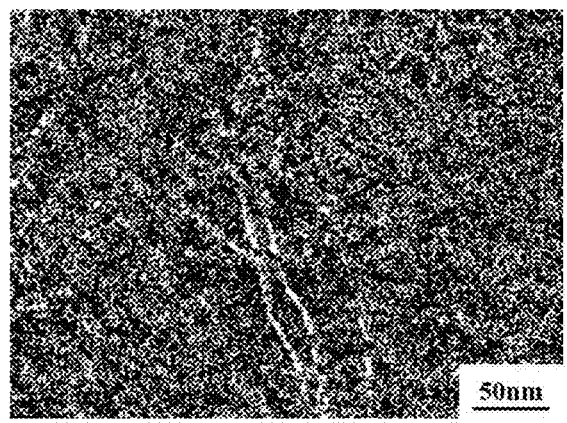

FIG. 1(a) is the TEM bright field (BF) image of an as-hot-rolled Fe-28.5Mn-9.0Al-1.55C base material, showing a high-density of nano-sized (~3-5 nm) precipitates uniformly distributing within the matrix. Also noted that, as indicated by the arrows shown in FIG. 1(a), the precipitates existing on the dislocations are slightly larger in size (~5-8 nm), suggesting that these precipitates were formed during the hot-rolling process. FIG. 1(b), the selected-area diffraction pattern (SADP) of the as-hot-rolled base material, demonstrates that the high-density of nano-sized precipitates are $(Fe,Mn)_3AlC$ carbides (κ-carbides) having an L'1$_2$-structure. FIG. 1(c) shows the $(100)_\kappa$ dark field (DF) image of the same area as displayed in FIG. 1(a) to illustrate the presence of the κ-carbides within the austenite matrix and on the dislocations. It is clear that the as-hot-rolled microstructure of the base material used in the present embodiment is single-phase austenite with uniformly distributed high-density of nano-sized κ-carbides. The tensile test revealed that the YS, UTS, and El of the as-hot-rolled base material are 952 MPa, 1100 MPa, and 56%, respectively.

Two plates of the as-hot-rolled base material with dimensions of 80 mm×80 mm×8 mm were machined to form a single V-groove butt weld. In the present Example the nominal composition of the welding filler wire was Fe-27.8Mn-9.1Al-1.86C with a wire diameter φ~2.4 mm. The fusion welding was carried out using GTAW process with pure Ar as the shielding gas. FIG. 1(d) is the macroscale image of the welding bead, showing that there is no any visible macroscopic solidification crack and porosity in the fusion zone (FZ) of the as-welded sample.

Figure 1E:
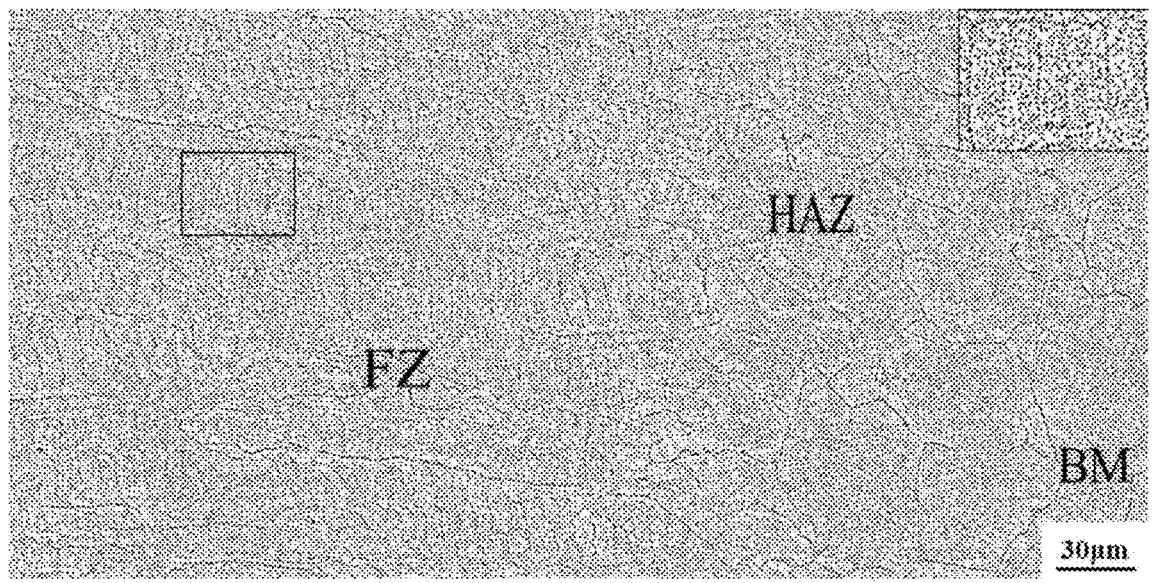
FIG. 1(e) SEM image taken from the as-welded weldment (FZ: fusion zone; HAZ: heat-affected zone; BM: base material). The inset shows the enlarged image of the area marked in the figure.
Figure 1F:
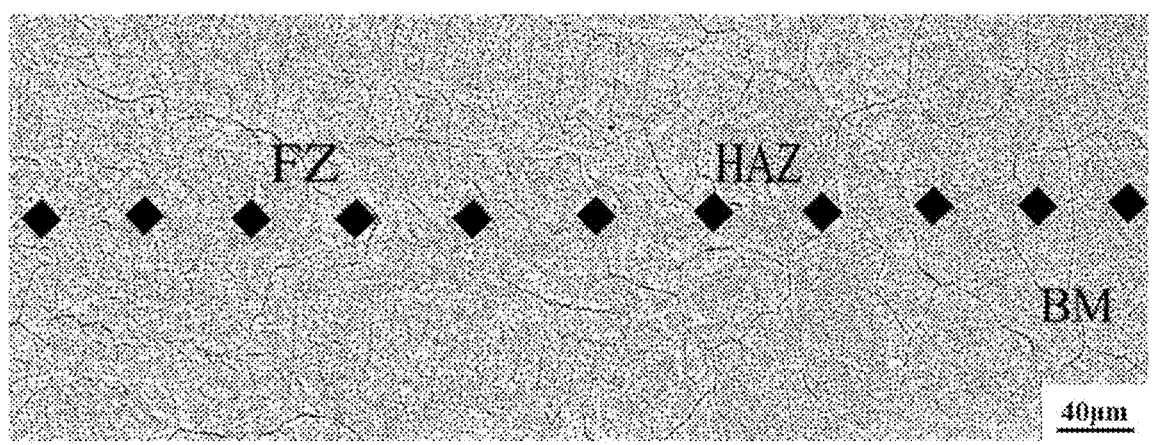
FIG. 1(f) SEM image and the microhardness indentation conducted across the FZ, HAZ and BM.
Figure 1G:
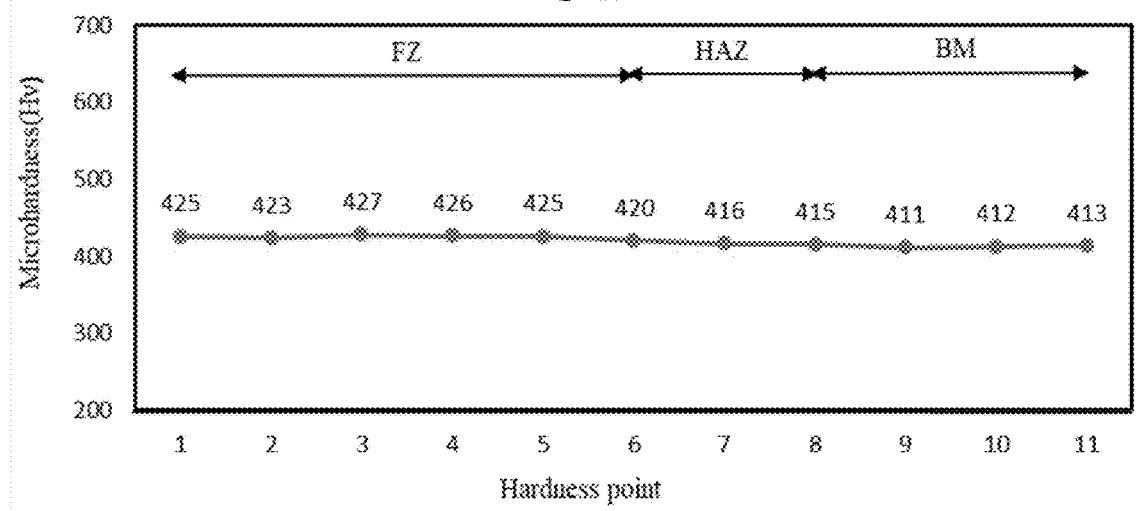
FIG. 1(g) Microhardness values corresponding to the respective measured points in (f).

FIG. 1(e) shows the typical SEM image of an area covering the FZ, HAZ and BM of the as-welded sample. As indicated in the SEM image, three distinctive regions representing the regions of FZ, HAZ, and BM are readily identified. Several features distinct from that reported in the prior art concerning fusion welding the precipitation-hardened Fe—Mn—Al—C alloys (with C≤1.29 wt. % as fusion welding filler) can be immediately noted. (i) It is evident that the FZ exhibits the typical columnar austenite grains composed of austenite dendrites and eutectic regions. More significantly, there exist a high-density of nano-sized κ-carbides within the austenite dendrite cells and eutectic regions. This is one of the striking features disclosed in the present invention for the first time. In the prior art reporting the fusion welded Fe—Mn—Al—C alloys with C≤1.29 wt. %, there was no precipitate within either the primary or secondary austenite dendrite cells being observed, except for a small amount of eutectic κ-carbides existing within the eutectic regions. Moreover, in the present Example, the amount of the nano-sized κ-carbides existing within the eutectic regions is much more than that observed in previous reports for C≤1.29 wt. %. (ii) From FIG. 1(e), it is evident that there is no apparent lengthy primary dendrites in the columnar austenite grains. The length and spacing of the austenite dendrite cells formed within the columnar austenite grains are only in the order of ~20-30 μm and ~5-10 μm, respectively. Obviously, the austenite dendrite cells in the present Example is substantially "refined". This is quite different from that ubiquitously observed in the prior art or conventional fusion welding, wherein the microstructure of the as-welded bead was always composed of apparent primary dendrites with length extending over several hundred micrometers (i.e. >300 μm). The reasons for these differences might be explained as followings. As indicated in the enlarged image of the marked area shown on the upper right corner of FIG. 1(e), it is clearly seen that, in addition to the fine eutectic κ-carbides formed between austenite dendrites, there are precipitates existing at the tip of each austenite dendrite cell. Since during solidification after fusion welding, the stability of the solid-liquid interface is mostly determined by the thermal and constitutional supercooling conditions existing in the immediate vicinity of the interface, the dendrite size in a welding bead is strongly dependent on the cooling rate and alloying compositions. In the present case, it appears that the presence of precipitates at the tip of austenite dendrite cells due to constitutional supercooling may have decelerated the solidification front and effectively retard the growth of dendrite cells, which, in turn, results in the much shorter dendrite cells revealed in FIG. 1(e). As a result, the composition of the welding filler may be the more essential factor responsible for the short and narrow dendritic structure observed in the present Example. (iii) The FZ in the present Example is fully austenitic, whereas in the prior art the solidified microstructure after autogenous fusion welding always contained some amount of ferrite phase even if their base materials were fully austenitic before welding. In addition, FIG. 1(e) also indicates that no obvious microstructural changes are observable in HAZ and BM regions and there is no discernible difference in terms of the size and density of the κ-carbides in FZ, HAZ and BM of the present Example. As a result, there is no softening in the HAZ. Moreover, it is noted that, within the FZ and near the interface between the FZ and HAZ, there is no trace of microcrack and porosity can be observed, indicating that the use of the fusion filler disclosed in the present invention has evidently eliminated the solidification and liquation cracks commonly encountered in fusion welded precipitation-hardened alloys. FIG. 1(f) shows the microhardness measurements conducted across the FZ, HAZ and BM. The corresponding values of respective measured hardness points are displayed in FIG. 1(g). As can be seen in FIG. 1(g), the average microhardness of FZ (~425 Hv) is in fact slightly larger than that of HAZ (~417 Hv) and BM (~412 Hv). This is in sharp contrast to the conventional wisdom that the FZ is always the weakest region after fusion welding. It is worth mentioning here that the microstructure of the BM used in the present Example, in the as-hot-rolled state, is fully austenitic with a high-density of nano-sized κ-carbides uniformly distributing within the austenite matrix and the microhardness of the BM is substantially larger than that of the optimally aged Fe—Mn—Al—C alloys with C≤1.20 wt. % (350~400 Hv), as quoted in the Background section.

Figure 1H:
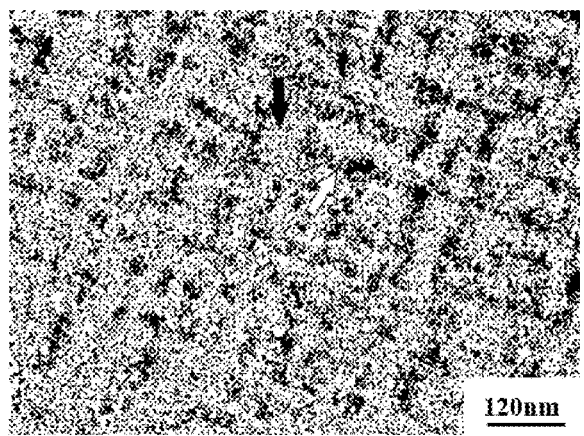
FIG. 1(h) TEM bright field image taken from the FZ of the weldment. The solid and hollow arrows indicate the κ-carbides within the austenite dendrite cells and eutectic regions, respectively.
Figure 1I:
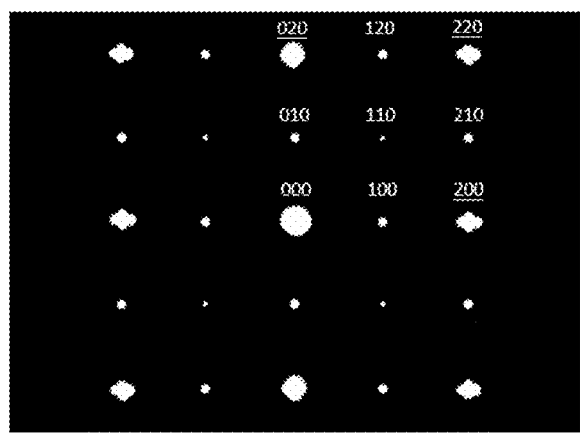
FIG. 1(i) A SADP taken from the FZ, the zone axis is [001] (hkl: austenite; hkl: κ-carbide).
Figure 1J:
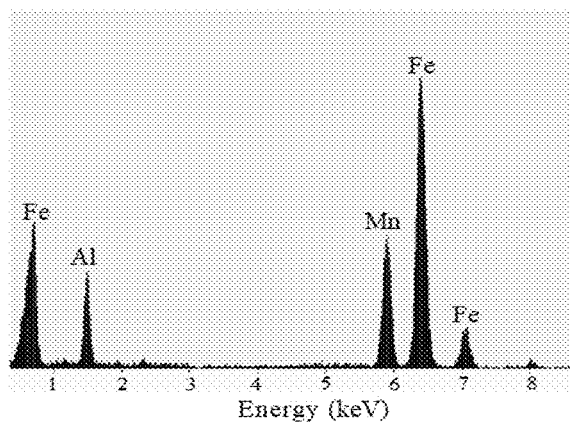
FIG. 1(j) TEM-EDS profile obtained from the FZ of the weldment.

In order to fully comprehend the primary reasons giving rise to these unprecedented results, a more detailed analysis on the FZ microstructure is indispensable. TEM examinations indicated that in the present Example the matrix of FZ is fully austenitic and both the nano-sized precipitates within the austenite dendrite cells and the eutectic regions are κ-carbides. An example is shown in FIG. 1(h), which is the BF electron micrograph taken from the FZ. It clearly indicates that the sizes of the κ-carbides within the austenite dendrite cells (indicated by black arrow) and the associated eutectic regions (indicated by the white arrow) are on the order of 3~5 nm and 6~10 nm, respectively, and the length of the austenite dendrite cells is on the order of about 100-300 nm. This indicates that the alloy design of the present welding filler has effectively suppressed the progress speed of the dendrite growth front during the solidification process after fusion welding. The SADP shown in FIG. 1(i) confirms that only the austenite phase and κ-carbides are existent in the FZ of the weldment. Moreover, as revealed by the TEM-EDS profile taken from FZ shown in FIG. 1(j), the compositions of Fe, Mn, and Al in the FZ are about 64.3%, 26.7% and 9.0%, respectively.

Figure 1K:
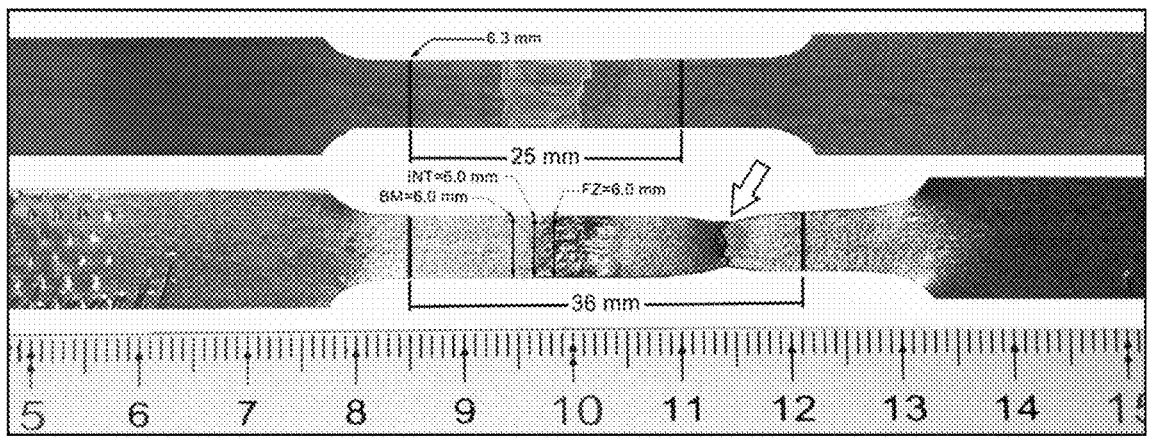
FIG. 1(k) Macroscale images of the tensile specimens before and after tensile test.

Tensile test indicates that the weldment obtained by using the welding filler disclosed in the present Example exhibited remarkable ductile deformation behavior, with the YS, UTS and El being about 946 MPa, 1086 MPa and 44%, respectively. FIG. 1(k) shows the macroscale images of the specimens before and after tensile test. It is evident that, the entire weldment exhibits typical characteristics of ductile plastic deformation. In particular, the FZ region also exhibits typical features of ductile deformation with corrugated surface and substantial amount of elongation. Since the tensile specimen contains regions (i.e. FZ and BM) with potentially different mechanical properties, it is generally very difficult to infer the obtained YS to FZ or BM directly. Nevertheless, by judging from the width variations in the respective regions of the tensile-fractured specimen, one may be able to differentiate the relative magnitude of YS between FZ and BM. For instance, if the BM is having higher YS, when the tensile stress exceeds the YS of FZ but still lower than that of BM, then the FZ would be the first to exhibit plastic deformation (i.e. become elongated and thinned) and show a width reduction, while the BM being still in the elastic regime the width in the BM region would remain unchanged, and vice versa. As a consequence, when there is a noticeable difference between the YS of FZ and BM, the tensile-fractured specimen will show some width variations in the respective regions and the specimen edges will not be parallel. On the contrast, if the width of respective regions in the tensile-fractured specimen remains approximately the same and sample edges are essentially parallel, it is plausible to reason that both FZ and BM are having nearly the same magnitude of YS. The fact that the widths across the region containing the BM, HAZ and FZ (denoted as $d_{BM}$, $d_{INT}$ and $d_{FZ}$, in FIG. 1(k)) are essentially equal and the specimen edges across this region remains parallel indicates that the FZ and BM of the present tensile specimen are having approximately the same YS level. It is worthwhile to emphasize here that the extraordinary YS exhibited in the FZ of the present Example is, in fact, quite expectable. It is well known that the existence of a high-density of nano-sized κ-carbides would drastically enhance the YS of the material without significant loss in ductility, which is also the main reason responsible for the excellent combination of YS (or hardness) and El exhibited in most precipitation-hardened alloys. This is exactly what is witnessed in FIG. 1(h). On the other hand, it is also evident from FIG. 1(k) that the necking and eventual fracturing occurred in the opposite region of the BM (indicated by the white arrow), indicating that UTS of FZ is larger than that of BM, which may be also consistent with the slightly lower hardness in BM region depicted in FIG. 1(g).

Apparently, the existence of the high-density of nano-sized κ-carbides within the austenite dendrite cells should be the primary reason for the high-hardness and high-strength (especially YS) while maintaining high-ductility obtained in the FZ of the present Example. The obtained FZ microstructure described in the present Example undoubtedly is the most unique and unprecedented features resulted from the novel composition design of the welding filler wires disclosed in the present invention.

EXAMPLE 2

The purpose of the present Example attempts to clarify the effects of altering the carbon content in the welding filler wire on the characteristics of FZ in the as-welded sample. The base material used in this Example was the same as that used in Example 1. However, the GMAW welding process was employed in this Example. The dimensions of the BM plates were 80 mm×80 mm×12 mm, which were machined to form a single V-groove butt weld. The GMAW welding process was carried out with a voltage of 26 V and current of 140~170 A. The flow rate of the shielding gas (25% Ar+75% He) was ~18 liters/min and the welding filler wire feeding speed of was ~200 mm/min, respectively. The nominal composition of the welding filler wire used in the present Example was Fe-28.2Mn-9.2Al-1.72C with a wire diameter ϕ~1.2 mm.

Figure 2A:
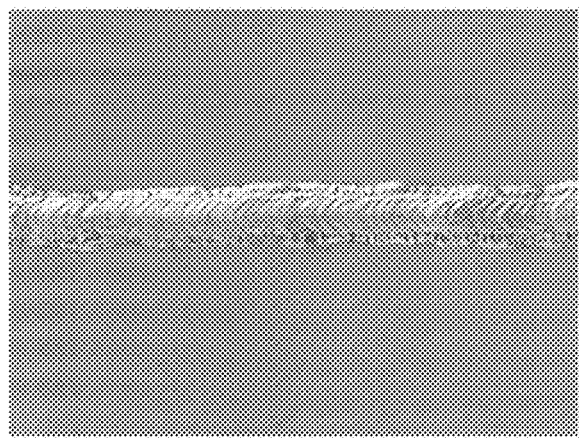
FIG. 2(a) The macroscale image of the welding bead obtained by GMAW with a Fe-28.2Mn-9.2Al-1.72C welding filler wire.
Figure 2B:
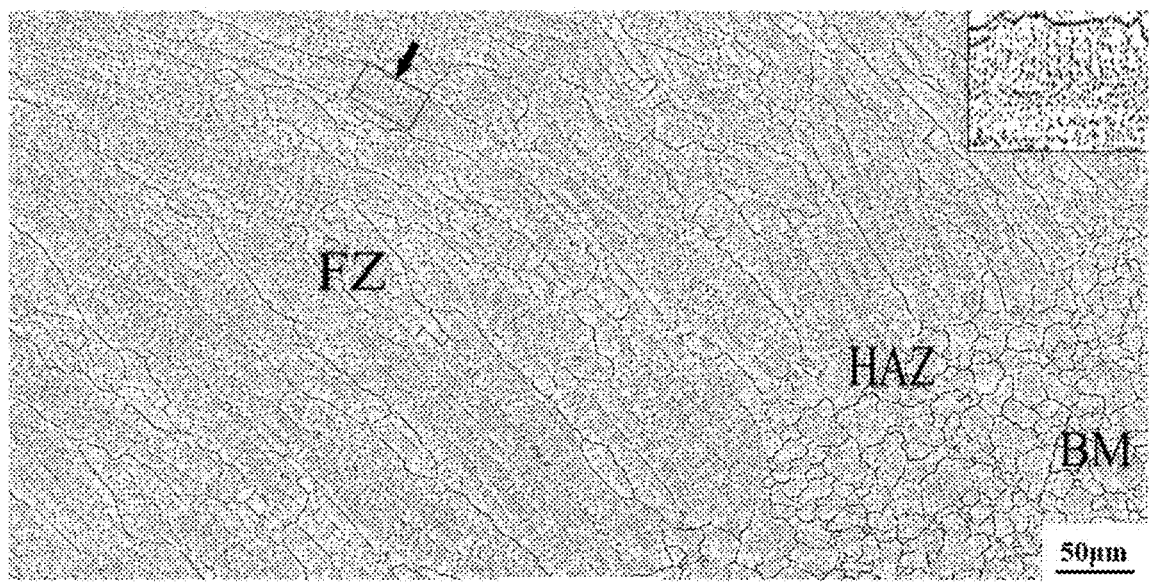
FIG. 2(b) SEM image taken from the as-welded weldment (FZ: fusion zone; HAZ: heat-affected zone; BM: base material). The inset shows the enlarged image of the area marked in the figure.

FIG. 2(a) shows the macroscale image of the GMAW welding bead. It can be seen from FIG. 2(a) that the bead appears to have a very smooth morphology with no visible macrocrack and porosity appearing in the entire welding bead. FIG. 2(b) shows the SEM image of an area covering the FZ, HAZ, and BM of the welded sample. Similar to those revealed in Example 1, the FZ is composed of typical columnar austenite grains and there are a high-density of nano-sized κ-carbides existing within the austenite dendrite cells and eutectic regions. As indicated by the arrow shown in FIG. 2(b) and the enlarged image displayed on the upper right corner of FIG. 2(b), in addition to the fine eutectic κ-carbides formed within the eutectic regions, there also κ-carbides existing at the tip of each austenite dendrite cell. This indicates that the FZ microstructure does have very similar features to that observed in Example 1. Moreover, it is noted that, within the FZ and near the interface between the FZ and HAZ, there is no trace of microcrack and porosity can be observed. FIG. 2(b) also reveals that, similar to Example 1, the fusion welding process seemingly didn't cause the dissolution and significant coarsening of the κ-carbides in HAZ in the present Example.

Figure 2C:
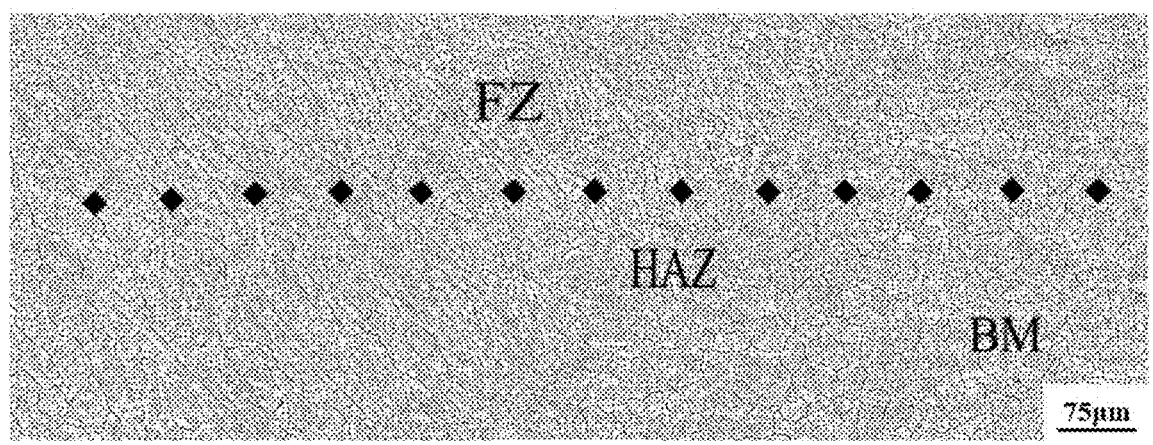
FIG. 2(c) SEM image and the microhardness indentation conducted across the FZ, HAZ and BM.
Figure 2D:
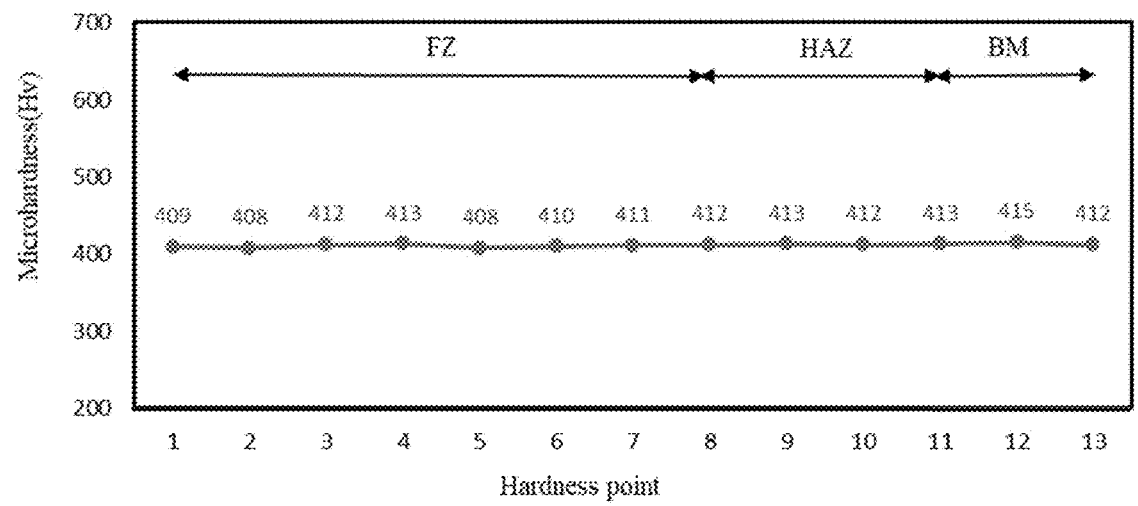
FIG. 2(d) Microhardness values corresponding to the respective measured points in (c).

FIG. 2(c) shows the Vickers microhardness measurements conducted across the FZ, HAZ and BM. The corresponding values of the respective measured hardness points are displayed in FIG. 2(d). The average microhardness of FZ, HAZ and BM are ~410 Hv, ~412 Hv and ~413 Hv, respectively. Apparently, the microhardness of FZ and HAZ are comparable to that of BM, indicating that there is no significant softening in FZ and HAZ, which is consistent with the unique microstructure displayed in FIG. 2(b), wherein the most prominent strengthening ingredient of high-density nano-sized κ-carbides remains essentially intact in all three zones after fusion welding.

Figure 2E:
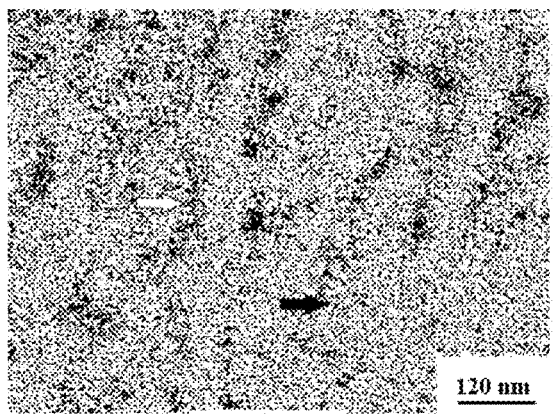
FIG. 2(e) TEM bright field image taken from the FZ of the weldment. The solid and hollow arrows indicate the κ-carbides within the austenite dendrite cells and eutectic regions, respectively.
Figure 2G:
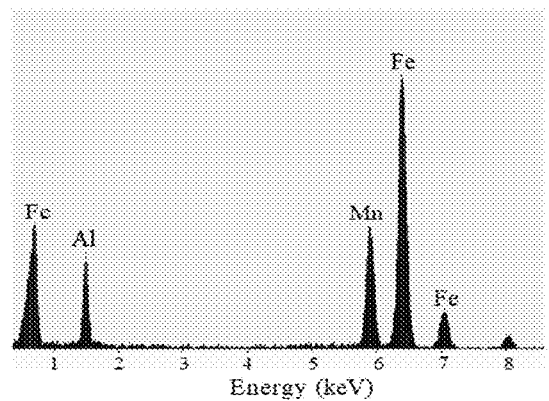
FIG. 2(g) TEM-EDS profile obtained from the FZ of the weldment.
Figure 2F:
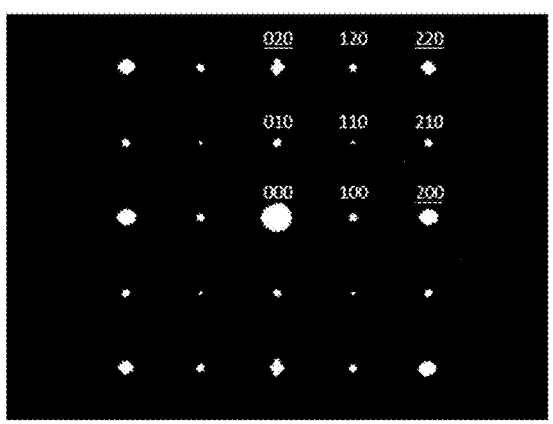
FIG. 2(f) A SADP taken from the FZ, the zone axis is [001] (hkl: austenite; hkl: κ-carbide).

Transmission electron microscopy examinations of FZ indicated that significant amount of nano-sized κ-carbides were formed within the austenite dendrite cells and the eutectic regions. A typical example is shown in FIG. 2(e). In this TEM BF image, it is clearly seen that there is a high-density of nano-sized κ-carbides (~3-5 nm) distributed within austenite dendrite cells (indicated by the black arrows) and eutectic regions (indicated by the white arrows). Comparing with the results described in Example 1 (FIG. 1(h)), the density of κ-carbides within the austenite dendrite cells and eutectic regions is slightly decreased. FIG. 2(f) is the SADP taken from FIG. 2(e), confirming that the FZ matrix is single austenite and the precipitates existing within both the austenite dendrite cells and the eutectic regions are κ-carbides having an ordered L'1$_2$ structure. FIG. 2(g) is the TEM-EDS profile taken from the FZ, clearly indicating that the compositions of Fe, Mn and Al in FZ are about 63.4 wt. %, 27.5 wt. % and 9.1 wt. %, respectively.

Figure 2H:
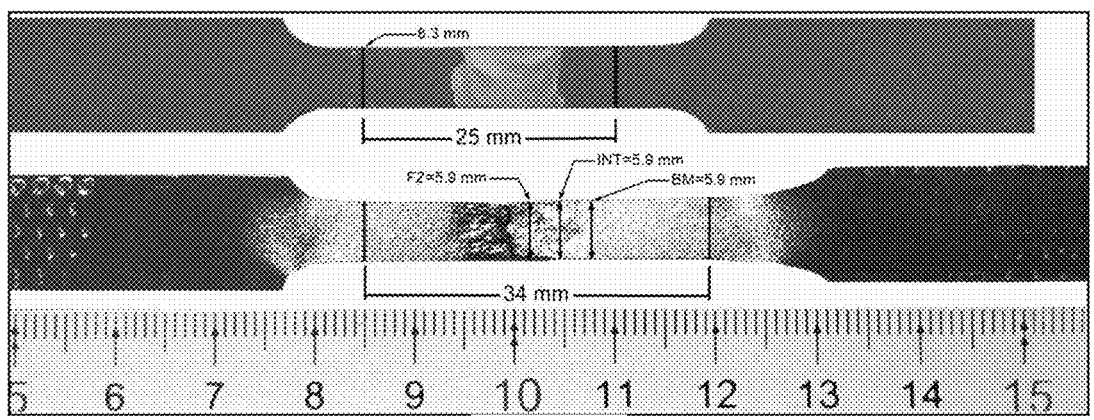
FIG. 2(h) Macroscale images of the tensile specimens before and after tensile test.

Tensile test indicates that the weldment obtained by using the welding filler wire disclosed in the present Example also exhibited remarkable ductile deformation behavior, with the YS, UTS and El being about ~942 MPa, ~1075 MPa and ~36%, respectively. FIG. 2(h) shows the macroscale images of the specimens before and after tensile test. It is evident that, the entire weldment exhibits typical characteristics of ductile plastic deformation. In particular, the zig-zag weaving fracture pattern and corrugated fracture surface appearing in the FZ is indicative of ductile deformation characteristics. It is also interesting to observe that, like in Example 1, the widths across the region containing the BM, FZ and the interface between them (denoted as $d_{BM}$, $d_{FZ}$ and $d_{INT}$, in FIG. 2(h)) are essentially equal and the specimen edges across this region remains parallel indicating that the FZ and BM of the present tensile specimen are having approximately the same YS level. The main reasons for the FZ to have such high YS is the same as those described in Example 1. However, in this case, unlike that observed in Example 1, slight necking and fracture occurred in FZ instead of in BM, indicating that the FZ has slightly lower UTS than BM. This is, in fact, quite consistent with the slightly lower microhardness values in FZ (~410 Hv) comparing with that in BM (~413 Hv). Based on the results presented in Example 1 and Example 2, it is evident that, with the composition design of the welding fillers disclosed in the present invention, the obtained as-welded samples, even after re-melting, alloying element redistribution and solidification during fusion welding, are evidently having excellent ductility with remarkable YS and microhardness.

EXAMPLE 3

Figure 3A:
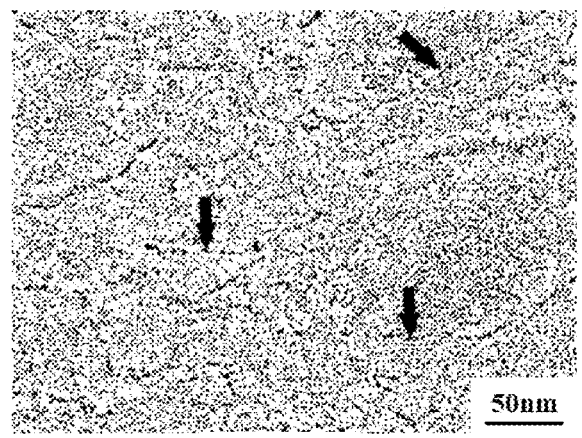
FIG. 3(a)-(c) TEM micrographs of the as-hot-rolled Fe-28.8Mn-8.9Al-1.62C base material. (a) Bright field image; (b) A SADP, the zone axis is [001] (hkl: austenite; hkl: κ-carbide); (c) $(100)_K$ dark field image taken from the same area in (a).
Figure 3B:
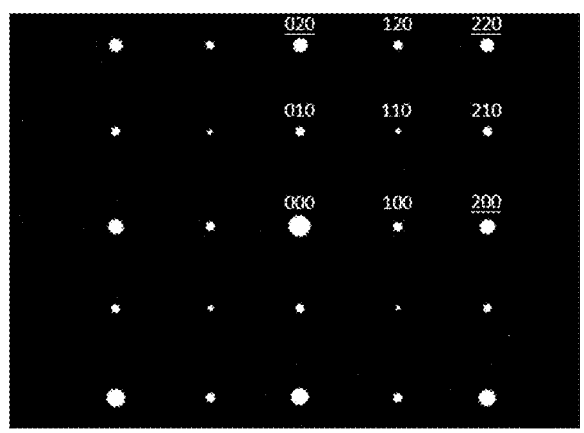
Figure 3C:
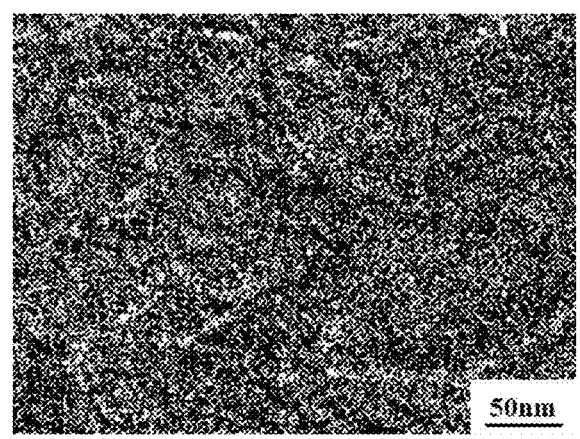

In this Example, we investigated the effects of a slightly lower carbon content on the characteristics FZ in the as-welded sample. An as-hot-rolled base material with nominal composition of Fe-28.8Mn-8.9Al-1.62C was used in the present Example of embodiment. FIG. 3(a) is the TEM BF image of the hot-rolled base material. It is evident in FIG. 3(a) that the as-hot-rolled microstructure of BM used in the present Example is quite similar to that used in Example 1 and Example 2. Namely, there is a high-density of nano-sized (~3-5 nm) precipitates uniformly distributing within the matrix and on the dislocations (as indicated by the arrows). FIG. 3(b) is the selected-area diffraction pattern (SADP) of the as-hot-rolled base material, which evidently confirms that the matrix of the base material is fully austenitic and the high-density nano-sized precipitates are the ordered L'1$_2$-structured κ-carbides. FIG. 3(c) is the (100)$_K$ DF image taken from the same area as displayed in FIG. 3(a), revealing the presence of the high-density nano-sized κ-carbides. TEM investigations showed that the as-hot-rolled microstructure of the base material used in the present Example is single-phase austenite with uniformly distributed high-density nano-sized κ-carbides. The tensile test revealed that the YS, UTS, and El of the as-hot-rolled base material are 975 MPa, 1152 MPa, and 50%, respectively.

Figure 3D:
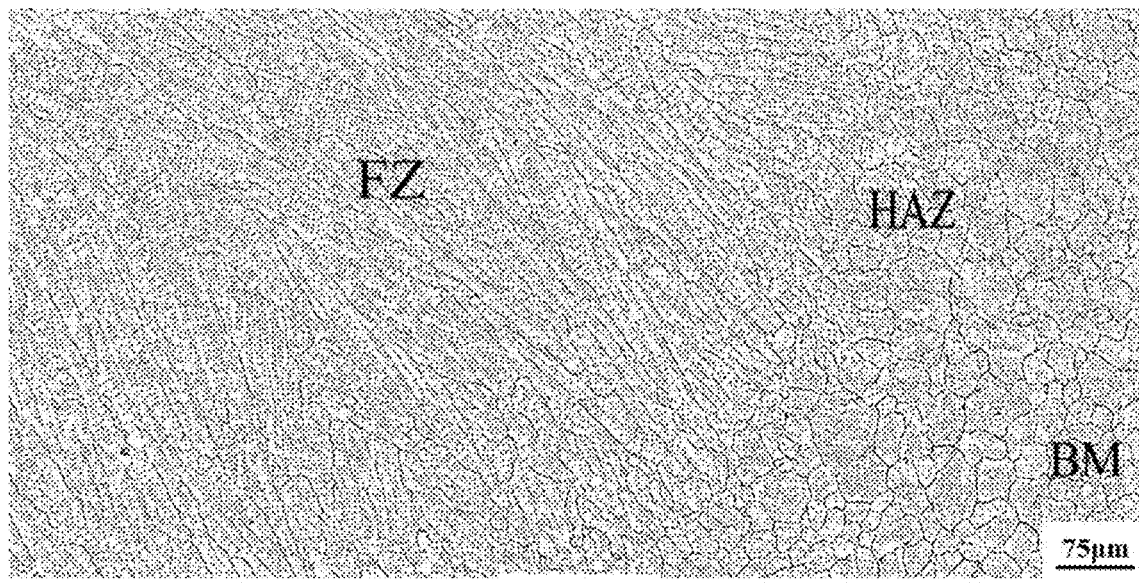
FIG. 3(d) SEM image taken from the as-welded weldment obtained by GTAW with a Fe-28.2Mn-10.6Al-1.62C welding filler wire (FZ: fusion zone; HAZ: heat-affected zone; BM: base material).

Two plates of the as-hot-rolled base material with the dimensions 80 mm×80 mm×8 mm were machined to form a single V-groove butt weld. The nominal composition of welding filler wire was Fe-28.2Mn-10.6Al-1.62C with a wire diameter ϕ~2.4 mm. The GTAW welding parameters were similar to those used in Example 1. FIG. 3(d) shows the typical SEM image covering the FZ, HAZ, and BM of the as-welded sample. Similar to that seen in Example 1 and Example 2, the FZ exhibits typical columnar austenite grains composed of austenite dendrite cells and eutectic regions. The genuine feature of a high-density of nano-sized κ-carbides distributed within the austenite dendrite cells and eutectic regions can also be observed. Nevertheless, comparing to Example 1 (FIG. 1(e)) and Example 2 (FIG. 2(b)) the amount of nano-sized κ-carbides appears to be slightly reduced, presumably due to the lower carbon content in the welding filler wire used in the present Example. Moreover, it is noted that, within the FZ and near the interface between the FZ and HAZ, there is no trace of microcrack and porosity can be observed. Also, the density of the nano-sized κ-carbides originally existing in HAZ and BM apparently was not influenced during the welding process.

Figure 3E:
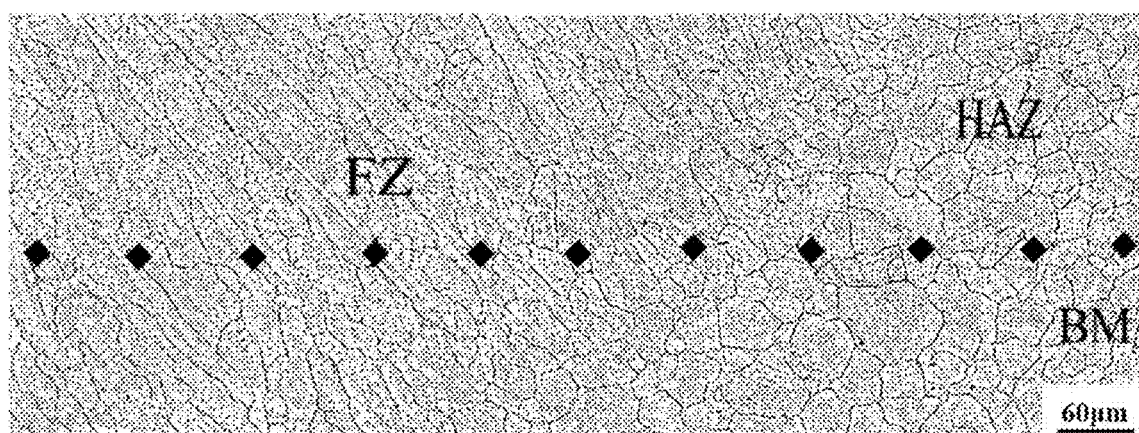
FIG. 3(e) SEM image and the microhardness indentation conducted across the FZ, HAZ and BM.
Figure 3F:
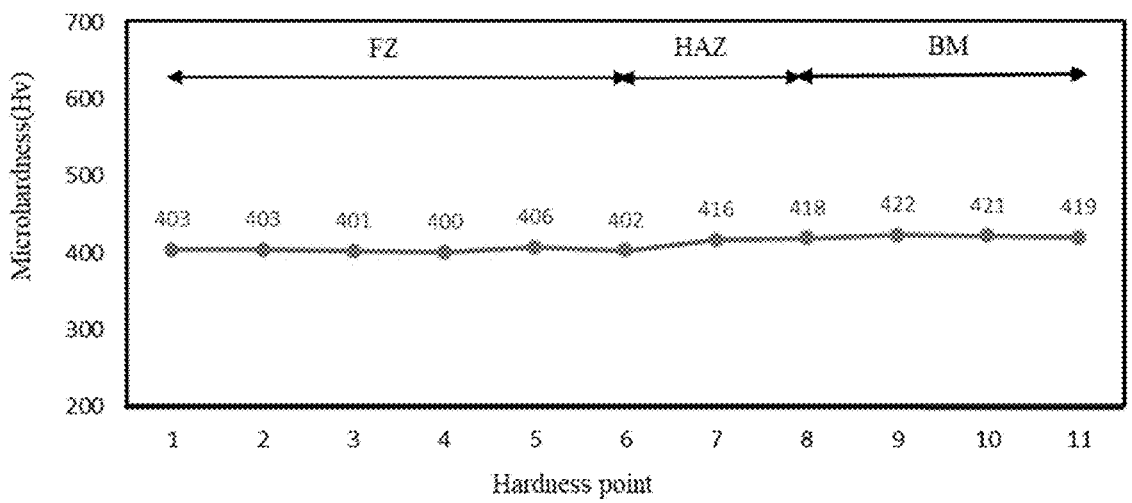
FIG. 3(f) Microhardness values corresponding to the respective measured points in (e).
Figure 3G:
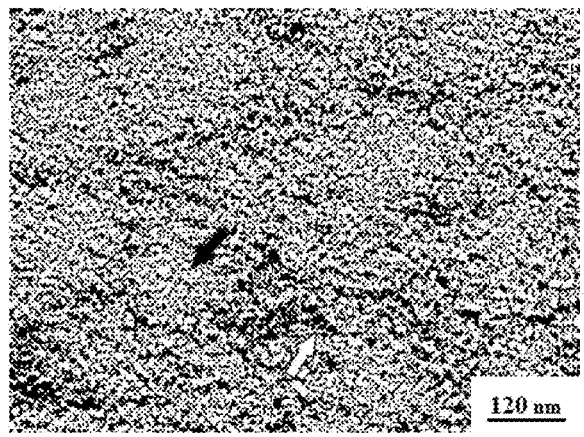
FIG. 3(g) TEM bright field image taken from the FZ of the weldment. The solid and hollow arrows indicate the κ-carbides within the austenite dendrite cells and eutectic regions, respectively.
Figure 3H:
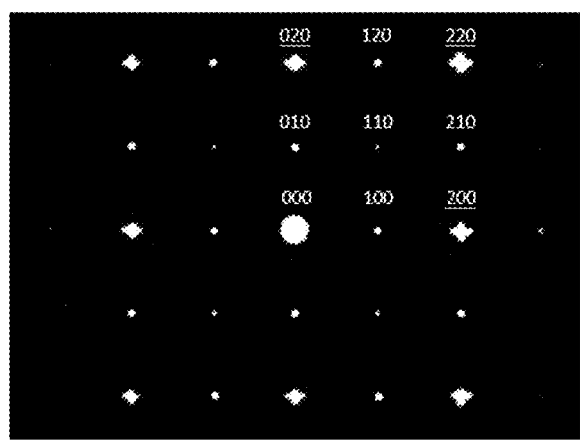
FIG. 3(h) A SADP taken from the FZ, the zone axis is [001] (hkl: austenite; hkl: κ-carbide).
Figure 3I:
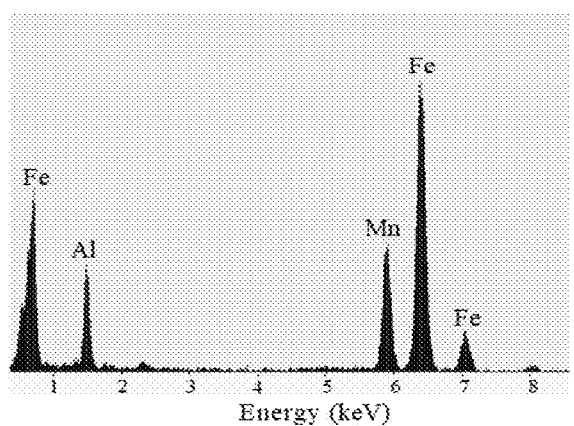
FIG. 3(i) TEM-EDS profile obtained from the FZ of the weldment.

FIG. 3(e) shows the Vickers microhardness measurements conducted across the FZ, HAZ and BM. The corresponding values of the respective measured hardness points are displayed in FIG. 3(f), which reveals that the average microhardness of FZ, HAZ and BM is about 402 Hv, 417 Hv and 420 Hv, respectively. Apparently, there is negligible softening in FZ. It is worthwhile to note that in the present Example, the microhardness of FZ is still considerably larger than that of the optimally aged Fe—Mn—Al—C alloys with C≤1.2 wt. % (350~400 Hv), as quoted in the Background section FIG. 3(g) is the TEM BF image taken from FZ showing that the density of the nano-sized κ-carbides is decreased slightly as compared to that seen in Example 1 (FIG. 1(h)) and Example 2 (FIG. 2(e)). The SADP shown in FIG. 3(h) confirms that the microstructure of FZ is composed of austenite and κ-carbides. FIG. 3(i) is the TEM-EDS profile taken from the FZ, which shows that the compositions of Fe, Mn and Al in FZ are about 61.9%, 27.6% and 10.5%, respectively. The tensile test of the present as-welded sample showed that the tensile-fractured specimen exhibited substantial amount of plastic deformation in the FZ and the necking and fracture occurred mainly in FZ. On the other hand, the BM exhibited a relatively small amount of deformation. This might be due to the considerably lower microhardness value in the FZ (~402 Hv) comparing with that in BM (~420 Hv). As a result, despite the marked ductile deformation in FZ, the total elongation was slightly decreased as compared to the previous Examples. The YS, UTS and El of weldment of the present as-welded sample are ~916 MPa, ~1035 MPa and ~33%, respectively.

From the above results, it is evident that the main features of microstructure and the resultant mechanical properties in the weldment of the present Example are very similar to that seen in Example 1 and Example 2.

EXAMPLE 4

In the present Example, the base material used was the same as that used in Example 3. The dimensions of the BM plates used in the present Example were 80 mm×80 mm×8 mm, which were machined to form a single V-groove butt weld. The nominal composition of the welding filler wire was Fe-29.5Mn-9.8Al-1.48C with a wire diameter ϕ~2.4 mm. The fusion welding was carried out using the GTAW process with the pure Ar as the shielding gas and the welding parameters were similar to those used in Example 1.

Figure 4A:
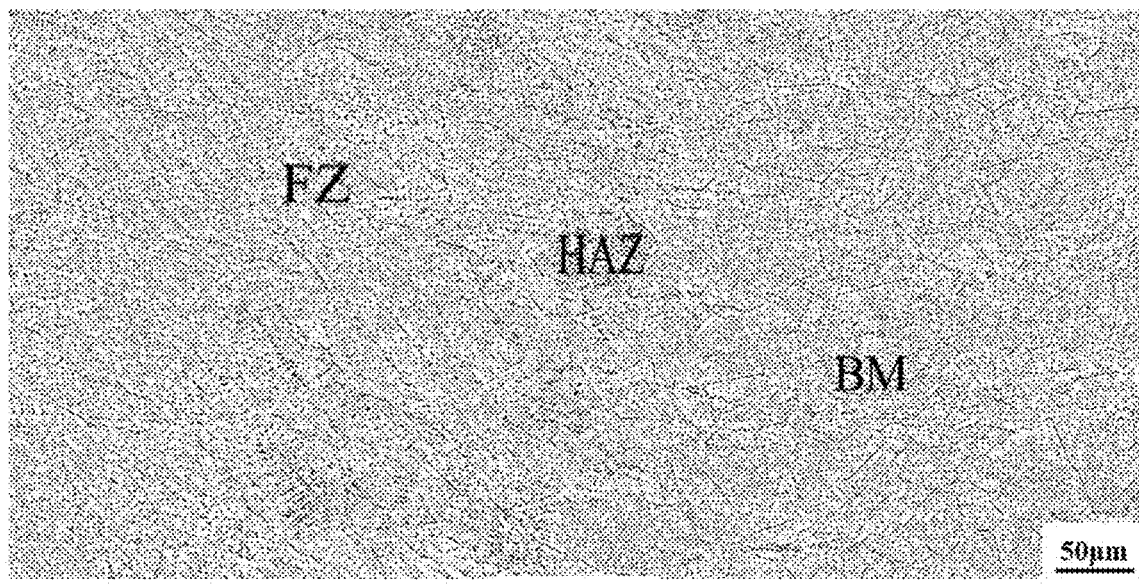
FIG. 4(a) SEM image taken from the as-welded weldment obtained by GTAW with a Fe-29.5Mn-9.8Al-1.48C welding filler wire (FZ: fusion zone; HAZ: heat-affected zone; BM: base material).
Figure 4B:
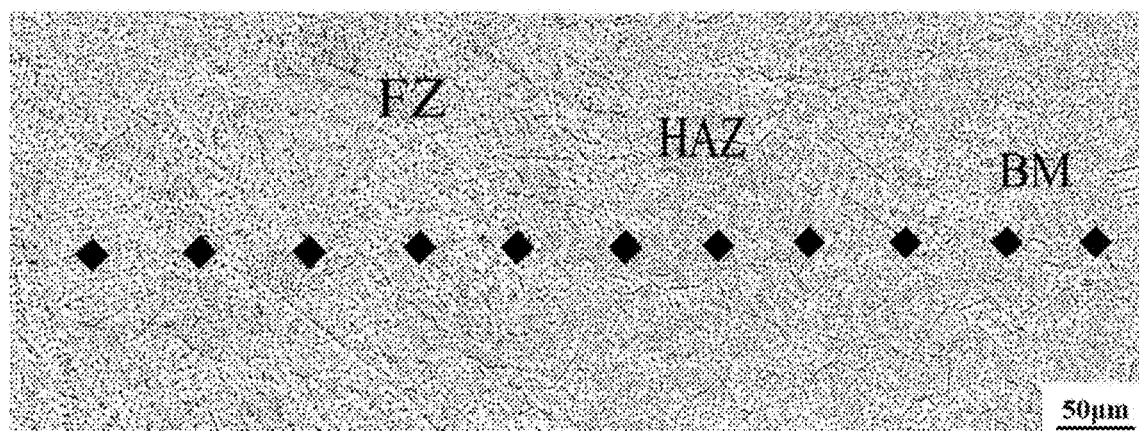
FIG. 4(b) SEM image and the microhardness indentation conducted across the FZ, HAZ and BM.
Figure 4C:
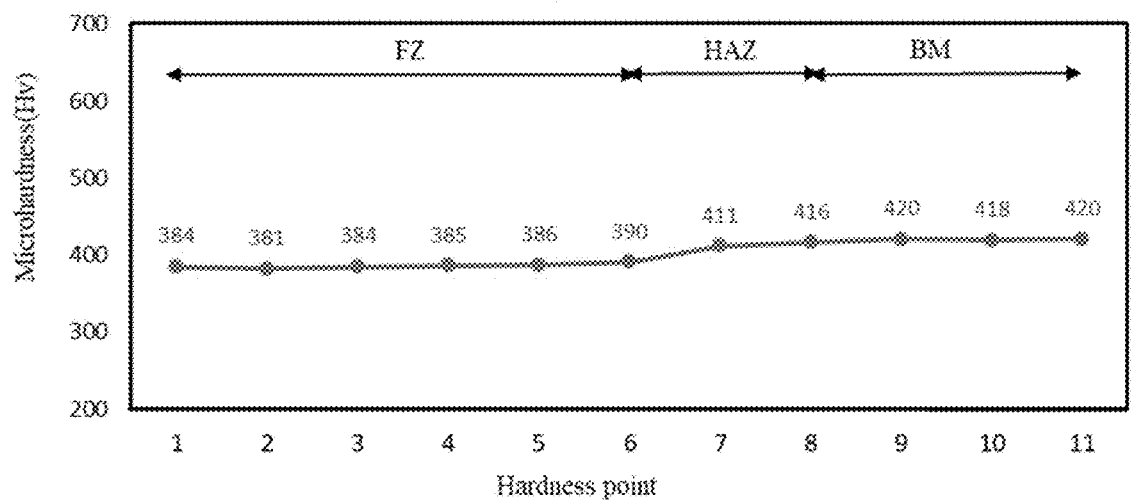
FIG. 4(c) Microhardness values corresponding to the respective measured points in (b).

FIG. 4(a) shows the typical SEM image covering the FZ, HAZ, and BM of the as-welded sample. Obviously, the FZ microstructure is very similar to that seen in the previous Examples 1-3. Namely, typical columnar austenite grains consist of austenite dendrite cells and eutectic regions. The unique feature of having nano-sized κ-carbides densely distributed within the austenite dendrite cells and eutectic regions is still observed. Nevertheless, due to the further reduction of carbon content in the welding filler used in the present Example, the amount of nano-sized κ-carbides distributed within the austenite dendrite cells and eutectic regions appears to be slightly reduced. Moreover, it is noted that, within the FZ and near the interface between the FZ and HAZ, there is no trace of microcrack and porosity can be observed. Also, the density of the nano-sized κ-carbides originally existing in HAZ and BM apparently was not influenced during the fusion welding process. FIG. 4(b) shows the Vickers microhardness measurements conducted across the FZ, HAZ and BM. The corresponding values of the respective measured hardness points are displayed in FIG. 4(c), which reveals that the average microhardness of FZ, HAZ and BM is about 385 Hv, 414 Hv, and 419 Hv, respectively. The lowering of the microhardness in FZ is presumably due to the lower carbon content of the welding filler used in the present Example. It is noted that, like that seen in previous Examples, there is no apparent softening originated from fusion welding.

Figure 4D:
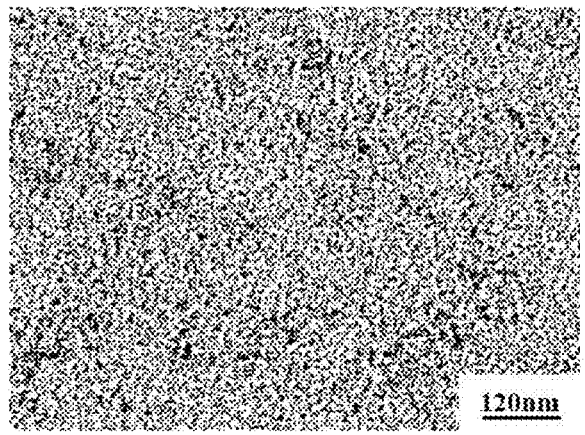
FIG. 4(d) TEM bright field image taken from the FZ of the weldment.
Figure 4E:
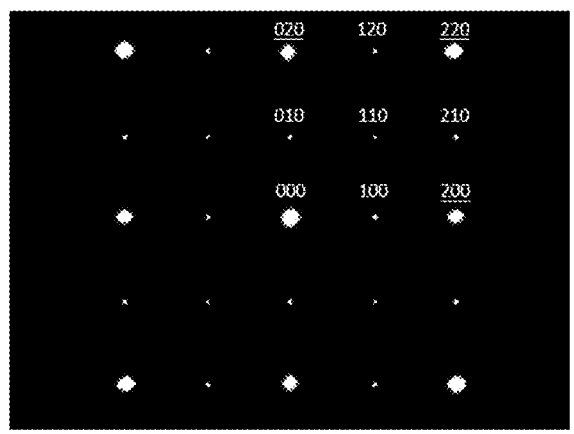
FIG. 4(e) A SADP taken from the FZ, the zone axis is [001] (hkl: austenite; hkl: κ-carbide).
Figure 4F:
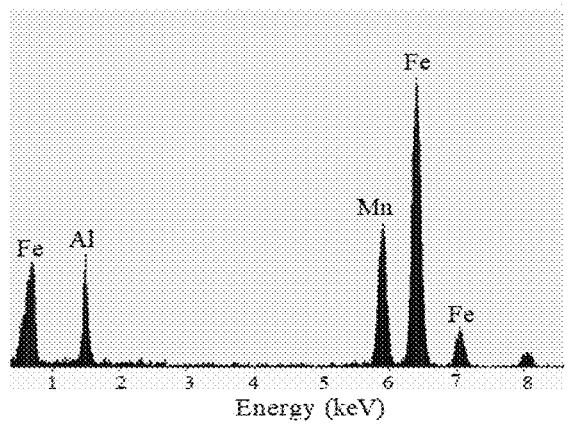
FIG. 4(f) TEM-EDS profile obtained from the FZ of the weldment.

FIG. 4(d) is the TEM BF image taken from the FZ, revealing the presence of nano-sized κ-carbides existing within the austenite dendrite cells and eutectic regions. However, it is evident that the density of κ-carbides within the austenite dendrite cells and eutectic regions is slightly lowered as compared to that seen in the previous Examples 1-3. FIG. 4(e) shows the SADP taken from FZ, which confirms that the microstructure of FZ is indeed composed of austenite and κ-carbides. FIG. 4(f) is the TEM-EDS profile taken from the FZ, which indicates that the compositions of Fe, Mn and Al in FZ are about 61.7%, 28.8% and 9.5%, respectively. The tensile test indicated that the YS, UTS and El of the weldment of the present Example were ~875 MPa, ~1012 MPa and ~29.8%, respectively. A closer inspection showed that the tensile-fractured specimen also exhibited typical characteristics of ductile plastic deformation in FZ. However, due to the comparatively larger microhardness difference between the FZ (~385 Hv) and BM (~419 Hv) (FIG. 4(c)), the deformation has been mostly taking place in FZ, while the HAZ and BM regions exhibited a relatively small amount of deformation, resulting in an overall reduction of total elongation. Nevertheless, severe necking and corrugated free surface as well as the meandering fracture pattern observed in FZ after tensile test indicates the good ductility of the welding bead.

It is worthwhile to note here that the value of FZ microhardness (~385 Hv) obtained in the present Example is comparable with that (350~400 Hv) obtained in the optimally aged precipitation-hardened Fe—Mn—Al—C alloys with C1.2 wt. % as quoted in Background section. From the above SEM and TEM results, it is evident that, with the designed composition, the welding filler wire used in the present Example still preserves most of the main microstructural features in FZ, namely, high-density of nano-sized κ-carbides within the austenite dendrite cells and eutectic regions. Accordingly, it is reasonable to expect that the FZ should have outstanding combination of YS and ductility resulted from the innovative welding filler wire disclosed in the present invention. Indeed, the YS (~875 MPa) and El (~29.8%) obtained from the weldment of the present example are comparable with those obtained in the optimally aged precipitation-hardened Fe—Mn—Al—C alloys with C≤1.2 wt. % (YS: 680~990 MPa and El: 55~26%).

EXAMPLE 5

In the present Example, the base material used was the same as that used in Example 1. The dimensions of the base material plates used in the present Example were 80 mm×80 mm×8 mm. Two plates of base material were machined to form a single V-groove butt weld. The nominal composition of the welding filler wire used in the present Example was Fe-33.8Mn-10.6Al-1.38C with a wire diameter φ~2.4 mm. The GTAW process was conducted with the parameters similar to those used in Example 1 and 75% Ar+25% He gas mixture was used as the shielding gas.

Figure 5A:
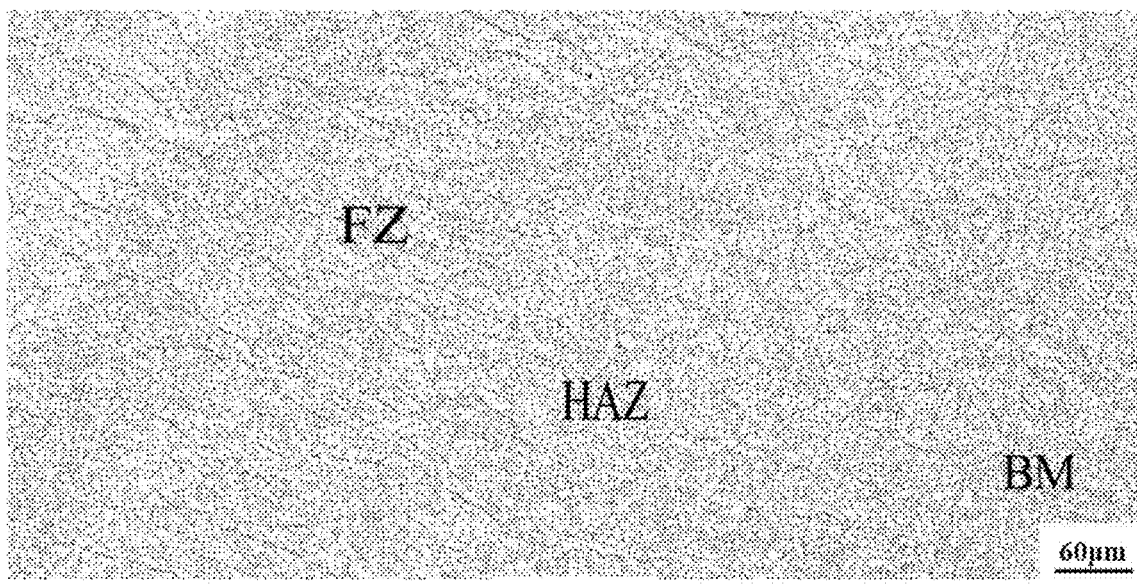
FIG. 5(a) SEM image taken from the as-welded wekdment obtained by GTAW with a Fe-33.8Mn-10.6Al-1.38C welding filler wire (FZ: fusion zone; HAZ: heat-affected zone; BM: base material).
Figure 5B:
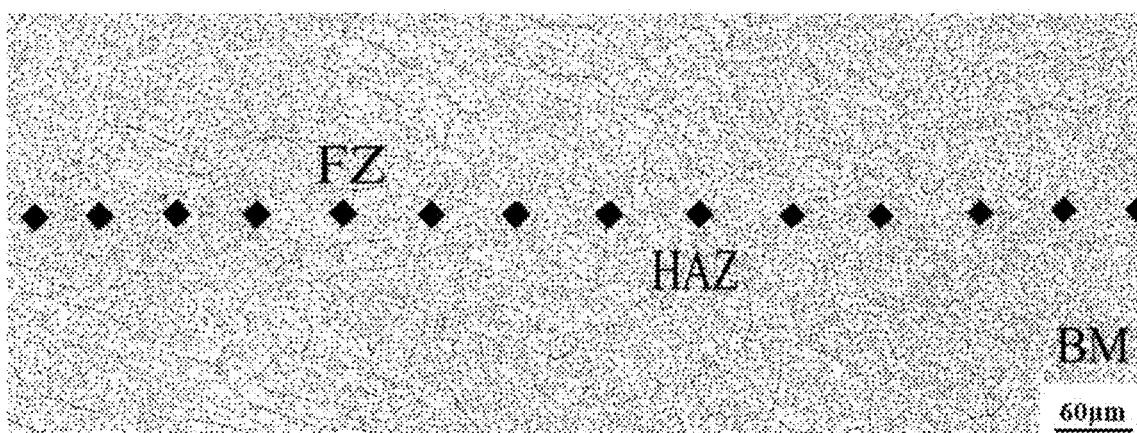
FIG. 5(b) SEM image and the microhardness indentation conducted across the FZ, HAZ and BM.
Figure 5C:
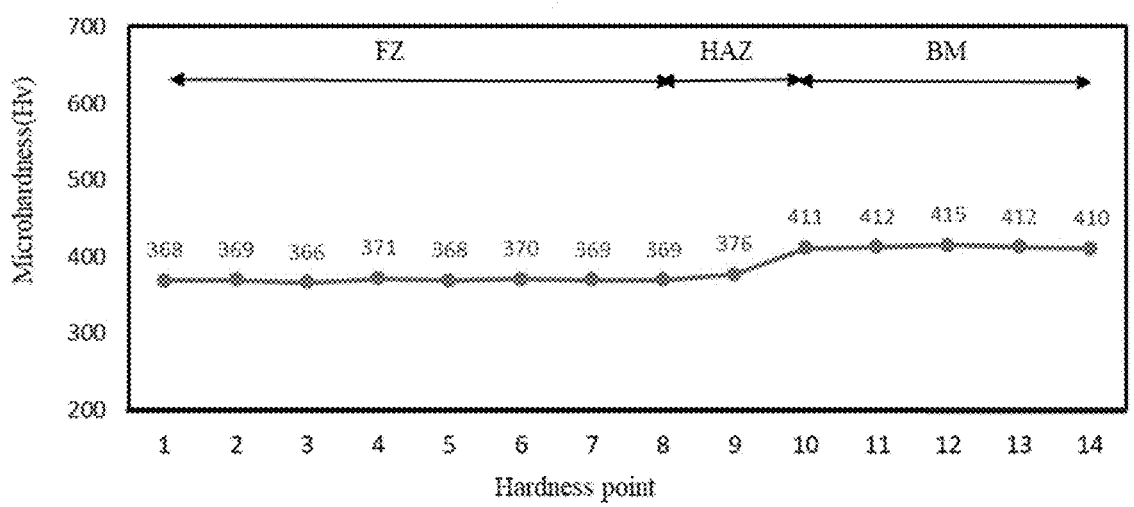
FIG. 5(c) Microhardness values corresponding to the respective measured points in (b).

FIG. 5(a) is the SEM image, revealing the microstructure covering the FZ, HAZ and BM regions of the as-welded sample. Similar to previous Examples 1-4, the FZ is composed of typical columnar austenite grains and the unique feature of substantial amount of nano-sized κ-carbides uniformly distributed within the austenite dendrite cells and eutectic regions can still be observed. However, the density of nano-sized κ-carbides was considerably reduced. On the other hand, the density of the nano-sized κ-carbides originally existing in HAZ and BM apparently was not influenced during the fusion welding process. Moreover, it is noted that, within the FZ and near the interface between the FZ and HZ, there is no trace of microcrack and porosity can be observed. FIG. 5(b) shows the Vickers microhardness measurements conducted across the FZ, HAZ and BM. The corresponding values of the respective measured hardness points are displayed in FIG. 5(c), which reveals that the average microhardness values of FZ, HAZ and BM are about 369 Hv, 385 Hv, and 412 Hv, respectively. The lowering of the microhardness in FZ is presumably due to the lower carbon content of the welding filler wire used in the present Example, which evidently leads to further reduction in the density of nano-sized κ-carbides within the austenite dendrite cells and eutectic regions.

Figure 5D:
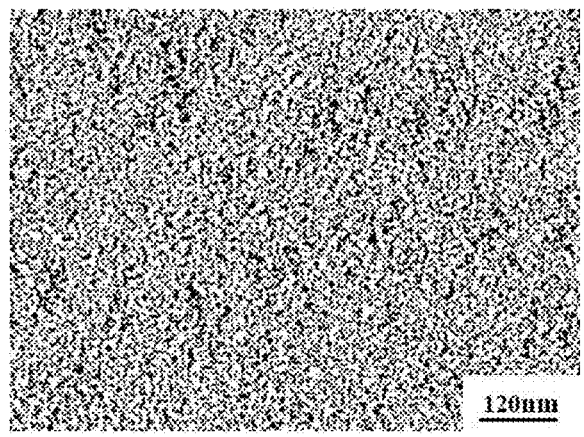
FIG. 5(d) TEM bright field image taken from the FZ of the weldment.
Figure 5E:
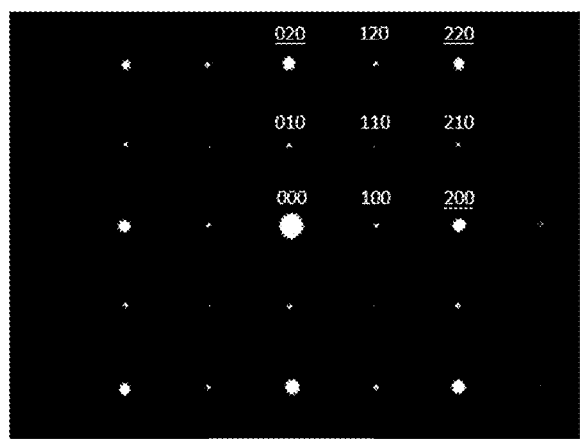
FIG. 5(e) A SADP taken from the FZ, the zone axis is [001] (hkl: austenite; hkl: κ-carbide).
Figure 5F:
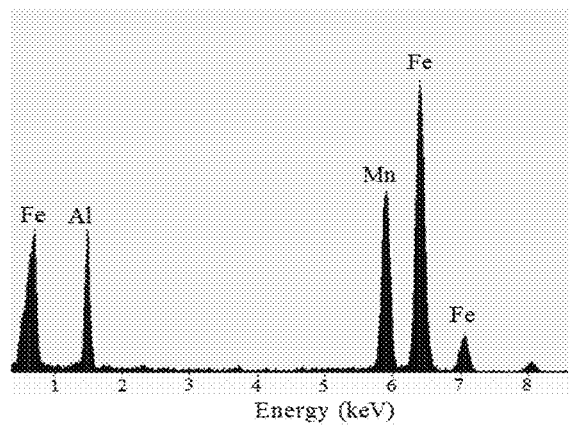
FIG. 5(f) TEM-EDS profile obtained from the FZ of the weldment.

FIG. 5(d) is the TEM BF image taken from the FZ, revealing the presence of nano-sized κ-carbides existing within the austenite dendrite cells and the eutectic regions. It is evident that the density of κ-carbides within the austenite dendrite cells and eutectic regions is substantially reduced as compared to that seen in previous Examples 1-4. FIG. 5(e) shows the SADP taken from FZ, which again confirms that the microstructure of FZ is indeed composed of austenite and κ-carbides. FIG. 5(f) is the TEM-EDS profile taken from the FZ, which shows that the compositions of Fe, Mn and Al in FZ are about 56.6%, 33.1% and 10.3%, respectively.

The tensile test indicated that the YS, UTS and El of the weldment of the present Example were ~725 MPa, ~1005 MPa and ~23.8%, respectively. A closer inspection of the tensile-fractured specimen revealed that the FZ region exhibited pronounced ductile plastic deformation behavior. However, due to the larger microhardness difference between the FZ (~369 Hv) and BM (~412 Hv) (FIG. 5(c)), the tensile-fractured specimen showed that the deformation was taking place mainly in FZ, and the HAZ and BM regions exhibited only slightly deformation, leading to a considerable reduction in total elongation.

From the above results, it is evident that with the designed composition the welding filler wire used in the present Example still preserves most of the unique microstructural features in FZ disclosed in the present invention. Moreover, the resultant microhardness in FZ (~369 Hv) is still comparable to those obtained (~350-400 Hv) in optimally aged precipitation-hardened Fe—Mn—Al—C alloys with C≤1.2 wt. %. As mentioned in Example 4, with the high similarity in the microstructure and resultant microhardness, the FZ of the present Example is expected to have a satisfactory combination of YS and ductility, as well. It is worthwhile to emphasize here the unique microstructural features of the base materials used in the embodiment Examples 1-5 of the present invention. Namely, in the as-hot-rolled state, the base material microstructure is already composed of full austenite with a high-density of nano-sized κ-carbides uniformly distributing within the austenitic matrix. The density of the nano-sized κ-carbides is even much higher than that obtained in optimally aged precipitation-hardened Fe—Mn—Al—C alloys with C≤1.2 wt. %. As a result, the microhardness of the BMs (~412-420 Hv) used in Examples 1-5 was all significantly larger than those obtained (~350-400 Hv) in the optimally aged precipitation-hardened Fe—Mn—Al—C alloys with C≤1.2 wt. %.

EXAMPLE 6

The purpose of the present Example attempts to clarify the effects of further lowering the carbon content in the welding filler wire on the characteristics of FZ in the as-welded sample. The base material used was the same as that used in Example 1. The dimensions of the BM plates were 80 mm×80 mm×8 mm, which were machined to form a single V-groove butt weld. The GTAW process was conducted with the parameters similar to those used in Example 1. The nominal composition of the welding filler wire used in the present Example was Fe-31.8Mn-9.2Al-1.25C with a wire diameter φ~2.4 mm.

Figure 6A:
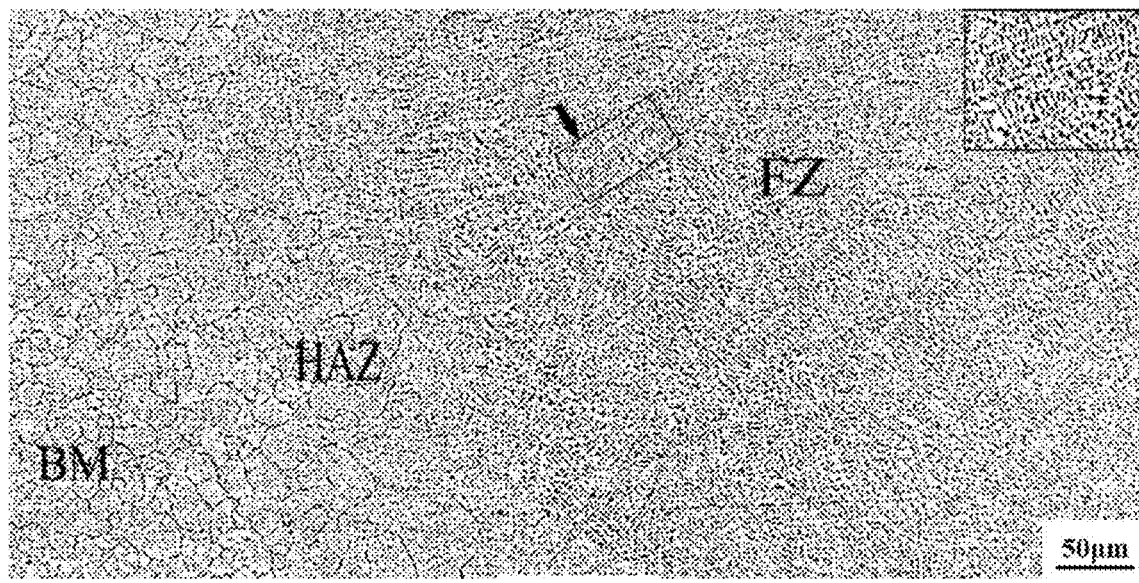
FIG. 6(a) SEM image taken from the as-welded weldment obtained by GTAW with a Fe-31.8Mn-9.2Al-1.25C welding filler wire (FZ: fusion zone; HAZ: heat-affected zone; BM: base material). The inset shows the enlarged image of the area marked in the figure.

FIG. 6(a) shows the typical SEM image of an area covering the FZ, HAZ and BM of the as-welded sample. The FZ microstructure clearly reveals several features that are very distinct from those seen in Examples 1-5 described above. Firstly, the matrix is still fully austenitic containing austenite dendrite cells and eutectic regions. However, there is no κ-carbide distributing within the austenite dendrite cells and the amount of the κ-carbides in the eutectic regions is substantially reduced. To have a better view of this feature, an enlarged image of the marked area (indicated by the arrow) is inserted on the upper right corner of FIG. 6(a). This feature is quite different from the microstructures described in Examples 1-5. In fact, it is very similar to that observed previously by Chou and Lee in the autogenous fusion welding of Fe—Mn—Al—C alloys with C≤1.29 wt. %, namely, no κ-carbides distributing within the austenite dendrite cells, as quoted in the Background section.

Figure 6B:
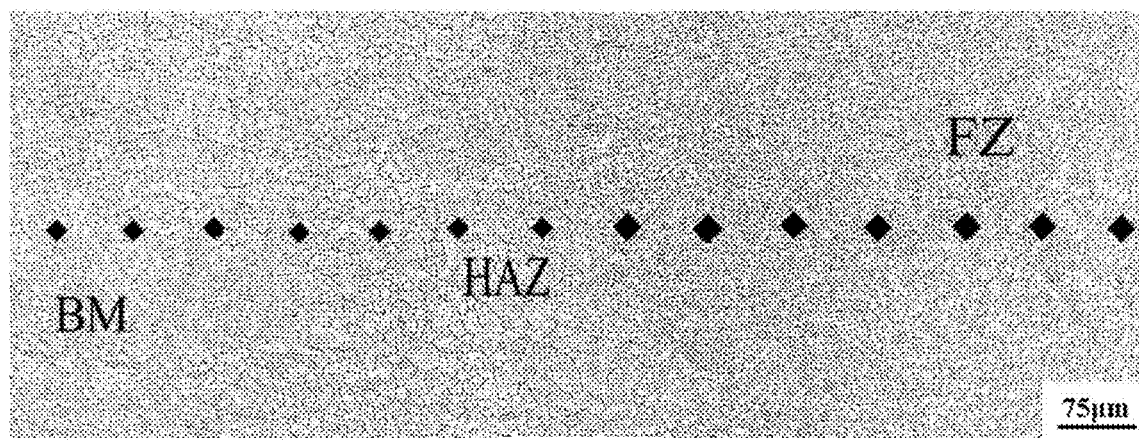
FIG. 6(b) SEM image and the microhardness indentation conducted across the FZ, HAZ and BM.
Figure 6C:
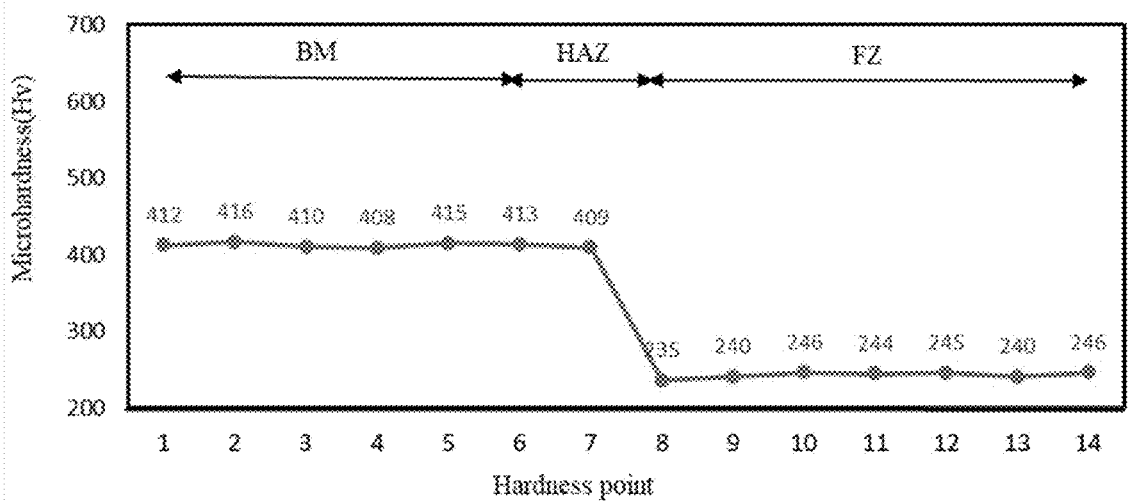
FIG. 6(c) Microhardness values corresponding to the respective measured points in (b).

FIG. 6(b) shows the Vickers microhardness measurements conducted across the regions of BM, HAZ, and FZ. The corresponding values of respective measured hardness points are shown in FIG. 6(c). It is evident from both figures that the microhardness in HAZ and BM is ~412 Hv, however, the microhardness in FZ has dropped precipitously to only about 242 Hv. This value of microhardness is very close to the values of 210-230 Hv for the C≤1.2 wt. % precipitation-hardened austenitic Fe—Mn—Al—C alloys in their SHT and as-quenched state, as quoted in Background section. It is believed that the absence of κ-carbides within the austenite dendrite cells and the substantial reduction of κ-carbides within the eutectic regions are the primary reasons responsible for the drastic reduction in FZ microhardness.

Figure 6D:
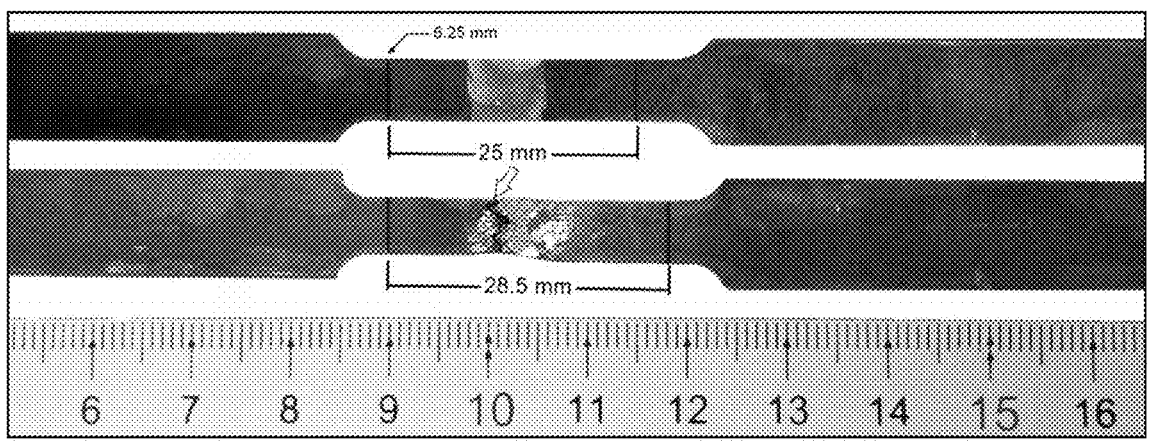
FIG. 6(d) Macroscale images of the tensile specimens before and after tensile test.

FIG. 6(d) shows the macroscale images of specimens before and after the tensile test. The results indicate that the YS, UTS, and El of the weldment are about 462 MPa, 938 MPa and 14%, respectively. Obviously, both the YS and elongation of the weldment obtained from the present Example are far from satisfactory. The main reason for the significant reduction in elongation might have been due to the fact that the microhardness of FZ (~242 Hv) is much smaller than that of HAZ and BM (~412 Hv). As a result, during the tensile test the deformation of the entire weldment is essentially localized in the fusion zone, while the HAZ and BM remained almost undeformed, leading to a substantial reduction in elongation. It can also be observed in FIG. 6(d) that the fracturing crack appears to initiate at the interface between FZ and HAZ (as indicated by the arrow) and then penetrating the FZ transversely with a meandering zig-zag fracture line. The estimated elongation within the FZ is about 27%. The fact that the microhardness is only about 242 Hv and the localized deformation, initiation of necking and subsequent fracturing are all occurred in the FZ, suggests that the strength of FZ is considerably lower than that of the HAZ and BM. The primary reason is presumably due to the absence of high-density of κ-carbides distributing within the austenite dendrite cells and the substantial reduction in the amount of κ-carbides within eutectic regions. It seems that welding filler wires with 1.25 wt. % carbon content appear to be inadequate for promoting the formation of nano-sized κ-carbides within the austenite dendrite cells and eutectic regions during solidification, which is the most unique feature disclosed in the present invention.

EXAMPLE 7

The aim of this Example is to investigate the effects of higher carbon content in the welding filler wire on the characteristics of FZ in the as-welded sample. The base material used in the present Example was the same as that used in Example 3. The dimensions of the BM plates were 80 mm×80 mm×10 mm, which were machined to form a single V-groove butt weld. The GTAW process was conducted with parameters similar to those used in Example 1. The nominal composition of the welding filler wire used in the present Example was Fe-30.5Mn-8.9Al-2.2C with a wire diameter φ~2.4 mm.

Figure 7A:
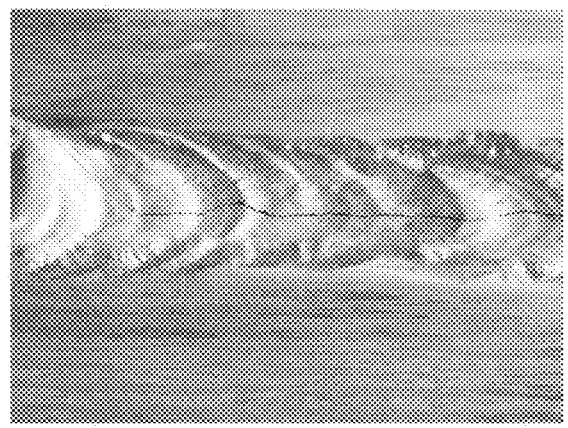
FIG. 7(a) The macroscale image of the welding bead obtained by GTAW with a Fe-30.5Mn-8.9Al-2.2C welding filler wire. Notice the solidification crack on the welding bead.
Figure 7B:
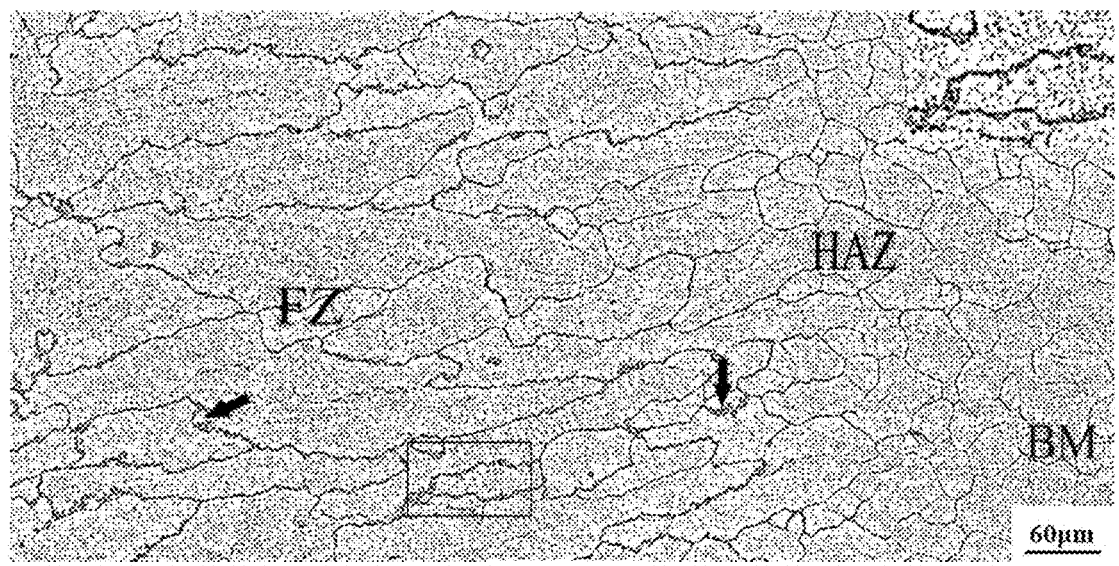
FIG. 7(b) SEM image taken from the as-welded weldment (FZ: fusion zone; HAZ: heat-affected zone; BM: base material). The inset shows the enlarged image of the area marked in the figure. The arrows indicate the coarse κ-carbides formed on the austenite grain boundaries.

FIG. 7(a) shows the macroscale image of the welding bead, clearly revealing a macrocrack transpierced through the welding bead. Apparently, the higher carbon content in the welding filler wire had led to severe solidification hot cracking effect. FIG. 7(b) shows the SEM image of an area covering the FZ, HAZ, and BM of the as-welded sample. It is clear that the FZ is mainly composed of typical columnar austenite grains and there are high-density of nano-sized κ-carbides existing within the austenite dendrite cells and eutectic regions. This feature is similar to that observed in Examples 1-5. However, some μm-sized coarse carbides can be observed on the grain boundaries (as indicated by the arrows in FIG. 7(b)). An enlarged image of the marked area is displayed on the upper right corner of FIG. 7(b), which clearly reveals that there exist precipitation-free zones nearby the coarse carbides formed on the grain boundaries. Both the coarse grain boundary precipitates and the associated precipitation-free zones are well-known to have detrimental effects on the mechanical properties, especially the ductility. Moreover, FIG. 7(b) also reveals that the density of the nano-sized κ-carbides originally existing in HAZ and BM apparently was not affected noticeably during the fusion welding process.

Figure 7C:
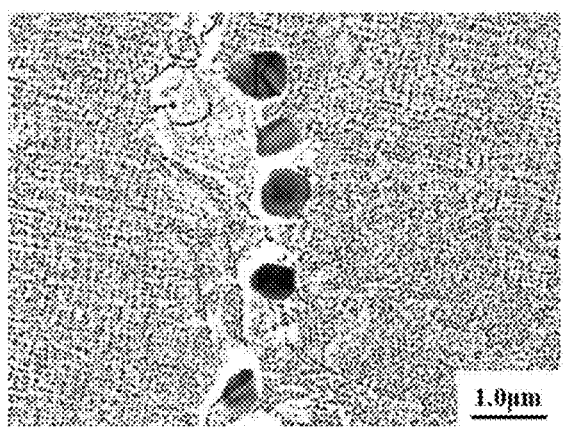
FIG. 7(c) TEM bright field image taken from the FZ of the weldment.
Figure 7D:
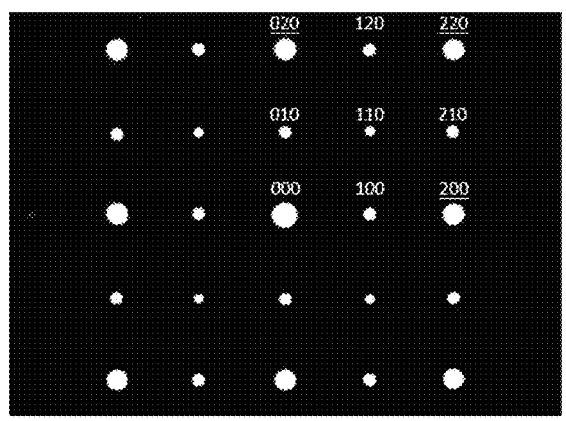
FIG. 7(d) A SADP taken from a coarse κ-carbide marked as "K" in (c), the zone axis is (hkl: austenite; hkl: κ-carbide).
Figure 7E:
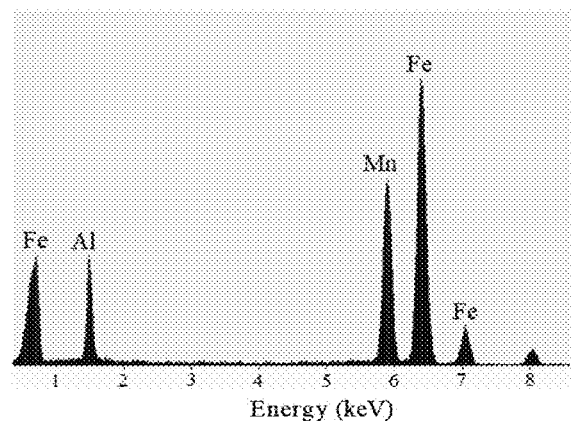
FIG. 7(e) TEM-EDS profile obtained from the coarse κ-carbide.

FIG. 7(c) is the TEM BF image taken from the FZ, clearly showing that, in addition to the high-density of nano-sized κ-carbides, there are some μm-sized coarse precipitates (marked as K) existing on the austenite grain boundary. Moreover, there are apparent precipitation-free zones in the vicinity of the coarse precipitates. FIG. 7(d) is the SADP taken from a coarse grain boundary precipitate (marked as K), indicating that these grain boundary coarse precipitates are the L'$1_2$-structured κ-carbides. The structure is the same as that of the nano-sized κ-carbides distributing within the austenite dendrites cells and eutectic regions. FIG. 7(e), the typical TEM-EDS profile of a grain boundary coarse κ-carbide indicates that the compositions of Fe, Mn and Al in the coarse κ-carbide are 56.7%, 34.2% and 9.1%, respectively.

Based on the above observations, it is clear that higher carbon content (i.e. 2.2 wt. %) in the welding filler wire, although can result in high-density of nano-sized κ-carbides existing within the austenite dendrite cells and eutectic regions, but also lead to some coarser κ-carbides appearing on the grain boundaries. The grain boundary coarse κ-carbides and their associated precipitation-free zones not only are expected to cause some detrimental effects, such as ductility, on the weldment, but also have resulted in severe solidification hot cracking effect in the welding bead, as shown in FIG. 7(a).

EXAMPLE 8

In this Example, we set to illustrate the effect of higher Al content in the welding filler wire on the characteristics of FZ in the as-welded sample. The base material used in the present Example was the same as that used in Example 1. Two plates of BM with the dimensions of 80 mm×80 mm×8 mm were machined to form single V-groove butt weld. The GTAW process was conducted with the parameters similar to those used in Example 1. The nominal composition of the welding filler wire was Fe-30.5Mn-12.5Al-1.55C with a wire diameter φ~2.4 mm.

Figure 8A:
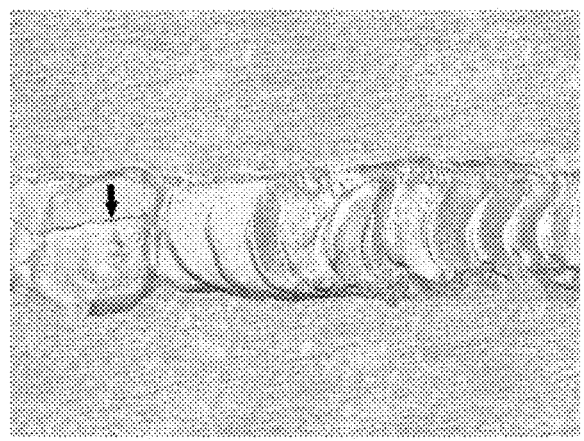
FIG. 8(a) The macroscale image of the welding bead obtained by GTAW with a Fe-30.5Mn-12.5Al-1.55C welding filler wire. Notice the solidification crack (indicated by the arrow) on the welding bead.
Figure 8B:
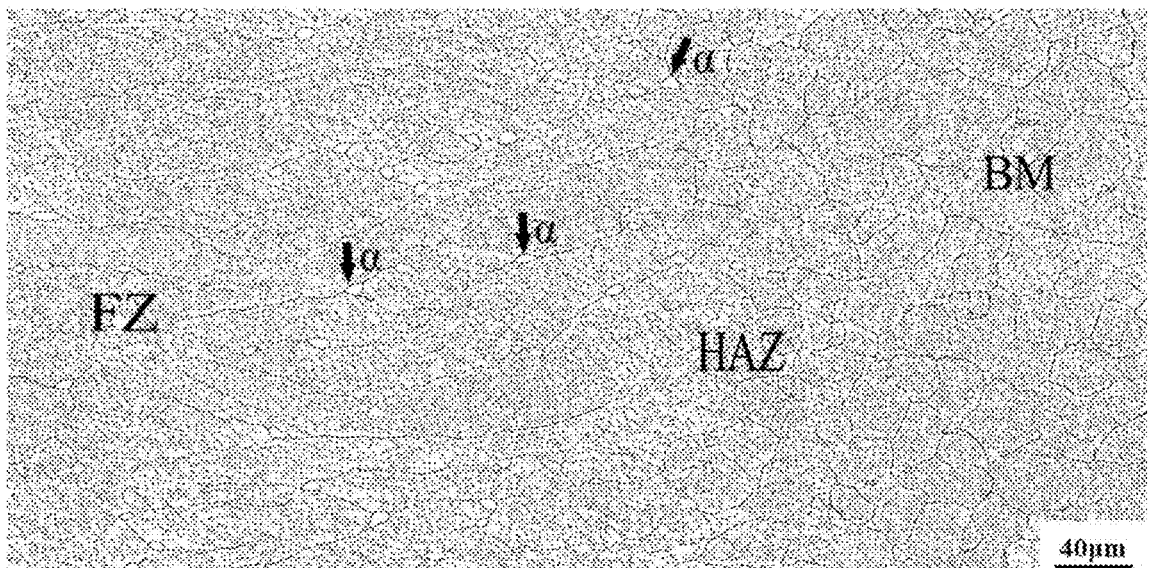
FIG. 8(b) SEM image taken from the as-welded weldment (FZ: fusion zone; HAZ: heat-affected zone; BM: base material). The arrows indicate the Al-rich particles (denoted as a) formed on the austenite grain boundaries.
Figure 8C:
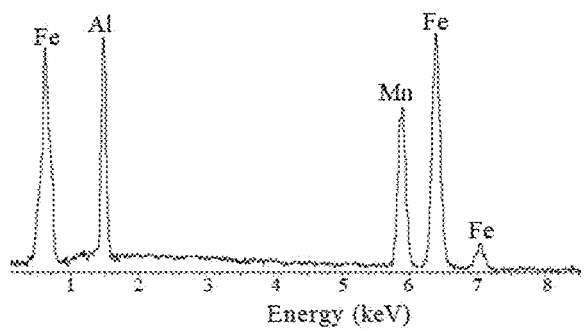
FIG. 8(c) SEM-EDS profile taken from a discrete Al-rich particle.
Figure 9A:
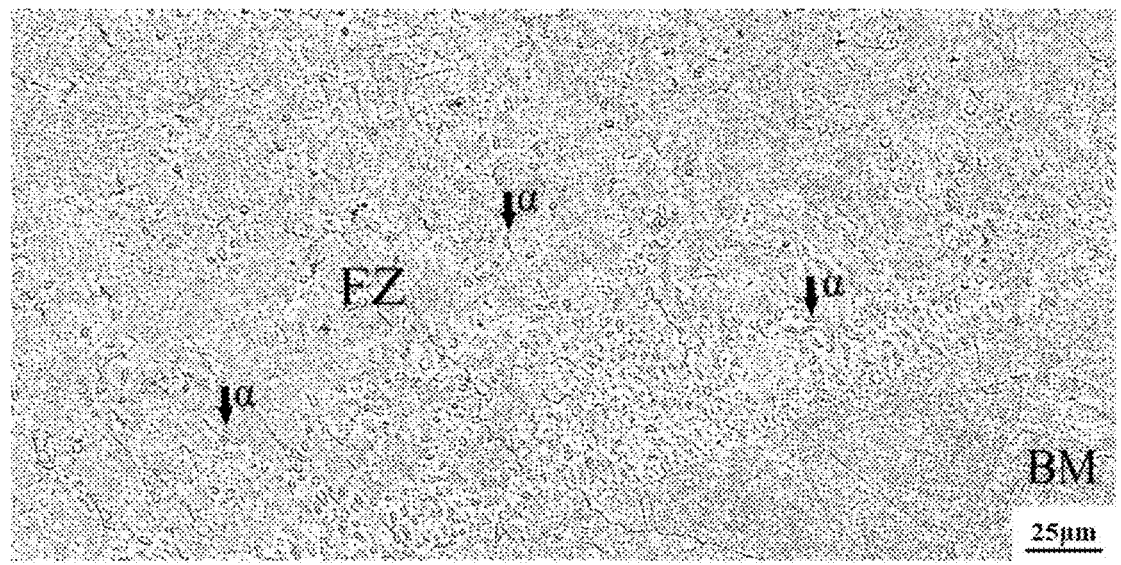
FIG. 9(a) SEM image taken from the as-welded weldment obtained by GTAW with a Fe-20.1Mn-8.5 Al-1.52C welding filler wire (FZ: fusion zone; BM: base material). The arrows indicate the discrete ferrite phase (denoted as a) distributing in FZ.
Figure 9B:
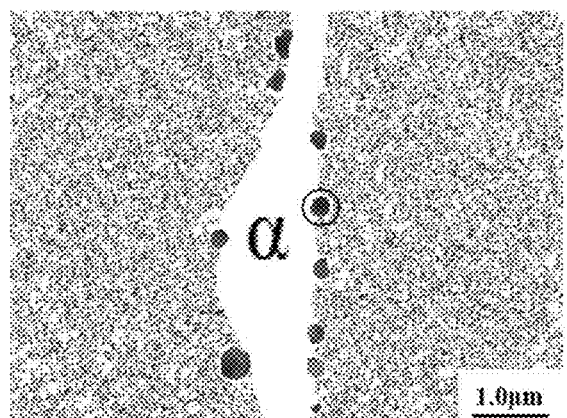
FIG. 9(b) TEM bright field image taken from the FZ of the weldment. The discrete ferrite grain is denoted as a and the circle marks the coarse κ-carbide formed on the ferrite/austenite boundary.
Figure 9D:
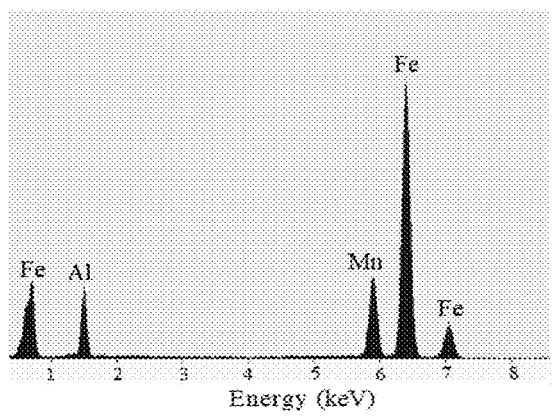
FIG. 9(d) TEM-EDS profile obtained from the austenite region.
Figure 9C:
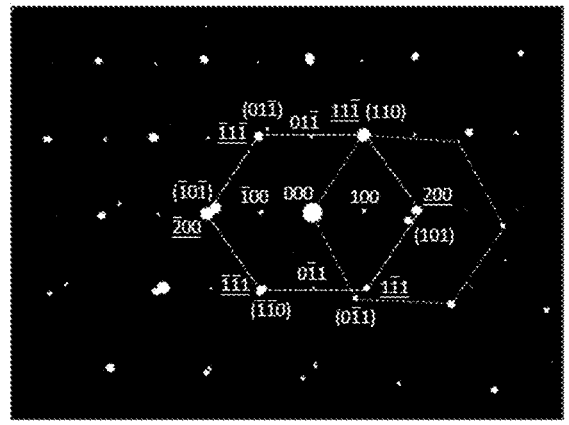
FIG. 9(c) A SADP taken from the area circled in (b) (hkl: austenite; hkl: κ-carbide; (hkl): ferrite).
Figure 9E:
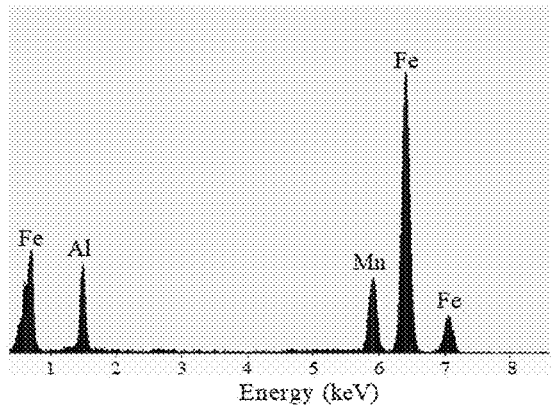
FIG. 9(e) TEM-EDS profile obtained from the ferrite region.
Figure 10A:
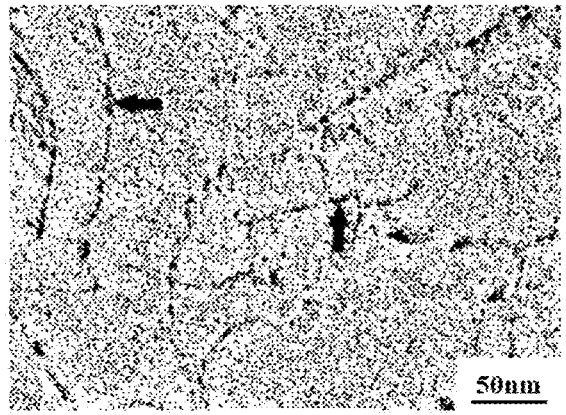
FIG. 10(a)-(c) TEM micrographs of the as-hot-rolled Fe-29.3Mn-9.3Al-1.75C base material. (a) Bright field image; (b) A SADP, the zone axis is [001] (hkl: austenite; hkl: κ-carbide); (c) $(100)_K$ dark field image taken from the same area in (a).
Figure 10D:
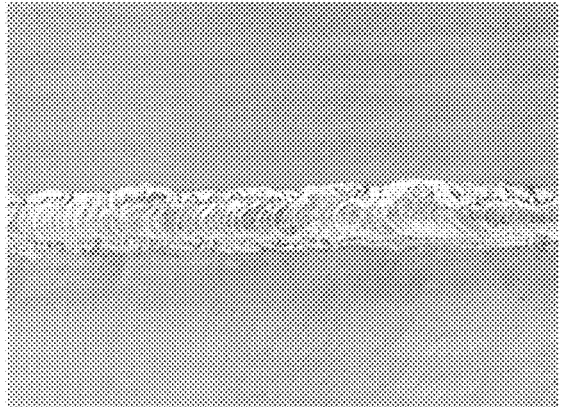
FIG. 10(d) The macroscale image of the welding bead obtained by GTAW with a Fe-28.5Mn-9.3Al-1.82C-1.6Ti welding filler wire.
Figure 10B:
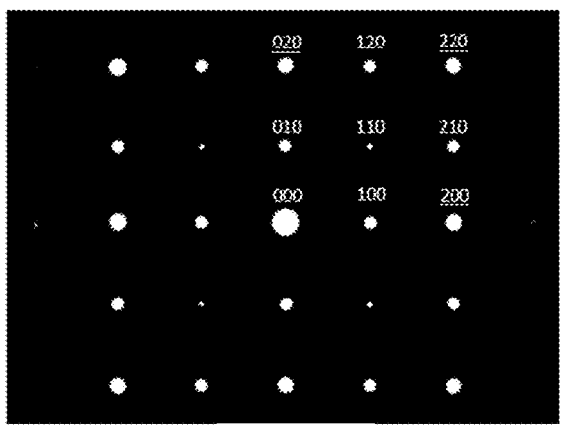
Figure 10C:
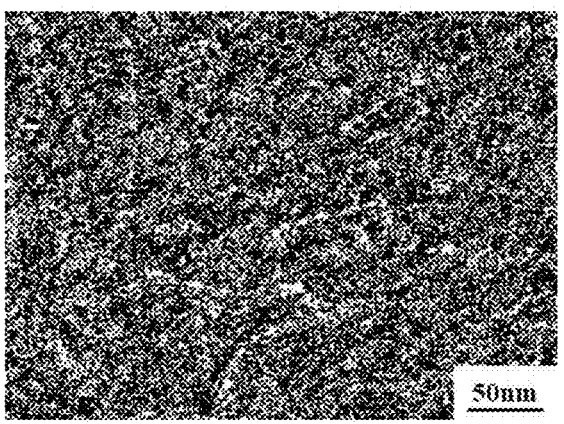
Figure 10E:
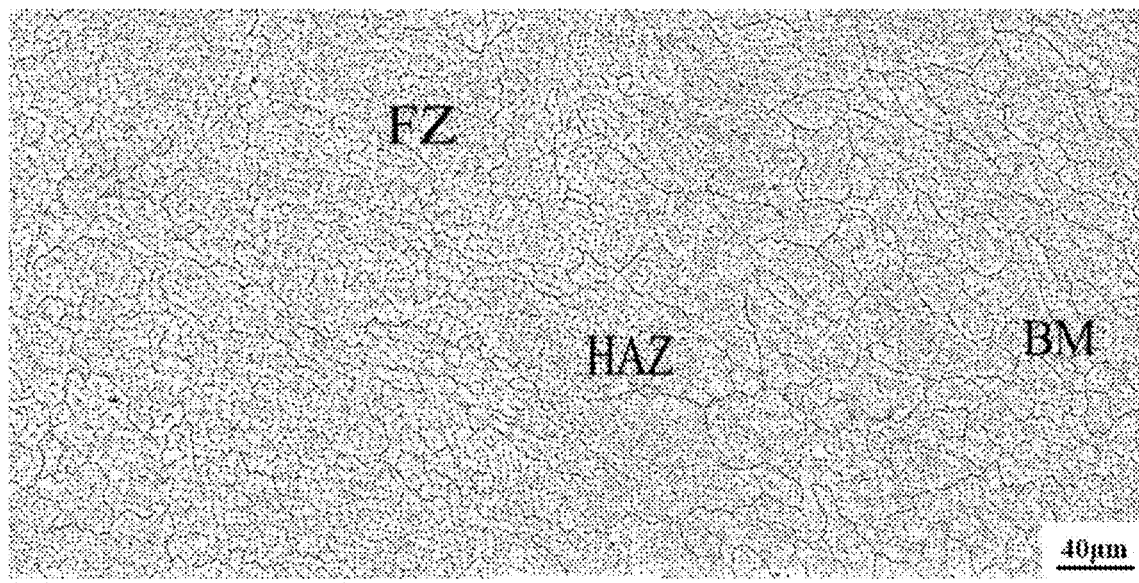
FIG. 10(e) SEM image taken from the as-welded weldment (FZ: fusion zone; HAZ: heat-affected zone; BM: base material).
Figure 10F:
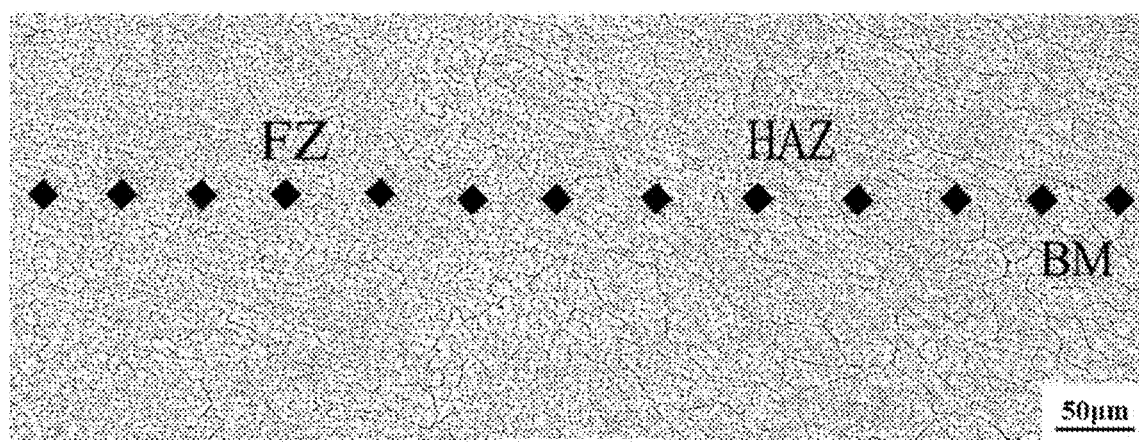
FIG. 10(f) SEM image and the microhardness indentation conducted across the FZ, HAZ and BM.
Figure 10G:
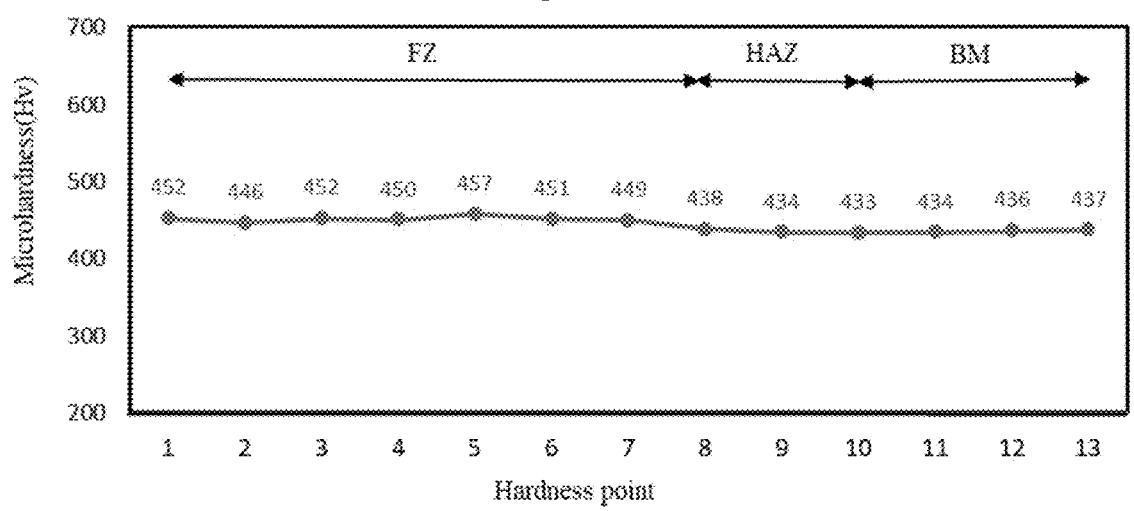
FIG. 10(g) Microhardness values corresponding to the respective measured points in (f).
Figure 10H:
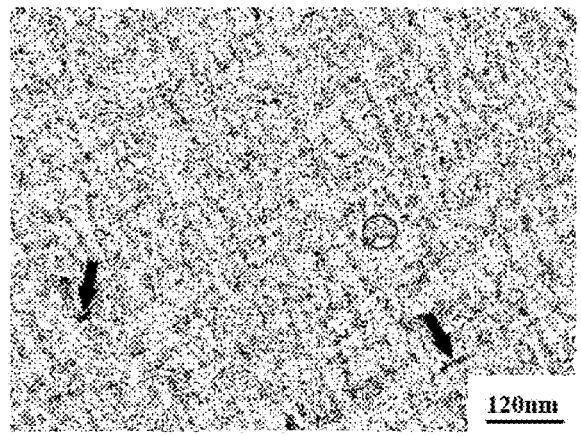
FIG. 10(h) TEM bright field image taken from the FZ of the weldment. The arrows indicate the κ-carbides and Ti-rich Ti-carbides within the eutectic regions.
Figure 10I:
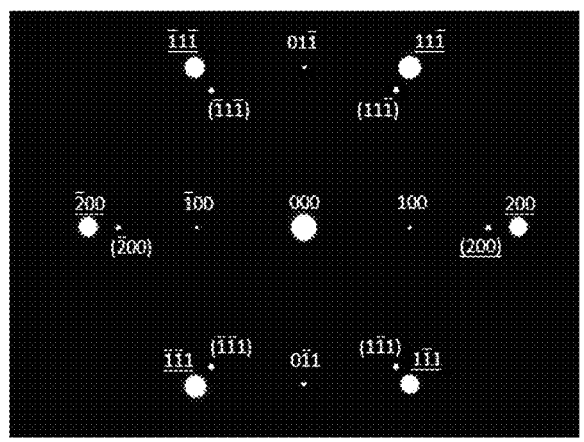
FIG. 10(i) A SADP taken from the area circled in (h) (hkl: austenite; hkl: κ-carbide; (hkl): Ti-carbide).
Figure 10J:
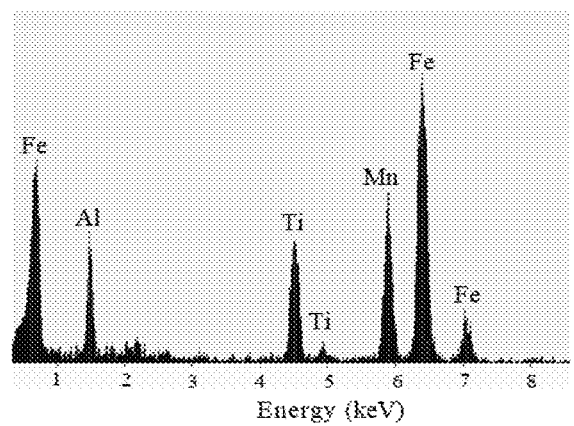
FIG. 10(j) TEM-EDS profile obtained from the same area circled in (h).
Figure 10K:
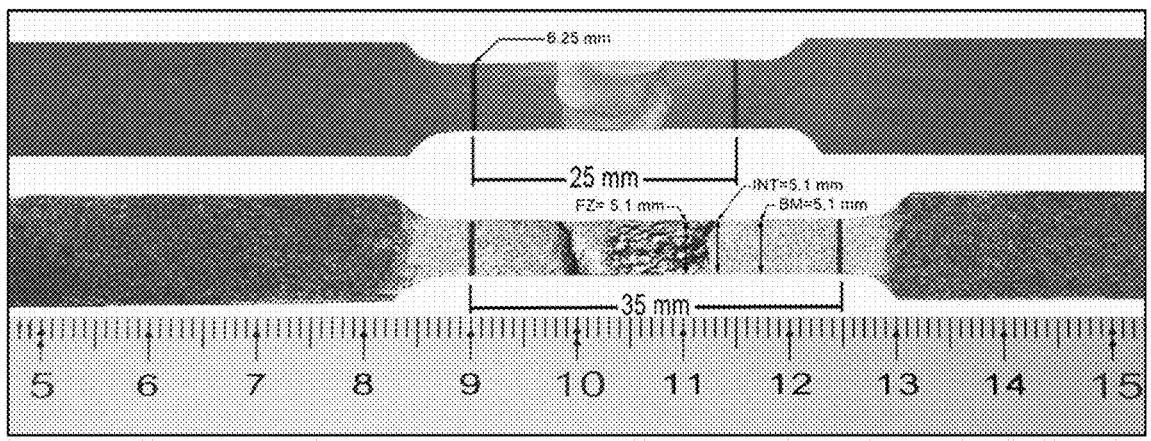
FIG. 10(k) Macroscale images of the tensile specimens before and after tensile test.

Preliminary inspections on the weldment revealed that there was solidification hot cracking appearing on part of the welding bead, as indicated by the arrow in FIG. 8(a). The SEM image shown in FIG. 8(b) indicates that the FZ microstructure contains mainly the typical columnar austenite grains composed of austenite dendrite cells and eutectic regions. Similar to those observed in Examples 1-5, there are high-density of nano-sized κ-carbides existing within the austenite dendrite cells and eutectic regions. However, in addition to the abovementioned features, some discrete particles can be observed on the austenite grain boundaries, as indicated by the arrows and marked with symbol a in FIG. 8(b). FIG. 8(c), the SEM-EDS profile taken from a discrete particle indicates that the compositions of Fe, Mn and Al are 52.3%, 34.2% and 13.5%, respectively. It is evident that the Al concentration in the discrete particle is quite high up to 13.5 wt. %. This indicates that Al-rich particles would form on the austenite grain boundaries during welding process. It has been well established that the existence of the Al-rich secondary phase on the austenite grain boundaries could cause drastic deterioration in ductility of the Fe—Mn—Al—C alloys. Thus, it appears that excessive Al content in the welding filler wire not only leads to the formation of solidification crack during welding process but also results in the formation of detrimental Al-rich phases on the austenite grain boundaries.

EXAMPLE 9

The main purpose of this Example is to examine the effects of Mn content in the welding filler wire on the characteristics of FZ in the as-welded sample. The base material used was the same as that used in Example 1. The dimensions of the BM plates were 80 mm×80 mm×8 mm, which were machined to form a single V-groove butt weld. The GTAW welding process was carried out using the parameters similar to those used in Example 1. The nominal composition of the welding filler wire used in the present Example was Fe-20.1Mn-8.5Al-1.52C with a wire diameter $\phi$~3.2 mm.

FIG. 9($a$) shows the SEM image of an area covering the FZ and BM of the as-welded sample. It is obvious that the microstructure of FZ is distinctly different from that seen in Examples 1-5. Although the high-density of nano-sized κ-carbides can be still observed within the austenite dendrite cells and eutectic regions, there also exists a large amount of discrete ferrite phase (indicated by the arrows and marked as a in FIG. 9($a$)) distributing in the entire FZ. The volume fraction of the ferrite phase was estimated to be about 18 vol. %, as determined by a point-counting technique.

FIG. 9($b$) is the TEM BF image taken from the FZ, showing the nano-sized κ-carbides distributed within the austenite dendrites and eutectic regions. Moreover, it is apparent that some coarse μm-sized κ-carbides formed on the austenite/ferrite grain boundaries. FIG. 9($c$) shows the SADP taken from the area circled in FIG. 9($b$), clearly revealing that the existence of three phases, namely austenite, ferrite and κ-carbides. The orientation relationships between the austenite and ferrite phase are $[011]_\gamma //[\bar{1}11]_\alpha$ and $(11\bar{1})_\gamma //(110)_\alpha$, respectively. FIG. 9($d$) and FIG. 9($e$) show two typical TEM-EDS profiles taken from the austenite dendrite region and the ferrite phase region, respectively. The quantitative chemical compositions within the austenite dendrite region and ferrite phase are Fe-20.6% Mn-8.2% Al and Fe-15.8% Mn-8.8% Al, respectively.

On the basis of the above results, it is interesting to note here that usually for Fe—Mn—Al—C alloys with the compositions of Fe-(17.5~35)Mn-(7.1~12)Al-(0.8~1.2)C, when hot-rolled, solution heat-treated and quenched, the microstructure is always single-phase austenite, as have been described in the Background section. Thus, the present Example further demonstrated that, even with the same chemical composition, the microstructure of the material after fusion welding can be quite different from that obtained by usual heat-treatment processes. Obviously, in order to obtain a ferrite-free full austenite FZ microstructure with high-density nano-sized κ-carbides distributing within the austenite dendrite cells and eutectic regions, the Mn content in the welding filler wire should be substantially higher than ~20 wt. % used in the present Example.

EXAMPLE 10

In this Example of embodiment, we set to investigate the effects of titanium (Ti) addition to the welding filler wire on the characteristics of FZ in the as-welded sample. An as-hot-rolled base material with nominal composition of Fe-29.3Mn-9.3Al-1.75C was used in the present Example of embodiment. FIG. 10($a$) is the TEM BF image of the as-hot-rolled base material, clearly revealing that there are high-density of nano-sized (~3-5 nm) precipitates uniformly distributing within the matrix and formed on the dislocations (indicated by the arrows) during the hot-rolling process. FIG. 10($b$), the selected-area diffraction pattern (SADP), evidently confirms that the matrix of the base material is fully austenitic and the high-density nano-sized precipitates are the ordered L'1$_2$-structured κ-carbides. FIG. 10($c$) is the $(100)_K$ DF image taken from the same area as displayed in FIG. 10($a$), revealing the presence of high-density of nano-sized κ-carbides within the austenite matrix and on the dislocations. TEM microstructural analyses confirmed that the as-hot-rolled microstructure of the base material used in the present Example is single-phase austenite with uniformly distributed high-density of nano-sized κ-carbides. The tensile test revealed that the YS, UTS and El of the as-hot-rolled base material are 1020 MPa, 1198 MPa and 45%, respectively.

Two plates of the as-hot-rolled base material with dimensions of 80 mm×80 mm×12 mm were machined to form a single V-groove butt weld. The GMAW welding process was carried out using the parameters similar to those used in Example 2. The nominal composition of the welding filler wire used in the present Example was Fe-28.5Mn-9.3Al-1.82C-1.6Ti with a wire diameter $\phi$~1.2 mm. FIG. 10($d$) shows the macroscale image of the as-welded sample, revealing that the entire welding bead appears to have a very smooth morphology with no visible macrocrack and porosity. FIG. 10($e$) is the SEM image of an area covering FZ, HAZ and BM of the welded sample. From FIG. 10($e$), several distinct features resulting from the addition of Ti are readily noted. Firstly, the size of the austenite grains in the FZ is apparently much smaller than that seen in previous Examples 1-5 and is even smaller than that in HAZ and BM. Secondly, the morphology of the austenite grains becomes more globular and less oriented. Nevertheless, it is evident that there are still high-density of nano-sized κ-carbides uniformly distributed within the austenite dendrite cells and eutectic regions. Moreover, despite that slightly austenite grain growth in the HAZ is discernible, the high-density of nano-sized κ-carbides originally existing in the BM remained unchanged. Finally, it is noted that, within the FZ and near the interface between the FZ and HAZ, there is no trace of microcrack and porosity can be observed, indicating that the use of the fusion filler wire disclosed in the present invention has evidently eliminated the solidification and liquation cracks commonly encountered in fusion welded precipitation-hardened alloys. FIG. 10($f$) shows the Vickers microhardness measurements conducted across the FZ, HAZ and BM. The corresponding values of the respective measured hardness points are displayed in FIG. 10($g$), which reveals that the average microhardness of FZ, HAZ and BM of the present as-welded sample is about 451 Hv, 435 Hv, and 436 Hv, respectively. Apparently, the FZ does not exhibit any softening like that encountered in most of fusion welded precipitation-hardened alloys. This is mainly because that, in the as-welded conditions (FIG. 10(*e*)), there are high-density of nano-sized κ-carbides existing within the austenite dendrite cells and eutectic regions. Moreover, in addition to the nano-sized κ-carbides, there are also significant amount of high-hardness (2200~3500 Hv) nano-sized Ti-rich Ti-carbides formed within the eutectic regions (FIG. 10(*h*)). As a result, the FZ not only does not show softening but also is having even higher microhardness than the BM.

Transmission electron microscopy examinations of FZ thin foils indicated that along with the Ti addition, a significant amount of nano-sized Ti-carbides having an ordered face-centered-cubic structure was formed within the eutectic regions. A typical example is shown in FIG. 10(*h*). In this TEM BF image, it is clearly seen that the length of austenite dendrite cells is only about 100-150 nm and there are high-density of nano-sized κ-carbides (~3-5 nm) distributed within the austenite dendrite cells and eutectic regions. In addition, within the eutectic regions, there also exist some slightly larger nano-sized (~6-10 nm) Ti-carbides, as indicated by the arrows in FIG. 10(*h*). FIG. 10(*i*) is the SADP taken from the area circled in FIG. 10(*h*), showing the co-existence of the austenite matrix, κ-carbides and Ti-carbides. Analysis of the SADP indicates that the orientation relationships among the three phases are cubic-to-cubic. FIG. 10(*j*) is the TEM-EDS profile taken from the same area, demonstrating the presence of Ti-rich Ti-carbides within the eutectic regions. Since the nominal compositions of welding filler wires used in Example 1 and Example 10 were having about the same Al and C contents, except that in Example 10 about 1.6 wt. % of Ti was added, thus, it is worthwhile to compare the FZ microstructures revealed in FIG. 1(*h*) and FIG. 10(*h*). In FIG. 1(*h*), although the size of austenite dendrite cells is slightly larger than that revealed in FIG. 10(*h*), it appears that the density of nano-sized κ-carbides within the austenite dendrite cells is slightly higher than that in FIG. 10(*h*) (the Ti-added sample). Moreover, both are having significant amount of nano-sized precipitates (κ-carbides in FIG. 1(*h*); κ-carbides and Ti-rich Ti-carbides in FIG. 10(*h*)) within the eutectic regions. However, the FZ microhardness of Example 10 (~451 Hv) is considerably larger than that of Example 1 (~425 Hv). The main reason for this could be due to the fact that the hardness of the Ti-rich Ti-carbides is ~2200-3500 Hv, which is much higher than that of $(Fe,Mn)_3AlC$ (~630-670 Hv) carbides.

Tensile test indicated that the YS, UTS and El of the weldment were 1006 MPa, 1145 MPa and 40%, respectively. FIG. 10(*k*) shows the macroscale images of the specimens before and after the tensile test. The corrugated deformation surface seen in the FZ clearly evidences the ductile nature of the welded bead. Moreover, it is seen that the edges of the tensile-fractured specimen remained parallel across a range including FZ and BM with essentially the same width, as indicated by $d_{FZ}$, $d_{BM}$ and $d_{INT}$ (here $d_{INT}$ denotes the width at the interface between BM and FZ) in FIG. 10(*k*). As has been discussed in details in Example 1 and Example 2, such unique deformation behavior strongly implies that the yield strength of FZ and BM is approximately of the same level. As mentioned above, the remarkable YS and microhardness obtained in the FZ can be attributed to the existence of the high-density nano-sized κ-carbides and nano-sized Ti-rich Ti-carbides in FZ. It is also noted that the slight necking and eventual fracturing occurred in the BM further indicates that the tensile strength of FZ is higher than that of the BM, which is consistent with the larger FZ microhardness, as displayed in FIG. 10(*g*).

Based on the above analyses, it is evident that the Ti-addition to welding filler wire clearly has given rise to following advantageous effects. Firstly, the morphology of austenite grains in the FZ changes from columnar into globular with a significant grain size refinement. Secondly, in the as-welded state, there are high-density of nano-sized κ-carbides existing in the much refined austenite dendrite cells and eutectic regions. In addition, there is also significant amount of high-hardness nano-sized Ti-rich Ti-carbides formed within the eutectic regions. Thirdly, the austenite dendrite cells, the nano-sized κ-carbides and nano-sized Ti-rich Ti-carbides composing of the FZ are all having the ductile face-centered-cubic structure. Moreover, the sizes of κ-carbides and Ti-rich Ti-carbides in the FZ are only in the range of 3~10 nm, thus are very effective in enhancing the mechanical strength, in particular YS, without significant loss in ductility. Consequently, by using the welding filler wire disclosed in the present invention, the FZ in the as-welded sample has exhibited exceptional combination of hardness, YS, UTS and ductility simultaneously.

EXAMPLE 11

In this Example of embodiment, we investigated the effects of niobium (Nb) addition to the welding filler wire on the characteristics of FZ in the as-welded sample. The base material (BM) used in this Example was the same as that used in Example 10. Two BM plates with dimensions of 80 mm×80 mm×8 mm were machined to form a single V-groove butt weld. The GTAW welding process was carried out using the parameters similar to those used in Example 1. The welding filler wire has a nominal composition of Fe-29.5Mn-8.2Al-1.56C-1.0Nb with a wire diameter φ~3.2 mm. FIG. 11(*a*) shows the macroscale image of the as-welded sample, revealing that the entire welding bead has a very smooth morphology with no visible macrocrack and porosity. FIG. 11(*b*) is the SEM image of an area covering FZ, HAZ and BM of the welded sample, showing that, unlike that seen in the previous Ti-added sample (Example 10), the austenite grains in the FZ have a mixture of "globular" and "columnar-like" morphologies. However, similar to that observed in Example 10, the high-density of nano-sized κ-carbides uniformly distributed within the austenite dendrite cells and eutectic regions can be observed. Similarly, there appears to have slightly austenite grain growth in the HAZ, while the high-density nano-sized κ-carbides originally existing in the hot-rolled BM remained essentially unchanged during fusion welding. Moreover, it is noted that, within the FZ and near the interface between the FZ and HAZ, there is no trace of microcrack and porosity can be observed, indicating that the use of the fusion filler disclosed in the present invention has evidently eliminated the solidification and liquation cracks. FIG. 11(*c*) shows the Vickers microhardness measurements conducted across the FZ, HAZ and BM. The corresponding values of the respective measured hardness points are displayed in FIG. 11(*d*), which reveals that the microhardness of FZ, HAZ and BM of the present as-welded sample are about 431 Hv, 435 Hv, and 437 Hv, respectively. Obviously, the FZ does not show any softening like that encountered in most of fusion welded precipitation-hardened alloys. The primary reasons for this, similar to those observed in Example 10, are due to the high-density of nano-sized κ-carbides existing within the austenite dendrite cells and eutectic regions, as well as a significant amount of high-hardness (2000~3200 Hv) nano-sized Nb-rich Nb-carbides within the eutectic regions (FIG. 11(*e*)). As a result, the FZ can have about the same level of microhardness as compared with that of HAZ and BM.

Figure 11A:
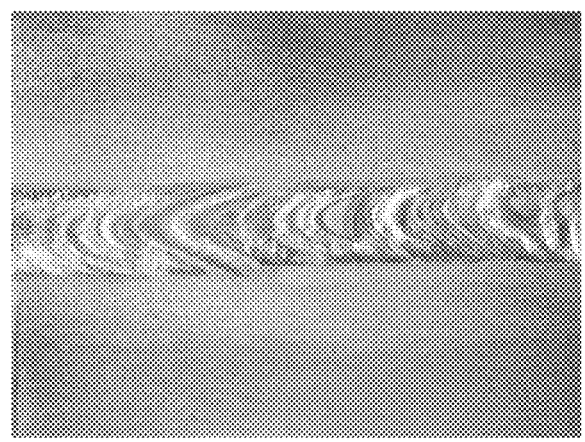
FIG. 11(a) The macroscale image of the welding bead obtained by GMAW with a Fe-29.5Mn-8.2Al-1.56C-1.0Nb welding filler wire.
Figure 11B:
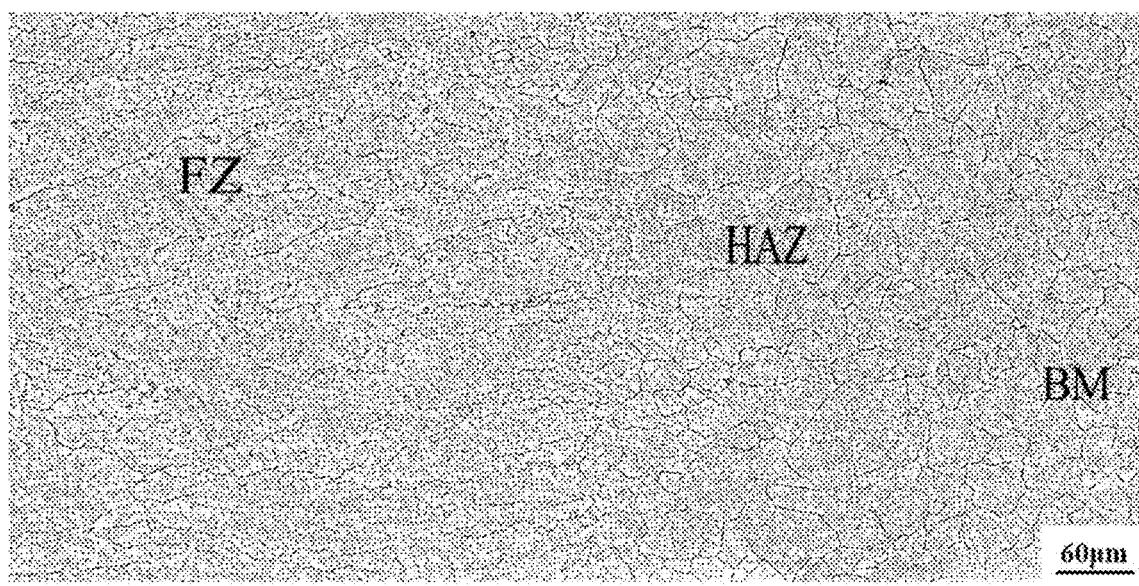
FIG. 11(b) SEM image taken from the as-welded weldment (FZ: fusion zone; HAZ: heat-affected zone; BM: base material).
Figure 11C:
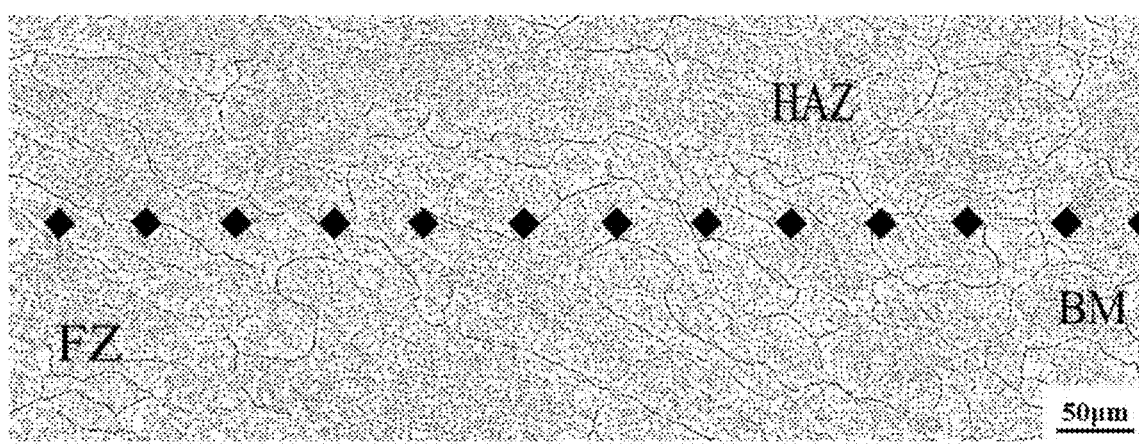
FIG. 11(c) SEM image and the microhardness indentation conducted across the FZ, HAZ and BM.
Figure 11D:
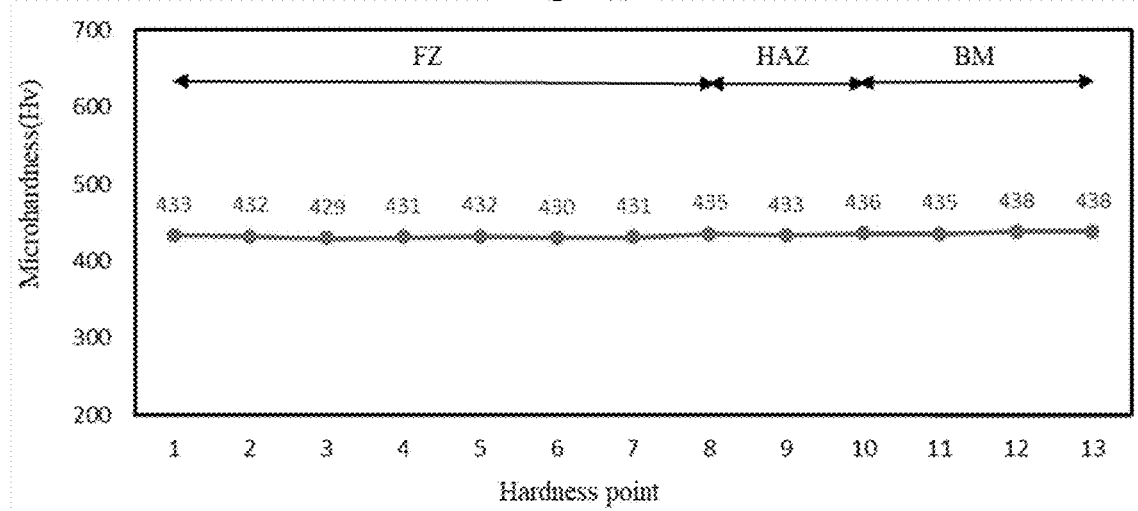
FIG. 11(d) Microhardness values corresponding to the respective measured points in (c).
Figure 11E:
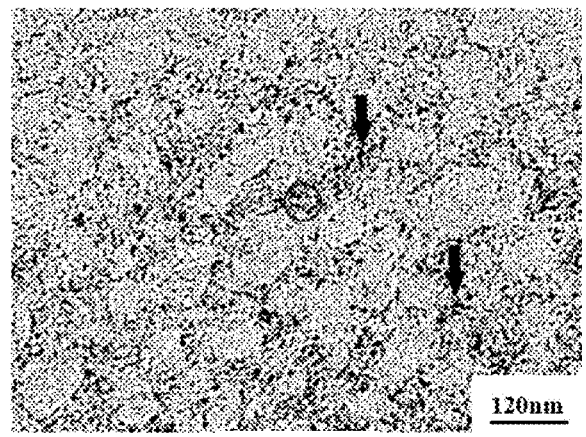
FIG. 11(e) TEM bright field image taken from the FZ of the weldment. The arrows indicate the κ-carbides and Nb-rich Nb-carbides within the eutectic regions.
Figure 11F:
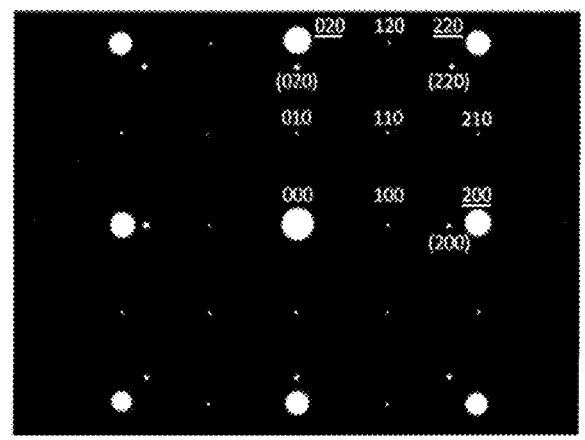
FIG. 11(f) A SADP taken from the area circled in (e) (hkl: austenite; hkl: κ-carbide; (hkl): Nb-carbide).
Figure 11G:
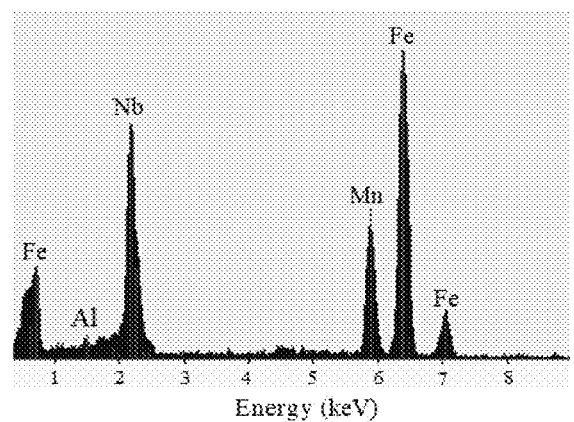
FIG. 11(g) TEM-EDS profile obtained from the same area circled in (e).

Similar to that observed in the Ti-added samples (Example 10), the TEM analyses revealed that substantial amount of nano-sized Nb-rich Nb-carbides having an ordered face-centered-cubic structure was formed within the eutectic regions. FIG. 11(e) is the typical TEM BF image taken from the FZ of the as-welded sample, clearly revealing a very different morphology of the austenite dendrite cells and the eutectic regions as compared to that observed in Example 10. The dendrite cells and the surrounding eutectic regions appear to be more roundish. Nevertheless, the unique feature of the high-density of nano-sized κ-carbides (~3-5 nm) distributed within the austenite dendrite cells and eutectic regions remained. In addition to the eutectic κ-carbides, there also exist substantial amount of slightly larger nano-sized precipitates (~6-10 nm) in the eutectic regions, as indicated by the arrows in FIG. 11(e). FIG. 11(f) is the SADP taken from the area circled in FIG. 11(e), showing the co-existence of the austenite matrix, κ-carbides and Nb-rich Nb-carbides. Analysis of the SADP further indicates that the orientation relationships among the three phases are cubic-to-cubic. FIG. 11(g) is the TEM-EDS profile taken from the same area, confirming the presence of Nb-rich Nb-carbides. Since the hardness of Nb-rich Nb-carbides is ~2000-3200 Hv, one may expect that the precipitation of nano-sized Nb-rich Nb-carbides would give rise to similar effects on the characteristics of FZ and account for the microhardness results displayed in FIG. 11(d).

Figure 11H:
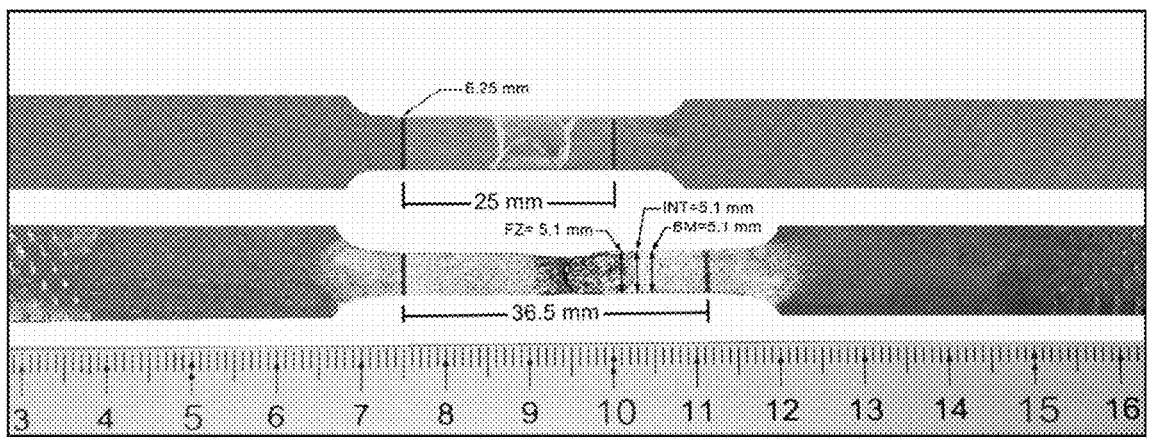
FIG. 11(h) Macroscale images of the tensile specimens before and after tensile test.

Tensile test indicated that the YS, UTS and El of the weldment were 980 MPa, 1108 MPa and 46%, respectively. FIG. 11(h) shows the macroscale images of the specimens before and after the tensile test. In tensile-fractured specimen, it is clear that the corrugated deformation surface and the zig-zag weaving fracture pattern can be observed in the FZ, suggesting the ductile nature of the FZ. Moreover, it is also seen that the widths across the region containing the BM, FZ and the interface between them (denoted as $d_{BM}$, $d_{FZ}$ and $d_{INT}$) are essentially equal and the specimen edges across this region remains parallel, as indicated in FIG. 11(h). Such unique feature implies that the yield strength of FZ and BM is approximately the same level and the deformation under tensile stress proceeds in a uniform manner until the necking and eventual fracturing occurred in the FZ. The fact that slight necking and eventual fracturing occurred in the FZ indicates that UTS in the FZ is smaller than that of the BM.

Based on the above results, it is evident that Nb-addition to welding filler wire clearly has the similar effects as the addition of Ti (Example 10), namely, in addition to preserving the high-density of nano-sized κ-carbides existing within the austenite dendrite cells and eutectic regions, the formation of nano-sized Nb-rich Nb-carbides in the eutectic regions evidently is advantageous in enhancing the mechanical strength and microhardness of the FZ in the as-welded sample, while still maintaining excellent ductility. As described above in Example 10, because all the phases composing the FZ microstructure are all of ductile face-centered-cubic structure and the strengthening nano-sized κ-carbides and Nb-rich Nb-carbides are only about 3-10 nm and very effective in enhancing the YS. Thus, by using the welding filler wire disclosed in the present invention, the FZ in the as-welded sample can exhibit exceptional combination of hardness, YS, UTS and ductility simultaneously.

EXAMPLE 12

Figure 12A:
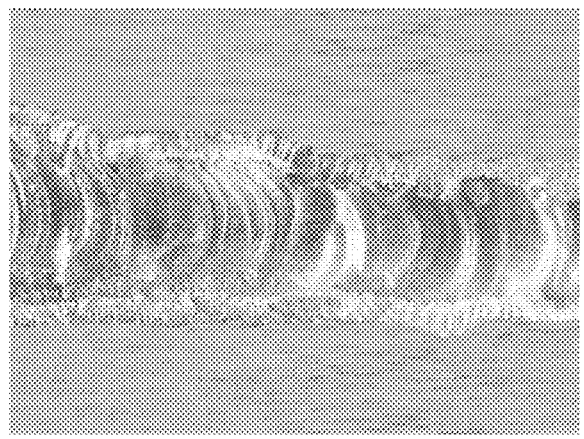
FIG. 12(a) The macroscale image of the welding bead obtained by GTAW with a Fe-31.2Mn-9.8Al-1.65C-1.2V welding filler wire.
Figure 12B:
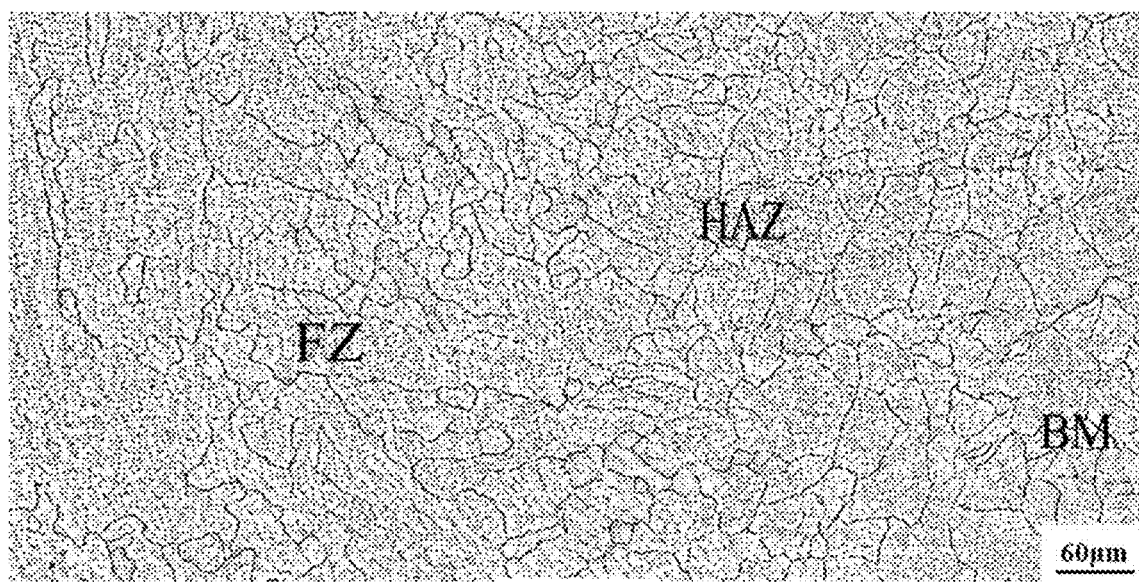
FIG. 12(b) SEM image taken from the as-welded weldment (FZ: fusion zone; HAZ: heat-affected zone; BM: base material).
Figure 12C:
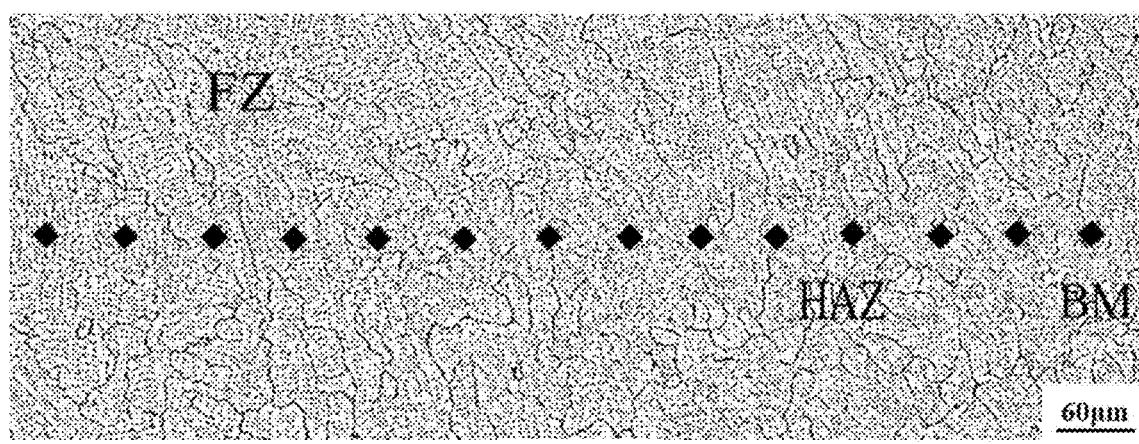
FIG. 12(c) SEM image and the microhardness indentation conducted across the FZ, HAZ and BM.
Figure 12D:
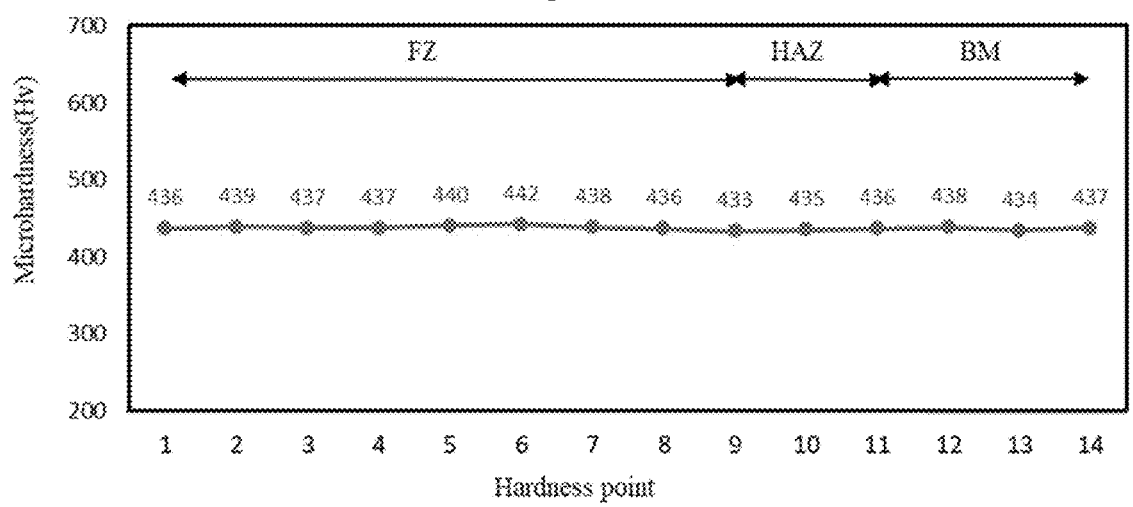
FIG. 12(d) Microhardness values corresponding to the respective measured points in (c).

In this Example of embodiment, we investigated the effects of vanadium (V) addition to the welding filler wire on the characteristics of FZ in the as-welded sample. The base material (BM) used in this Example was the same as that used in Example 10. Two BM plates with dimensions of 80 mm×80 mm×10 mm were machined to form a single V-groove butt weld. The GTAW welding process was carried out using parameters similar to those used in Example 1. The welding filler wire has a nominal composition of Fe-31.2Mn-9.8Al-1.65C-1.2V with a wire diameter φ~3.2 mm. FIG. 12(a) shows the macroscale image of the as-welded sample, revealing that the entire welding bead has a very smooth morphology with no visible macrocrack and porosity. FIG. 12(b) is the SEM image of an area covering FZ, HAZ and BM of the welded sample, showing that, similar to the previous Nb-added sample (Example 11), the austenite grains in the FZ have a mixture of "globular" and "columnar-like" morphologies. Moreover, as were observed in Example 10 and Example 11, there are high-density of nano-sized κ-carbides uniformly distributed within the austenite dendrite cells and the eutectic regions. Similarly, there appears to have slightly austenite grain growth in the HAZ, while the high-density of nano-sized κ-carbides originally existing in the hot-rolled BM remained essentially unchanged during fusion welding. Finally, it is noted that, within the FZ and near the interface between the FZ and HAZ, there is no trace of microcrack and porosity can be observed. FIG. 12(c) shows the Vickers microhardness measurements conducted across the FZ, HAZ and BM. The corresponding values of the respective measured hardness points are displayed in FIG. 12(d), which reveals that the average microhardness of FZ, HAZ and BM of the present as-welded sample are about 438 Hv, 434 Hv, and 436 Hv, respectively. Obviously, there is no softening in FZ and HAZ, which is consistent with the unique microstructure displayed in FIG. 12(b), wherein the prominent strengthening ingredient of high-density of nano-sized κ-carbides remains essentially unchanged in all three zones. Moreover, the addition of V has led to the formation of a significant amount of high-hardness (2200-3000 Hv) nano-sized V-rich V-carbides within the eutectic regions (FIG. 12(e)), giving rise to about the same level of microhardness in the FZ as compared with that of HAZ and BM, which is very similar to that observed in Example 11.

Figure 12E:
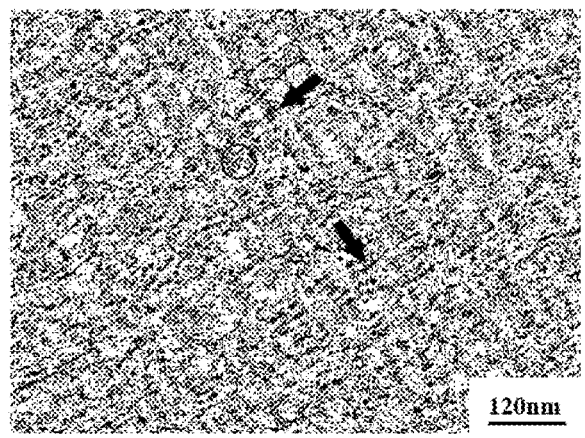
FIG. 12(e) TEM bright field image taken from the FZ of the weldment. The arrows indicate the κ-carbides and V-rich V-carbides within the eutectic regions.
Figure 12F:
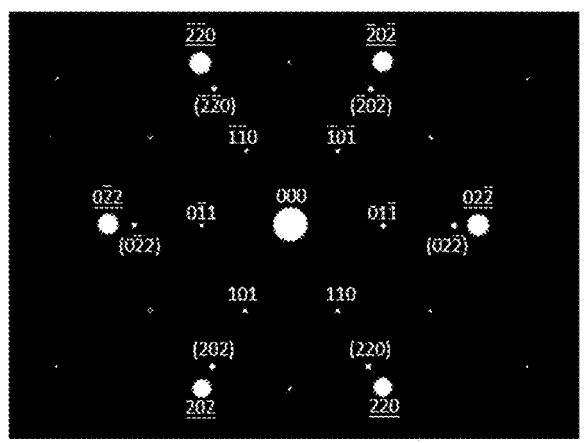
FIG. 12(f) A SADP taken from the area circled in (e) (hkl: austenite; hkl: κ-carbide; (hkl): V-carbide).
Figure 12G:
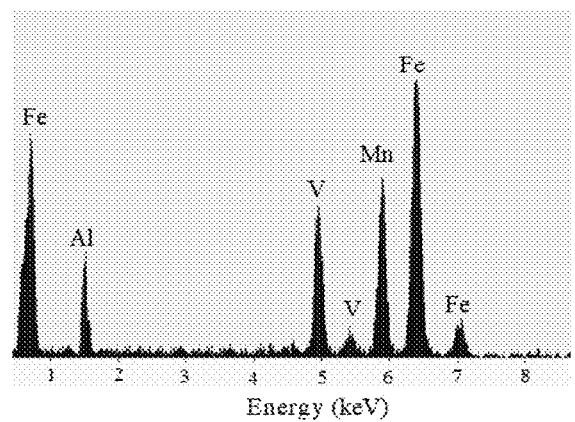
FIG. 12(g) TEM-EDS profile taken from the same area circled in (e).

TEM analyses revealed that the V-addition has led to similar effects as those seen in Ti-addition (Example 10) and Nb-addition (Example 11). Namely, there were significant amount of nano-sized V-rich V-carbides having an ordered face-centered-cubic structure formed within the eutectic regions. FIG. 12(e) is the TEM BF image taken from the FZ, clearly revealing that the length of austenite dendrite cells is only about 20-60 nm and the morphology is different from that observed for Ti-added (FIG. 10(h)) and Nb-added (FIG. 11(e)) samples. However, the unique feature of high-density of nano-sized κ-carbides (~3-5 nm) distributed within austenite dendrite cells and eutectic regions can still be observed. In addition, within the eutectic regions, there apparently exist substantial amount of slightly larger precipitates (~6-10 nm), as indicated by the arrows in FIG. 12(e). FIG. 12(f) is the SADP taken from the area circled in FIG. 12(e), showing the co-existence of the austenite matrix, κ-carbides and V-rich V-carbides. Analysis of the SADP indicates that the orientation relationships among the three phases are cubic-to-cubic. FIG. 12(g) is the TEM-EDS profile taken from the same area, confirming the existence of V-rich V-carbides. Since the hardness of V-rich V-carbides is comparable to that of Nb-rich Nb-carbides and Ti-rich Ti-carbides, similar effects on the characteristics of FZ are expected and account for the microhardness results obtained in FIG. 12(d).

Figure 12H:
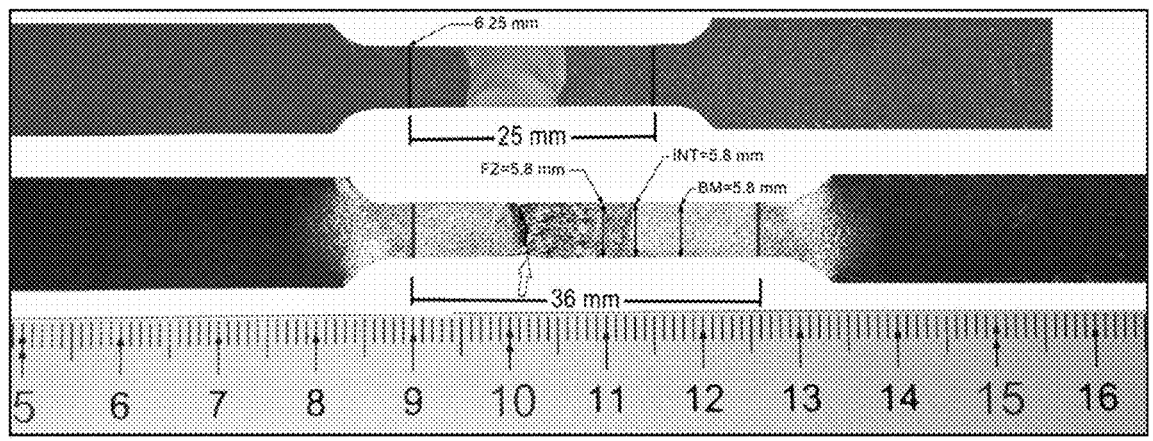
FIG. 12(h) Macroscale images of the tensile specimens before and after tensile test.

Tensile test indicated that the YS, UTS and El of the weldment were 998 MPa, 1167 MPa and 44%, respectively. FIG. 12(h) shows the macroscale images of the specimens before and after the tensile test. It is interesting to note that the edges of the tensile-fractured specimen remained parallel across a range including FZ and BM with essentially the same width, as indicated by $d_{FZ}$, $d_{BM}$ and $d_{INT}$ (here $d_{INT}$ denotes the width at the interface between BM and FZ) in FIG. 12(h). As were discussed in Examples 1-2 and Examples 10-11, such unique feature implies that the yield strength of FZ and BM is approximately of the same level. Closer inspection on the tensile-fractured specimen indicates that the corrugated deformation surface (an indication of ductile nature) is especially obvious in the FZ of the welding bead. The estimated elongation within the FZ reached up to about 28%. Moreover, it appeared that, when the applied stress beyond the yield strength, the plastic deformation of the entire specimen, including FZ, HAZ and BM, exhibited excellent uniform deformation until the slightly necking and eventual fracturing occurred near the interface between FZ and HAZ, as indicated by the arrow in FIG. 12(h). As a consequence, even after fracture the edges of the entire remained almost in parallel. The fact that slight necking and eventual fracturing occurred in the vicinity of the FZ/HAZ interface indicates that the UTS in the FZ, HAZ and BM are very close to each other.

Based on the above results, it is evident that V-addition to welding filler clearly has the similar effects as the addition of Ti (Example 10) and Nb (Example 11). In all cases, in addition to preserving the high-density of nano-sized κ-carbides existing within the austenite dendrite cells and eutectic regions, the formation of nano-sized V-rich V-carbides evidently is advantageous in enhancing the mechanical strength and microhardness of the FZ in the as-welded sample. Moreover, since the nano-sized (3~10 nm) κ-carbides, Ti-rich Ti-carbides, Nb-rich Nb-carbides and V-rich V-carbides are all having the same ductile face-centered-cubic structure as the austenite dendrite, the remarkable strengthening effect is attained without significant loss in ductility. The above detailed analyses clearly indicate that, by using the welding filler wires disclosed in the present invention for fusion welding, the resultant FZ could all have exceptional combination of microhardness, YS, UTS and ductility.

EXAMPLE 13

Figure 13A:
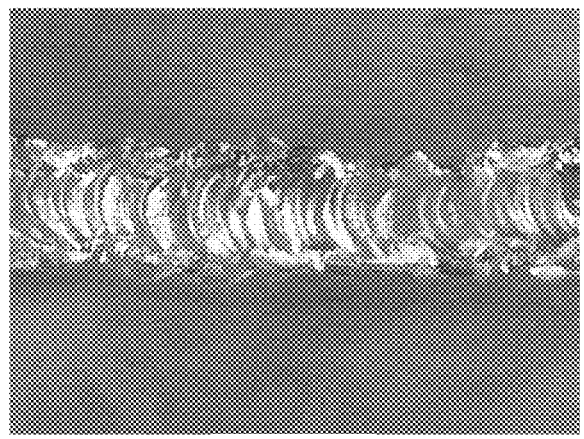
FIG. 13(a) The macroscale image of the welding bead obtained by GTAW with a Fe-30.6Mn-9.2Al-1.88C-0.8Ti-1.0Nb welding filler wire.
Figure 13B:
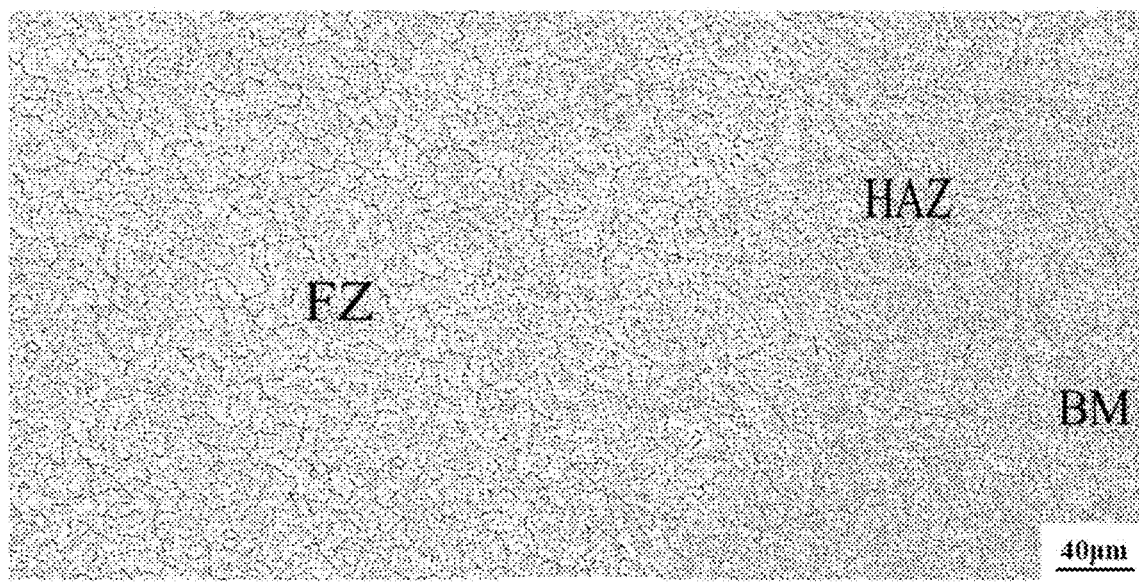
FIG. 13(b) SEM image taken from the as-welded weldment (FZ: fusion zone; HAZ: heat-affected zone; BM: base material).
Figure 13C:
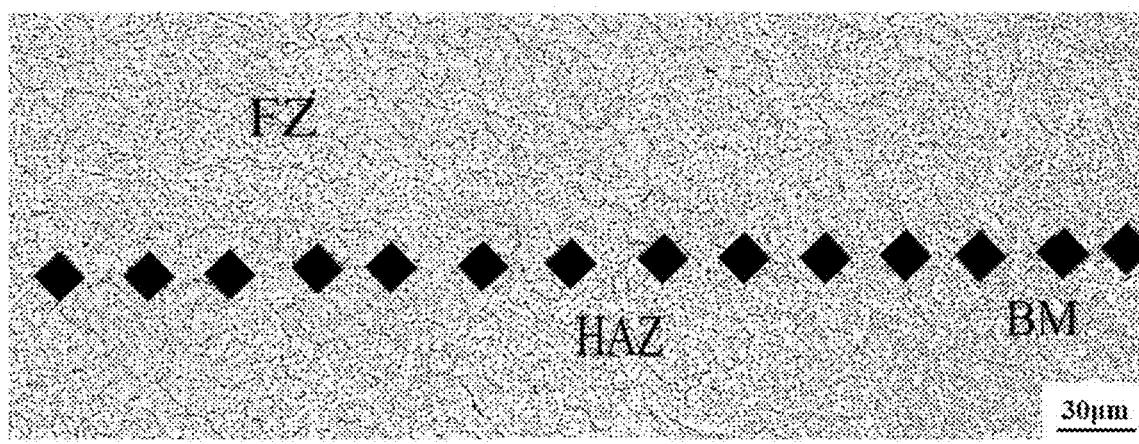
FIG. 13(c) SEM image and the microhardness indentation conducted across the FZ, HAZ and BM.

In this Example of embodiment, we further investigated the combined effects of Ti and Nb addition to the welding filler wire on the characteristics of FZ in the as-welded sample. The base material (BM) used in this Example was the same as that used in Example 10. Two BM plates with dimensions of 80 mm×80 mm×12 mm were machined to form a single V-groove butt weld. The GTAW welding process was carried out using the parameters similar to those used in Example 1. The welding filler wire has a nominal composition of Fe-30.6Mn-9.2Al-1.88C-0.8Ti-1.0Nb with a wire diameter ϕ~3.2 mm. FIG. 13(a) shows the macroscale image of the as-welded sample, revealing that the entire welding bead has a very smooth morphology with no visible macrocrack and porosity. FIG. 13(b) is the SEM image of an area covering FZ, HAZ and BM of the welded sample. In this figure, it is obvious that the morphology of all austenite grains in FZ becomes globular and the size of the globular austenite grains has been substantially refined, which is even much smaller than that of HAZ and BM. Similar to that described in Examples 10-12, the high-density of nano-sized κ-carbides uniformly distributed within the austenite dendrite cells and eutectic regions can be observed. Also, the high-density of nano-sized κ-carbides originally existing in the hot-rolled BM remained essentially unchanged during fusion welding. Moreover, it is noted that, within the FZ and near the interface between the FZ and HAZ, there is no trace of microcrack and porosity can be observed. FIG. 13(c) shows the Vickers microhardness measurements conducted across the FZ, HAZ and BM. The corresponding values of the respective measured hardness points are displayed in FIG. 13(d), which reveals that the average microhardness of FZ, HAZ and BM of the present as-welded sample are about 467 Hv, 444 Hv, and 435 Hv, respectively. Remarkably, the FZ not only does not exhibit any softening but also has significant higher microhardness than that of HAZ and BM. Similar to Examples 10-12, this is mainly because that, in the as-welded conditions (FIG. 13(b)), there are high-density of nano-sized κ-carbides existing within the austenite dendrite cells and eutectic regions. Moreover, within the eutectic regions, in addition to nano-sized κ-carbides, there are also significant amount of high-hardness nano-sized Ti-rich Ti-carbides and Nb-rich Nb-carbides (FIG. 13(e)). Consequently, the FZ is having significantly higher microhardness than that of the HAZ and BM without showing any sign of softening. Moreover, the addition of both 0.8% Ti and 1.0% Nb appears to result in even higher microhardness in the FZ as compared with that of previous Examples 10-12, which might be due to the total amount of high-hardness nano-sized Ti-rich Ti-carbides and Nb-rich Nb-carbides is increased in the present Example.

Figure 13D:
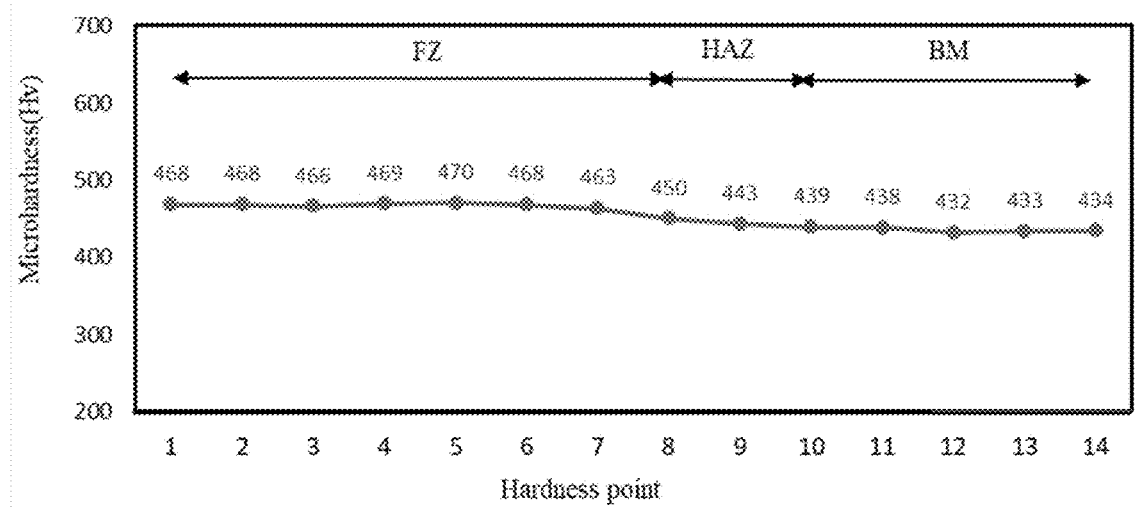
FIG. 13(d) Microhardness values corresponding to the respective measured points in (c).
Figure 13E:
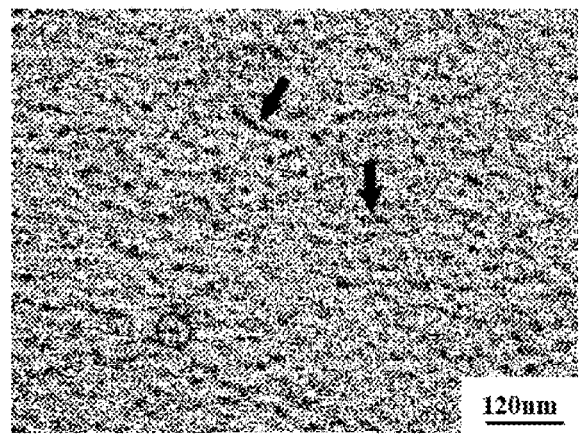
FIG. 13(e) TEM bright field image taken from the FZ of the weldment. The arrows indicate the κ-carbides, Ti-rich Ti-carbides and Nb-rich Nb-carbides within the eutectic regions.
Figure 13F:
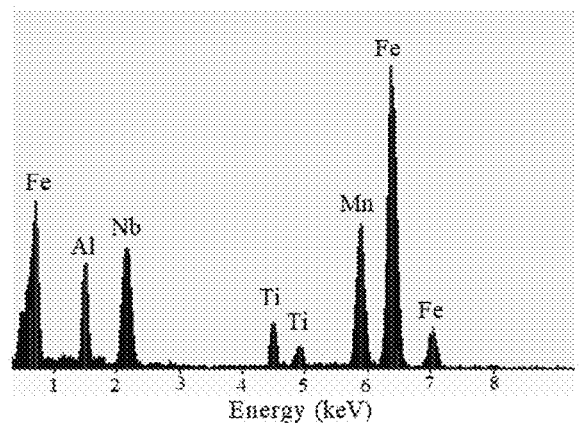
FIG. 13(f) TEM-EDS profile taken from the area circled in (e).

FIG. 13(e) is the TEM BF image taken from the FZ, clearly revealing a very different morphology of the austenite dendrite cells and the eutectic regions as compared to that observed in Examples 10-12. The dendrite cells and the surrounding eutectic regions appear to be further refined and more intertwined to each other. Nevertheless, the unique feature of the high-density of nano-sized (~3-5 nm) κ-carbides distributed within austenite dendrite cells and eutectic regions remained. Moreover, the amount of eutectic κ-carbides and slightly larger (~6-10 nm) Ti-rich Ti-carbides and Nb-rich Nb-carbides within the eutectic regions appears to increase substantially, as indicated by the arrows in FIG. 13(e). FIG. 13(f) is the TEM-EDS profile taken from the area circled in FIG. 13(e), confirming the presence of Ti-rich Ti-carbides and Nb-rich Nb-carbides.

Figure 13G:
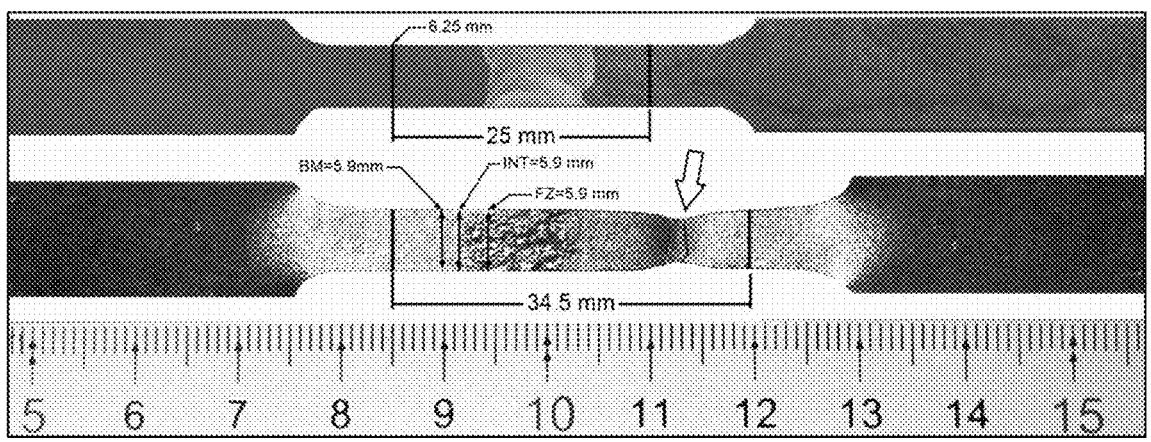
FIG. 13(g) Macroscale images of the tensile specimens before and after tensile test.

Tensile test indicated that the YS, UTS and elongation of the weldment were 1015 MPa, 1168 MPa and 38%, respectively. FIG. 13(g) shows the macroscale images of the specimens before and after the tensile test. The corrugated deformation surface observed in the FZ suggests the ductile nature of the FZ. Moreover, it is seen that the edges of the tensile-fractured specimen remained parallel in both sides of BM range up to interface between the FZ and BM with essentially the same $d_{BM}$, $d_{FZ}$, and $d_{INT}$, as indicated in FIG. 13(g). Such unique feature implies that the yield strength of FZ and BM is approximately the same level and the deformation under tensile stress proceeds in a uniform manner until the necking and eventual fracturing occurred in the BM, as indicated by the arrow in FIG. 13(g). The fact that slight necking and eventual fracturing occurred in the BM indicates that UTS in the FZ is larger than that of the BM, which is also consistent with the obtained microhardness in FZ is substantially higher than in BM, as depicted in FIG. 13(d).

Based on the above results, it is evident that the addition of both Ti and Nb to welding filler wire has led to even more pronounced effect in morphology change and size refining of austenite grains in the FZ. Moreover, it also results in significant increase in the amount of high-hardness nano-sized Ti-rich Ti-carbides and Nb-rich Nb-carbides within the eutectic regions, as compared with that observed in Example 10 and Example 11. More importantly, the feature of high-density of nano-sized κ-carbides existing within the austenite dendrite cells and eutectic regions is still largely preserved. As mentioned above, since the nano-sized (~3-10 nm) κ-carbides, Ti-rich Ti-carbides, Nb-rich Nb-carbides, V-rich V-carbides and the austenite dendrites are all having the same ductile face-centered-cubic structure, the remarkable strengthening effect is attained without significant loss in ductility. The detailed analyses presented in the above Examples clearly indicate that, by using the welding filler wires disclosed in the present invention for fusion welding, the resultant FZ can all have exceptional combination of microhardness, YS, UTS and ductility.

EXAMPLE 14

The remarkable progress in developing the high-strength, especially high YS, high-ductility precipitation-hardened austenitic Fe—Mn—Al—C alloys have been mainly relying on the heat-treatment, including solution heat-treatment (SHT), quenching and then optimal aging treatment for obtaining the high-density of nano-sized κ-carbides within the austenite matrix. However, as mentioned in the Background section, the issues of the weldability of these alloys remained largely unsolved despite of the tremendous research efforts devoted over the last several decades. Recently, in recognizing the pivotal importance of high-density nano-sized κ-carbides within the austenite matrix for retaining the strength, in particular YS, and ductility of the weldment, in 2019 Jeong et al. have tried to use Gleeble simulation to unveil the microstructure in the HAZ during welding and its influences on the mechanical properties of the HAZ of the lightweight precipitation-hardened austenitic Fe-31.4Mn-11.4Al-0.9C alloy. The alloy they used was hot-rolled at 1200° C. to a thickness of 13 mm, water quenched, SHT at 1050° C. for 2 hrs, water quenched, and then aged at 550° C. for 100 min for obtaining a high-density of nano-sized κ-carbides within the austenite matrix. The aging treatment evidently raised the hardness of the alloy from 298 Hv in SHT condition to 349 Hv after aged at 550° C. for 100 min. The simulations were conducted with peak temperature of 750, 950 and 1150° C. using a Gleeble simulator. The results showed that, when the simulated specimens were cooled to room temperature, softening behaviors indeed occurred in every age-hardened sample and for the sample with 1150° C. peak temperature complete dissolution of κ-carbides was observed. These observations inferred as the confirmation that the κ-carbide precipitation has a definite relationship with the transition in the mechanical properties of the HAZ. However, it is noted that in these Gleeble simulation studies, no direct fusion welding was conducted, thus, did not involve re-melting and re-solidification processes and could not directly obtain the actual structure and characteristics of FZ. Yet, in their Gleeble simulation studies, the aged specimens after being heated up to peak temperature of 750~1150° C. and then cooled to room temperature, dissolution of the pre-existing strengthening κ-carbides and drastic softening in the HAZ was observed. This kind of phenomenon was in fact very similar to what happened in fusion welding precipitation-hardened 7xxx-series aluminum alloys, as mentioned in the Background section.

The following publication gave more detailed descriptions and discussions of the abovementioned characteristics and features.

[32] S. Jeong, G. Park, B. Kim, J. Moon, S. J. Park, C. Lee, "Precipitation behavior and its effect on mechanical properties in weld heat-affected zone in age hardened FeMnAlC lightweight steels", Mater. Sci. Eng. A, 742 (2019) 61-68.

In this Example, we examine the effects of fusion welding on the characteristics of weldment using the age-hardened Fe—Mn—Al—C alloys as the base material. The nominal composition of the based material is Fe-31.5Mn-8.5Al-1.25C. Prior to fusion welding, the hot-rolled base material was solution heat-treated at 1050° C. for 1 hr, water quenched, and then aged at 550° C. for 12 hrs. Two aged BM plates with dimensions of 80 mm×80 mm×8 mm were machined to form a single V-groove butt weld. The GTAW welding process was carried out using the parameters similar to those used in Example 1. The welding filler wire used in the present Example was the same as that used in Example 3 with a filler wire diameter ϕ~2.4 mm.

Figure 14A:
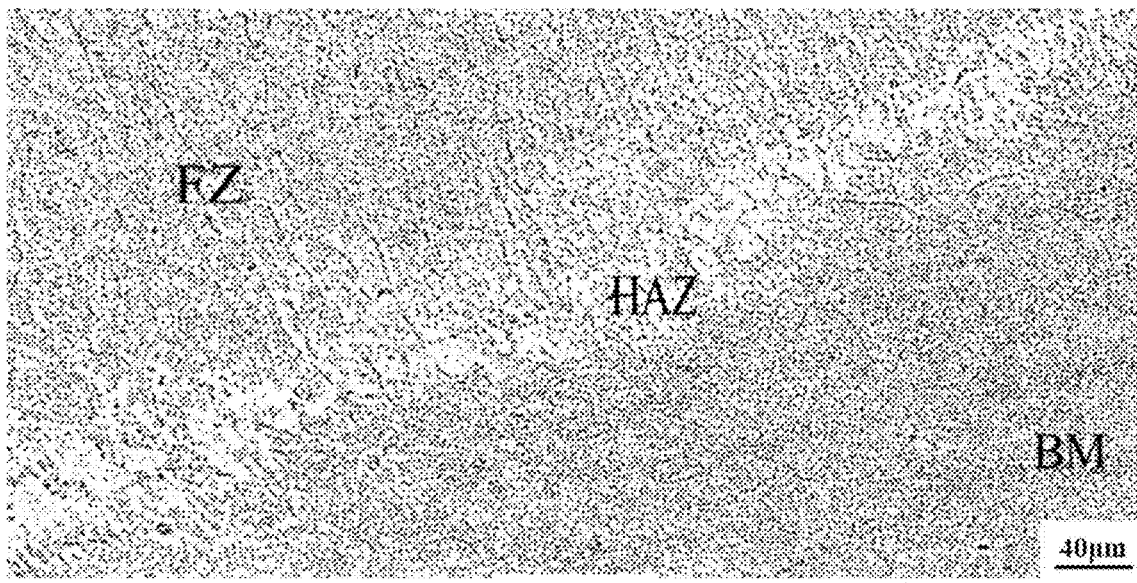
FIG. 14(a) SEM image taken from the as-welded weldment obtained by GTAW with a Fe-28.2Mn-10.6Al-1.62C welding filler wire (FZ: fusion zone; HAZ: heat-affected zone; BM: base material). Note that the base material was a Fe-31.5Mn-8.5Al-1.25C alloy after being hot-rolled, solution heat-treated, quenched and then aged at 550° C. for 12 hrs.

FIG. 14(a) is the SEM image showing the microstructure of an area covering FZ, HAZ and BM of the welded sample. It is evident from FIG. 14(a) that the FZ microstructure is very similar to that seen in FIG. 3(d), exhibiting typical microstructure of columnar austenite grains with a high-density of nano-sized κ-carbides distributed within the austenite dendrite cells and eutectic regions. However, in the present Example, drastic reduction in the amount of the nano-sized κ-carbides in HAZ is clearly observed, indicating that during fusion welding, the nano-sized κ-carbides originally existing in the aged BM were largely dissolved. Based on the investigations of the present invention, it is mainly owing to insufficient carbon content in the BM used in the present Example. This result is the same as that reported by Jeong et al. in 2019, where they used Gleeble simulation to investigate the effects of fusion welding on the HAZ in an age-hardened Fe-31.4Mn-11.4Al-0.9C alloy and found the dissolution of κ-carbides and significant softening in HAZ. In fact, this is also quite similar to that observed in fusion welding the precipitation-hardened AA7075 Al alloys, as quoted in the Background section.

Figure 14B:
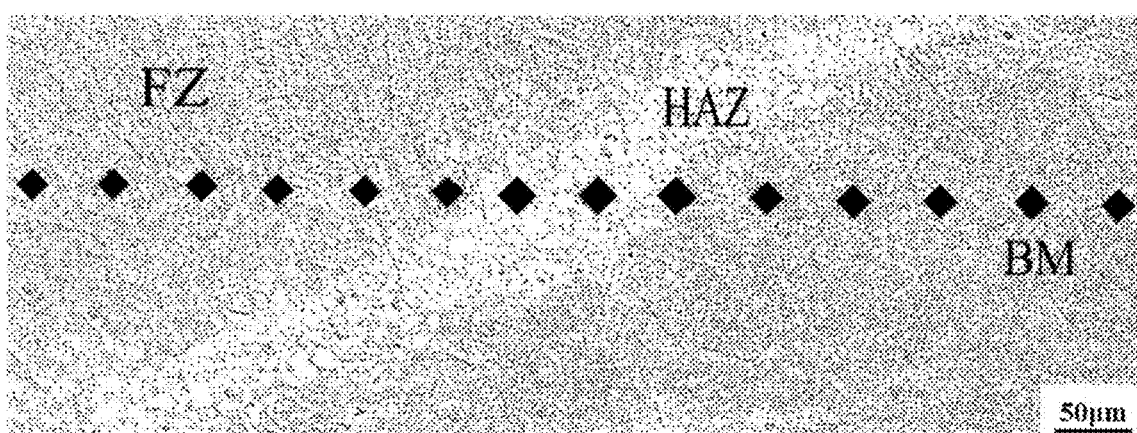
FIG. 14(b) SEM image and the microhardness indentation conducted across the FZ, HAZ and BM.
Figure 14C:
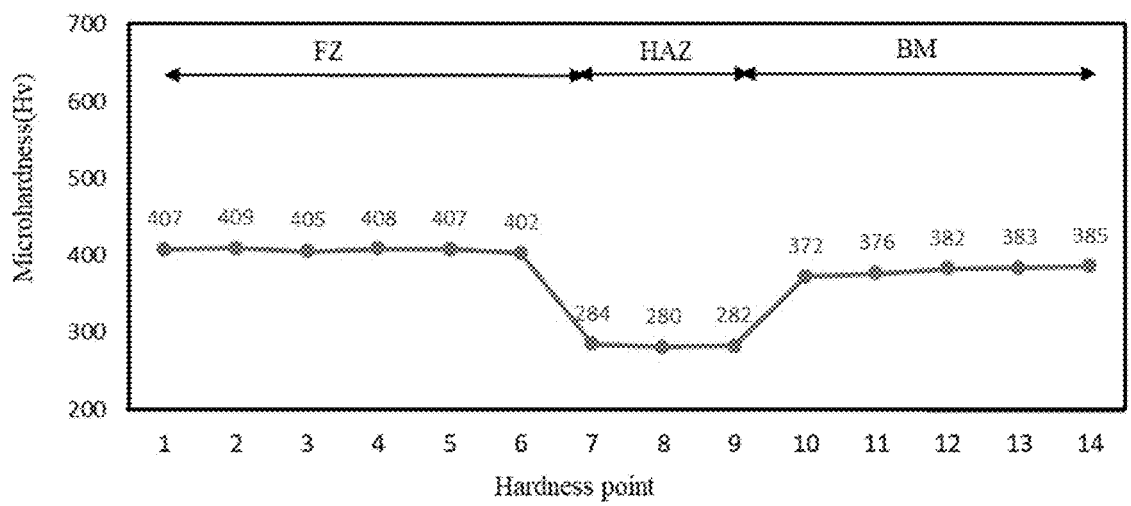
FIG. 14(c) Microhardness values corresponding to the respective measured points in (b).
Figure 14D:
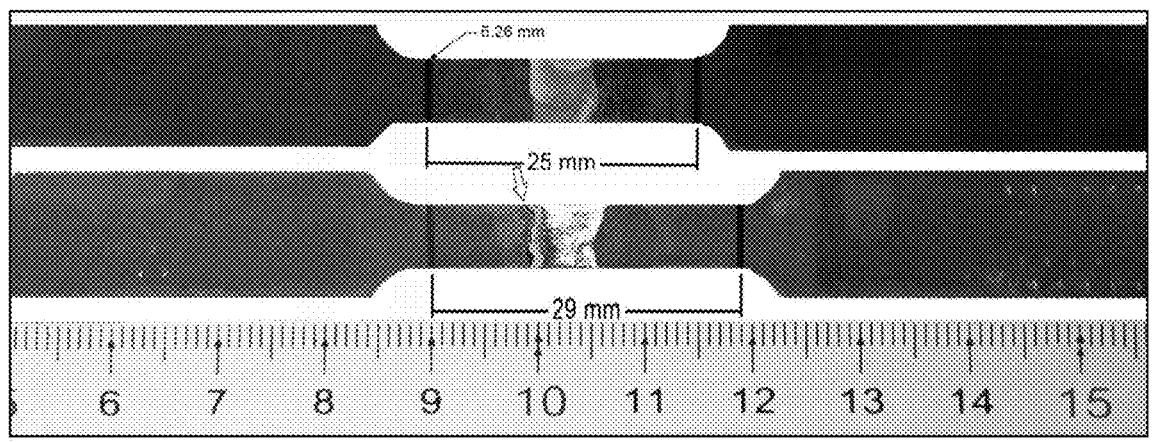
FIG. 14(d) Macroscale images of the tensile specimens before and after tensile test.

FIG. 14(b) shows the Vickers microhardness measurements conducted across the FZ, HAZ and BM. The corresponding values of the respective measured hardness points are displayed in FIG. 14(c), which reveals that the average microhardness of FZ, HAZ and BM of the present as-welded sample is about 406 Hv, 282 Hv, and 380 Hv, respectively. Evidently, the dissolution of the strengthening nano-sized κ-carbides in the HAZ has led to drastic softening, similar to that reported in most of the prior art cited above. FIG. 14(d) shows the macroscale images of the specimens before and after the tensile test. From the tensile-fractured specimen, it is obvious that, due the substantial softening in the HAZ, the fracturing path propagated along the interface between the HAZ and BM, as indicated by the arrow.

Based on the above results, it is obvious that in order to preserve the strengthening nano-sized κ-carbides in the FZ and HAZ appropriate alloy design in both the welding filler and BM are essentially important.

EXAMPLE 15

The purpose of this Example is an attempt to clarify the effects of the molybdenum (Mo) addition in the welding filler wire on the characteristics of FZ in the as-welded sample. In the present Example, the base material used was the same as that used in Example 1. Two BM plates with dimensions of 80 mm×80 mm×10 mm were machined to form a single V-groove butt weld. The GTAW welding process was carried out using the parameters similar to those used in Example 1. The nominal composition of the welding filler wire was Fe-28.2Mn-9.1Al-1.55C-1.8Mo, with a wire diameter ϕ~3.2 mm.

Figure 15A:
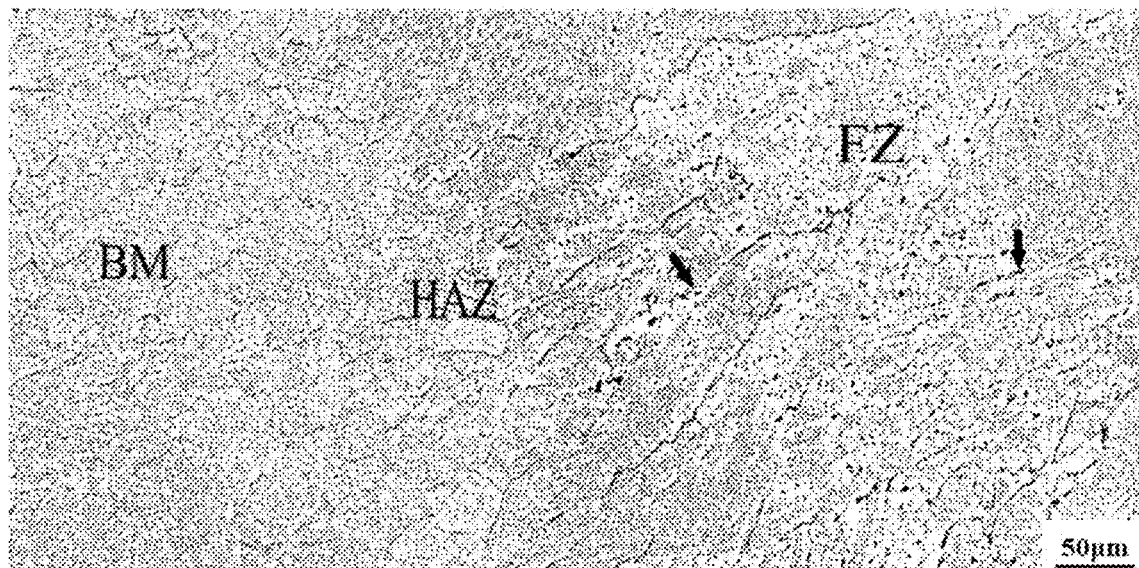
FIG. 15(a) SEM image taken from the as-welded weldment obtained by GTAW with a Fe-28.2Mn-9.1Al-1.55C-1.8Mo welding filler wire (FZ: fusion zone; HAZ: heat-affected zone; BM: base material). The arrows indicate the coarse Mo-rich Mo-carbides formed on the austenite grain boundaries.
Figure 15B:
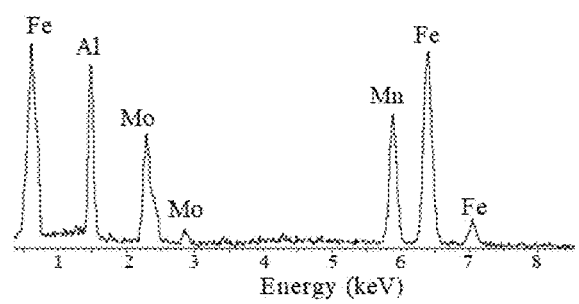
FIG. 15(b) SEM-EDS profile taken from a coarse Mo-rich Mo-carbide on the austenite grain boundary.

FIG. 15(a) is the SEM image showing the FZ, HAZ and BM regions of the as-welded sample. It is evident that the FZ microstructure contains mainly the typical columnar austenite grains and a high-density of nano-sized κ-carbides can be observed within the austenite dendrite cells and eutectic regions, which is similar to that observed in Examples 1-5. However, a significant amount of μm-sized coarse particles with wide precipitation-free zones can also be observed on the austenite grain boundaries (as indicated by the arrows). FIG. 15(b), the SEM-EDS profile taken from a coarse particle reveals that the coarse particles were Mo-rich Mo-carbides. It has been well established that the existence of coarse particles on the grain boundaries and the accompanied precipitation-free zones would be extremely detrimental to the alloy's ductility and strength. Thus, it is not recommended to add the strong carbide-forming Mo alloying element to the welding filler wires disclosed in the present invention.

EXAMPLE 16

The purpose of this Example is an attempt to clarify the effects of the chromium (Cr) addition in the fusion welding wire on the characteristics of FZ in the as-welded sample. In the present Example, the base material used was the same as that used in Example 1. Two BM plates with dimensions of 80 mm×80 mm×10 mm were machined to form a single V-groove butt weld. The GTAW welding process was carried out using the parameters similar to those used in Example 1. The nominal composition of the welding filler wire was Fe-29.3Mn-8.8Al-1.58C-1.5Cr, with a wire diameter ϕ~3.2 mm.

Figure 16A:
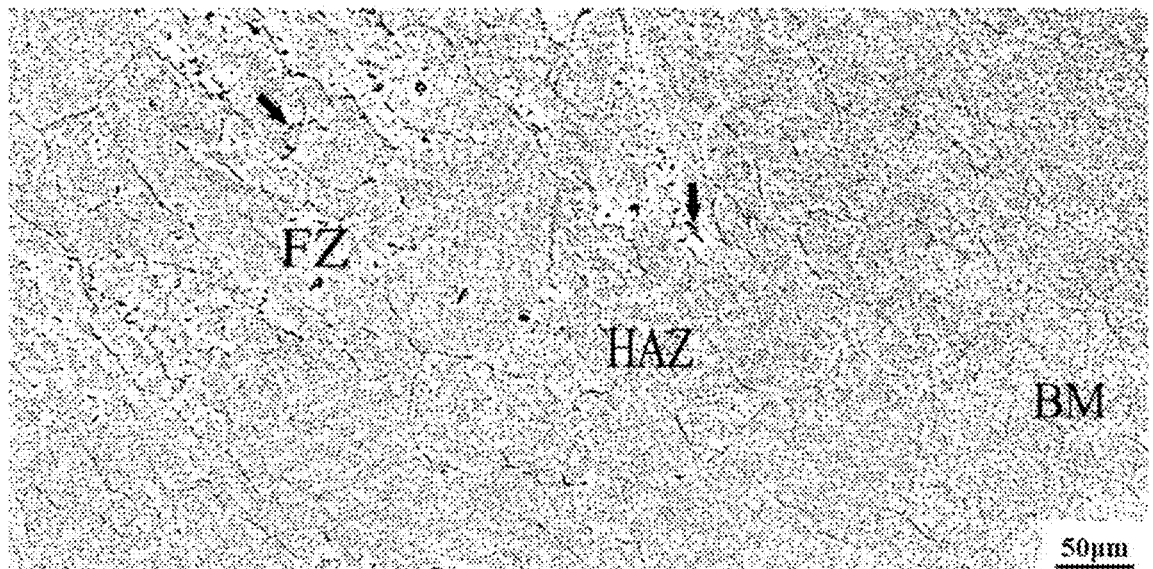
FIG. 16(a) SEM image taken from the as-welded weldment obtained by GTAW with a Fe-29.3Mn-8.8Al-1.58C-1.5Cr welding filler wire (FZ: fusion zone; HAZ: heat-affected zone; BM: base material). The arrows indicate the coarse Cr-rich Cr-carbides formed on the austenite grain boundaries.
Figure 16B:
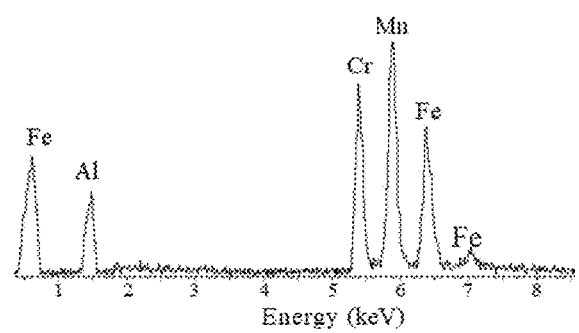
FIG. 16(b) SEM-EDS profile taken from a coarse Cr-rich Cr-carbide on the austenite grain boundary.

FIG. 16(a) shows the typical SEM image of an area covering the FZ, HAZ and BM of the as-welded sample. The FZ microstructure contains mainly the typical columnar austenite grains and a high-density of nano-sized κ-carbides can be observed within the austenite dendrite cells and eutectic regions, which is similar to that observed in Examples 1-5. However, a significant amount of μm-sized coarse particles can also be observed on the austenite grain boundaries (as indicated by the arrows) with apparent precipitation-free zones surrounding the coarse particles. FIG. 16(b) is the SEM-EDS profile taken from a coarse particle, revealing that the coarse particles were Cr-rich Cr-carbides. As stated above in Example 15, the existence of coarse particles on the grain boundaries and the accompanied precipitation-free zones would be highly detrimental to the alloy's ductility and strength. Thus, it is not recommended to add the strong carbide-forming Cr alloying element to the welding filler wires disclosed in the present invention.

It is interesting to note that, although Ti, Nb, V, Mo, and Cr are all known to be strong carbide-forming alloying elements, the above Examples (10-13 and 15-16), nevertheless demonstrated that they could give rise to vastly different effects on the FZ microstructure of the welded samples. For Ti, Nb, and V, the present invention has evidently disclosed that they can form nano-sized (6~10 nm) Ti-rich Ti-carbides, Nb-rich Nb-carbides and V-rich V-carbides within the eutectic regions during fusion welding, which not only leads to significantly enhancement in the microhardness and yield strength but also preserves excellent ductility in the FZ of the welded alloys. On the contrary, our examinations also revealed that the addition of Mo and Cr to the welding filler wires had caused the formation of μm-sized coarse Mo-rich Mo-carbides and Cr-rich Cr-carbides on the austenite grain boundary accompanied by the apparent precipitation-free zones surrounding the coarse carbides in the FZ, which are detrimental to the ductility of the as-welded alloys.

It is specifically emphasized here that the Examples described above are merely for the purposes of clarifying the unprecedented features resulted from the novel alloy design of the fusion welding filler wires disclosed in the present invention, and they should not be deemed as the scope of the present invention. All the alternatives based on the claims of the present invention should be regarded as being included in the scope of the patent.

What is claimed is:

1. A welding filler wire, for fusion welding precipitation-hardened austenitic Fe—Mn—Al—C alloys, consisting essentially of, by weight, 23 to 34 percent manganese (Mn), 7.5 to 11.5 percent aluminum (Al), 1.46 to 1.95 percent carbon (C), and balance essentially iron (Fe).

2. A welding filler wire, for fusion welding precipitation-hardened austenitic Fe—Mn—Al—C alloys, consisting essentially of, by weight, 24 to 32 percent manganese (Mn), 8.0 to 11.0 percent aluminum (Al), 1.46 to 1.95 percent carbon (C), and balance essentially iron (Fe).

3. A welding filler wire, for fusion welding precipitation-hardened austenitic Fe—Mn—Al—C alloys, consisting essentially of, by weight, 23 to 34 percent manganese (Mn), 7.5 to 11.5 percent aluminum (Al), 1.46 to 1.95 percent carbon (C), 0.1 to 2.5 percent titanium (Ti), and balance essentially iron (Fe).

4. A welding filler wire, for fusion welding the precipitation-hardened austenitic Fe—Mn—Al—C alloys, consisting essentially of, by weight, 23 to 34 percent manganese (Mn), 7.5 to 11.5 percent aluminum (Al), 1.46 to 1.95 percent carbon (C), 0.1 to 3.0 percent niobium (Nb), and balance essentially iron (Fe).

5. A welding filler wire, for fusion welding precipitation-hardened austenitic Fe—Mn—Al—C alloys, consisting essentially of, by weight, 23 to 34 percent manganese (Mn), 7.5 to 11.5 percent aluminum (Al), 1.46 to 1.95 percent carbon (C), 0.1 to 2.5 percent vanadium (V), and balance essentially iron (Fe).

6. A welding filler wire, for fusion welding precipitation-hardened austenitic Fe—Mn—Al—C alloys, consisting essentially of, by weight, 23 to 34 percent manganese (Mn), 7.5 to 11.5 percent aluminum (Al), 1.46 to 1.95 percent carbon (C), and at least two of the elements from the group consisting of titanium (Ti), niobium (Nb), vanadium (V), the combined amount being equal to or smaller than 3.0 percent, and balance essentially iron (Fe).

* * * * *